US011119819B2

(12) United States Patent
Kuroyanagi et al.

(10) Patent No.: US 11,119,819 B2
(45) Date of Patent: Sep. 14, 2021

(54) INFORMATION PROCESSING SYSTEM, SYSTEM, AND METHOD OF PROCESSING WORKFLOW

(71) Applicant: Ricoh Company, Ltd., Tokyo (JP)

(72) Inventors: Tomohiro Kuroyanagi, Tokyo (JP); Masafumi Tokiwa, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 215 days.

(21) Appl. No.: 16/285,413

(22) Filed: Feb. 26, 2019

(65) Prior Publication Data

US 2019/0278630 A1    Sep. 12, 2019

(30) Foreign Application Priority Data

Mar. 7, 2018  (JP) .............................. JP2018-041247
Mar. 7, 2018  (JP) .............................. JP2018-041250
Aug. 31, 2018 (JP) .............................. JP2018-163753

(51) Int. Cl.
*G06F 9/48*    (2006.01)
*H04N 1/00*    (2006.01)

(52) U.S. Cl.
CPC ....... *G06F 9/4881* (2013.01); *H04N 1/00949* (2013.01)

(58) Field of Classification Search
None
See application file for complete search history.

(56) References Cited

U.S. PATENT DOCUMENTS 9,069,516 B2 *  6/2015  Sugimura ........... H04N 1/32101
9,779,369 B2    10/2017  Hori
2007/0180236 A1  8/2007  Kuroyanagi et al.
(Continued)

FOREIGN PATENT DOCUMENTS

JP    2015-060247    3/2015
JP    2018-067144    4/2018

OTHER PUBLICATIONS

Extended European Search Report dated Jul. 16, 2019 in corresponding European Patent Application No. 19157637.0, 8 pages.

*Primary Examiner* — Lewis A Bullock, Jr.
*Assistant Examiner* — Melissa A Headly
(74) *Attorney, Agent, or Firm* — Xsensus LLP

(57) ABSTRACT

A first information processing system resides on a first network and communicably connected with a second information processing system that resides on a second network, the second network being different from the first network. The first information processing system includes circuitry configured to perform one or more processes among a plurality of processes included in a first workflow; perform a link processing process of requesting the second information processing system to execute a second workflow including another plurality of processes to be executed in series, the another plurality of processes included in the second workflow being different from the plurality of processes included in the first workflow; receive an execution result of the second workflow from the second information processing system; and perform another one or more processes among the plurality of processes included in the first workflow based on the execution result of the second workflow.

17 Claims, 60 Drawing Sheets

(56) References Cited

U.S. PATENT DOCUMENTS

| | | |
|---|---|---|
| 2009/0070452 A1 | 3/2009 | Sato |
| 2009/0260017 A1 | 10/2009 | Yoshida |
| 2011/0202915 A1 | 8/2011 | Kuroyanagi |
| 2012/0023451 A1 | 1/2012 | Kuroyanagi |
| 2012/0212761 A1 | 8/2012 | Kuroyanagi |
| 2012/0307277 A1* | 12/2012 | Kishida .............. H04N 1/00244 358/1.13 |
| 2013/0100475 A1 | 4/2013 | Kuroyanagi |
| 2014/0204416 A1 | 7/2014 | Kuroyanagi |
| 2014/0280445 A1 | 9/2014 | Hori |
| 2014/0376054 A1 | 12/2014 | Kuroyanagi |
| 2015/0077776 A1 | 3/2015 | Hori |
| 2016/0165076 A1 | 6/2016 | Tokiwa et al. |
| 2016/0212114 A1 | 7/2016 | Kuroyanagi et al. |
| 2016/0274842 A1 | 9/2016 | Kuroyanagi et al. |
| 2016/0274854 A1 | 9/2016 | Tokiwa |
| 2016/0366234 A1 | 12/2016 | Tokiwa |
| 2017/0090827 A1 | 3/2017 | Tokiwa |
| 2017/0257510 A1 | 9/2017 | Kuroyanagi et al. |
| 2017/0353620 A1 | 12/2017 | Tokiwa et al. |
| 2018/0107956 A1 | 4/2018 | Yamada |
| 2018/0198930 A1 | 7/2018 | Tokiwa et al. |

* cited by examiner

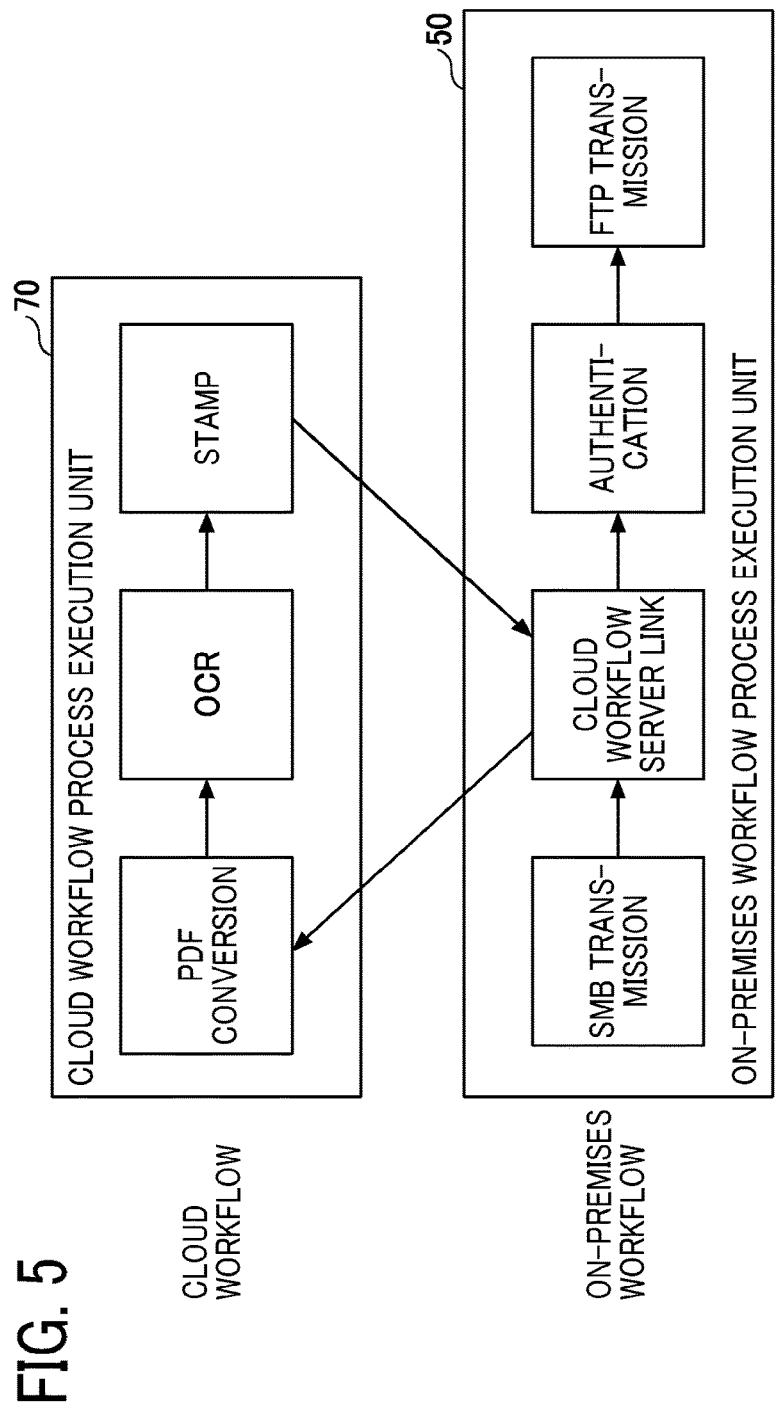

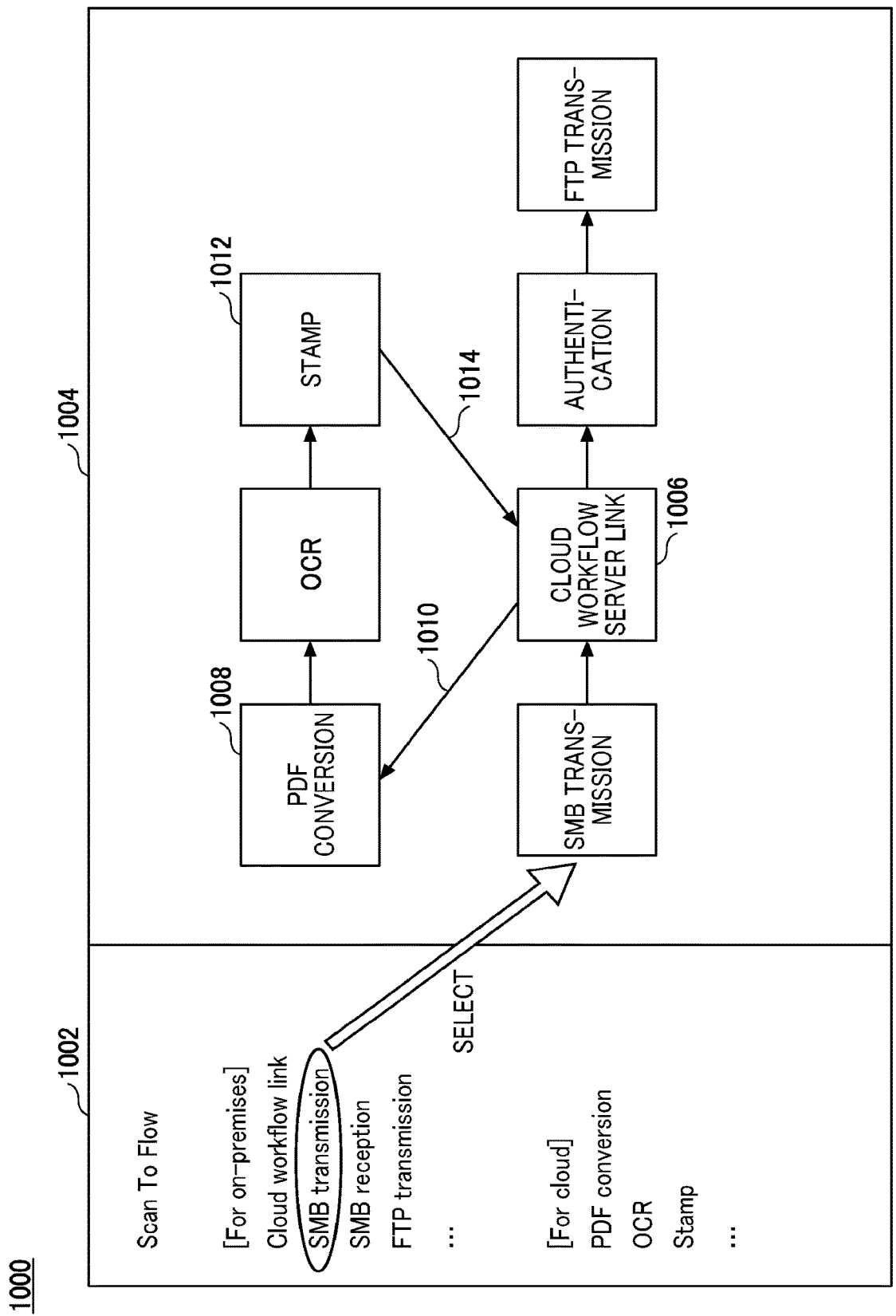

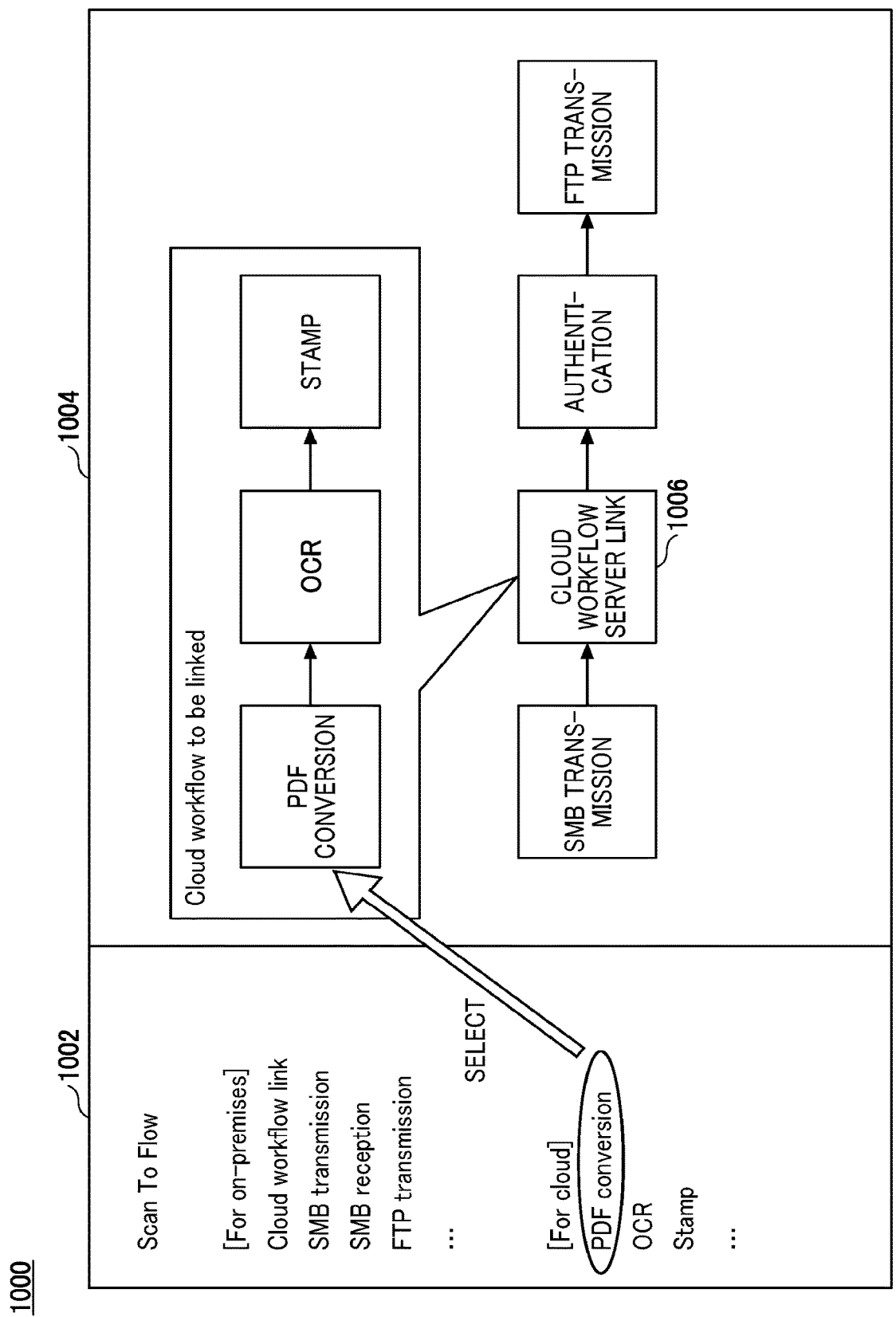

FIG. 10A

ON-PREMISES WORKFLOW (ON-PREMISES WORKFLOW ID)

| Processing order | Processing unit | Parameter |
|---|---|---|
| 1 | SMB processing unit | – |
| 2 | Cloud workflow server link processing unit | – |
| 3 | Authentication processing unit | – |
| 4 | FTP transmission processing unit | – |
| ... | ... | ... |

FIG. 10B

CLOUD WORKFLOW (CLOUD WORKFLOW ID)

| Processing order | Processing unit | Parameter |
|---|---|---|
| 1 | PDF conversion processing unit | Size: A4 |
| 2 | OCR processing unit | Language: Japanese |
| 3 | Stamp processing unit | – |
| ... | ... | ... |

FIG. 12A

ON-PREMISES WORKFLOW (ON-PREMISES WORKFLOW ID)

| Processing order | Processing unit | Parameter |
|---|---|---|
| 1 | Cloud workflow server link processing unit | – |
| 2 | Authentication processing unit | – |
| 3 | FTP transmission processing unit | – |
| ... | ... | ... |

FIG. 12B

CLOUD WORKFLOW (CLOUD WORKFLOW ID)

| Processing order | Processing unit | Parameter |
|---|---|---|
| 1 | PDF conversion processing unit | Size: A4 |
| 2 | OCR processing unit | Language: Japanese |
| 3 | Stamp processing unit | – |
| ... | ... | ... |

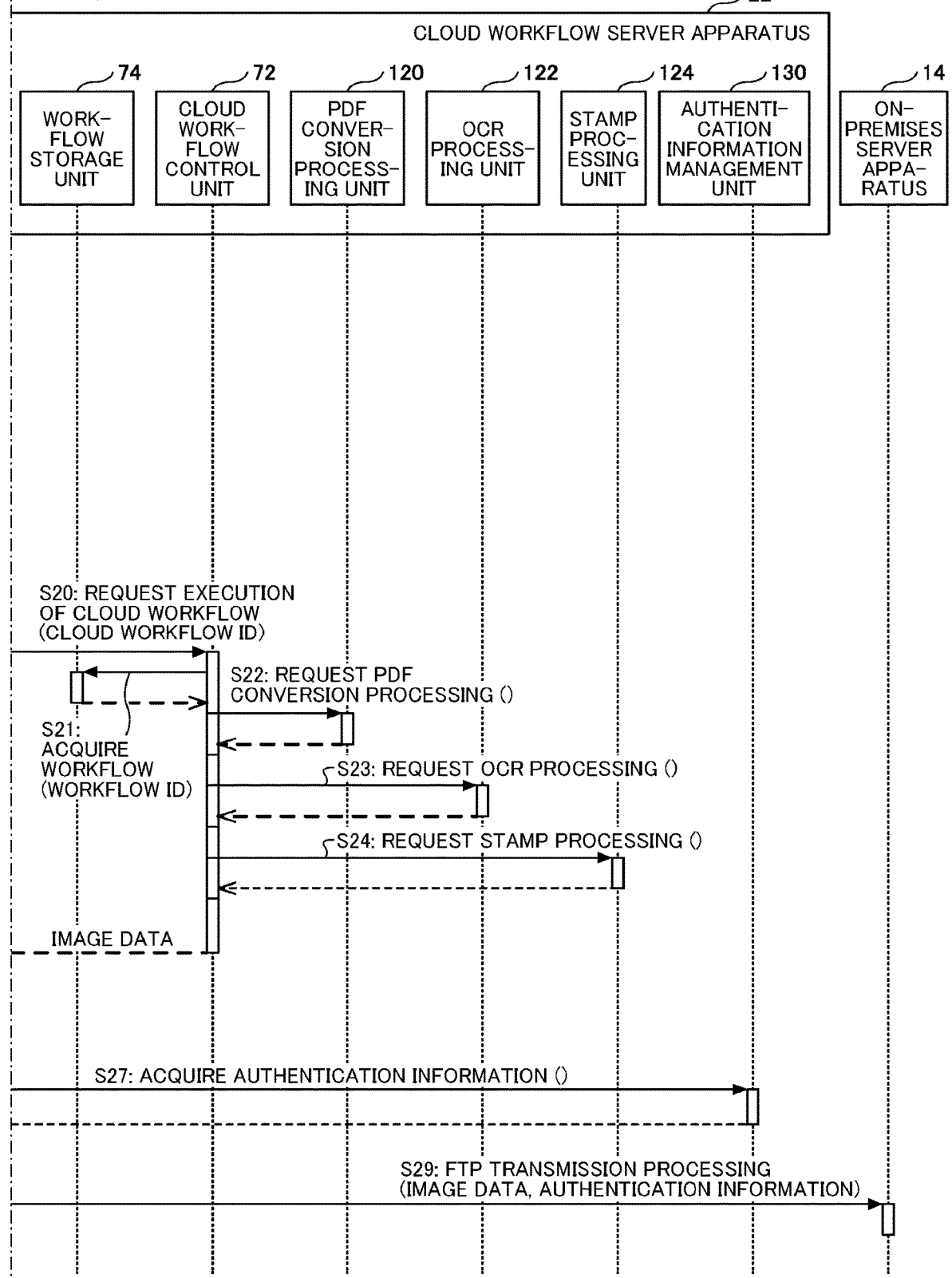

FIG. 15A

ON-PREMISES WORKFLOW (ON-PREMISES WORKFLOW ID)

| Processing order | Processing unit | Parameter |
|---|---|---|
| 1 | SMB reception processing unit | - |
| 2 | Cloud workflow server link processing unit | - |
| ... | ... | ... |

FIG. 15B

CLOUD WORKFLOW (CLOUD WORKFLOW ID)

| Processing order | Processing unit | Parameter |
|---|---|---|
| 1 | PDF conversion processing unit | Size: A4 |
| ... | ... | ... |

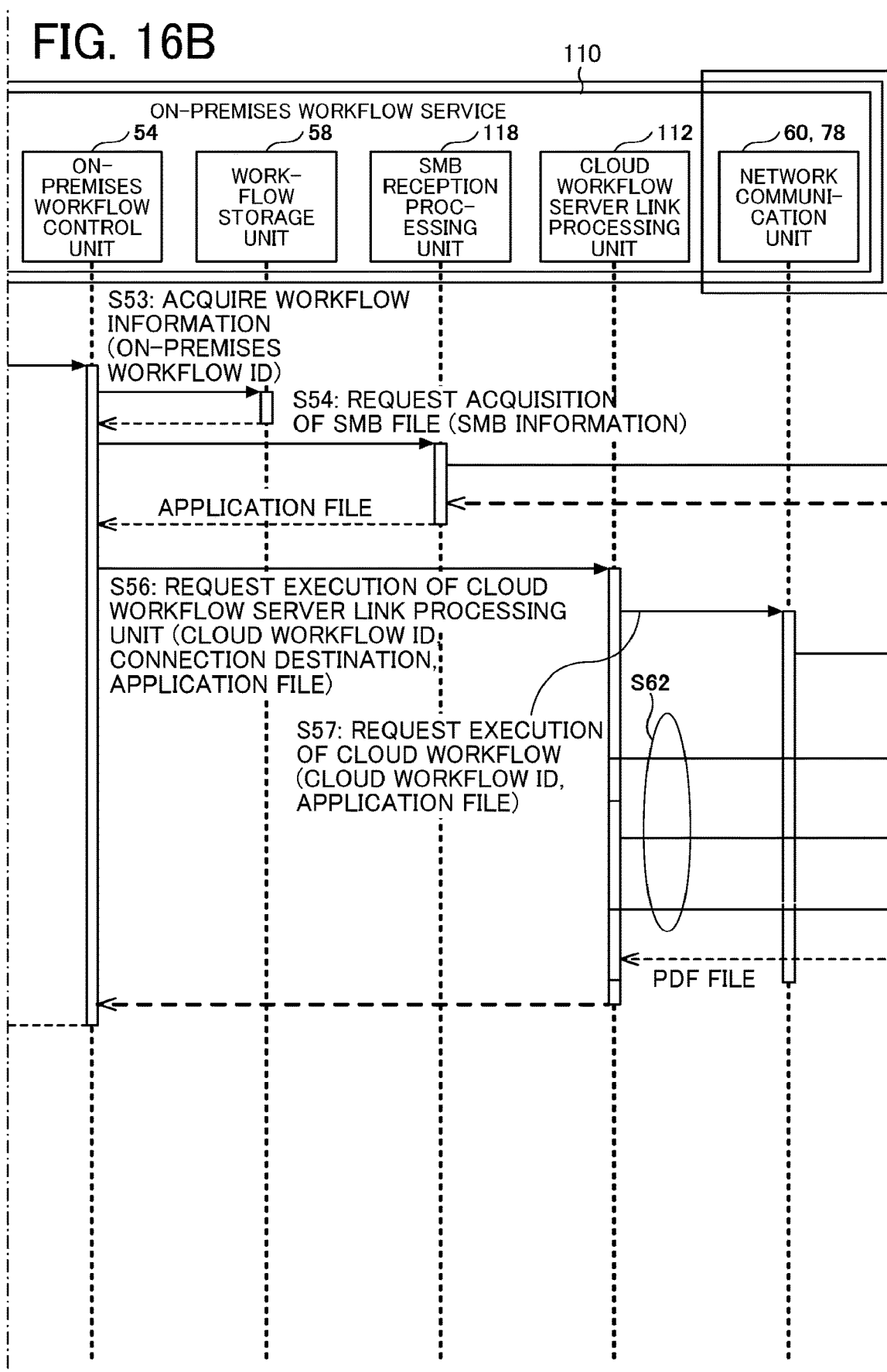

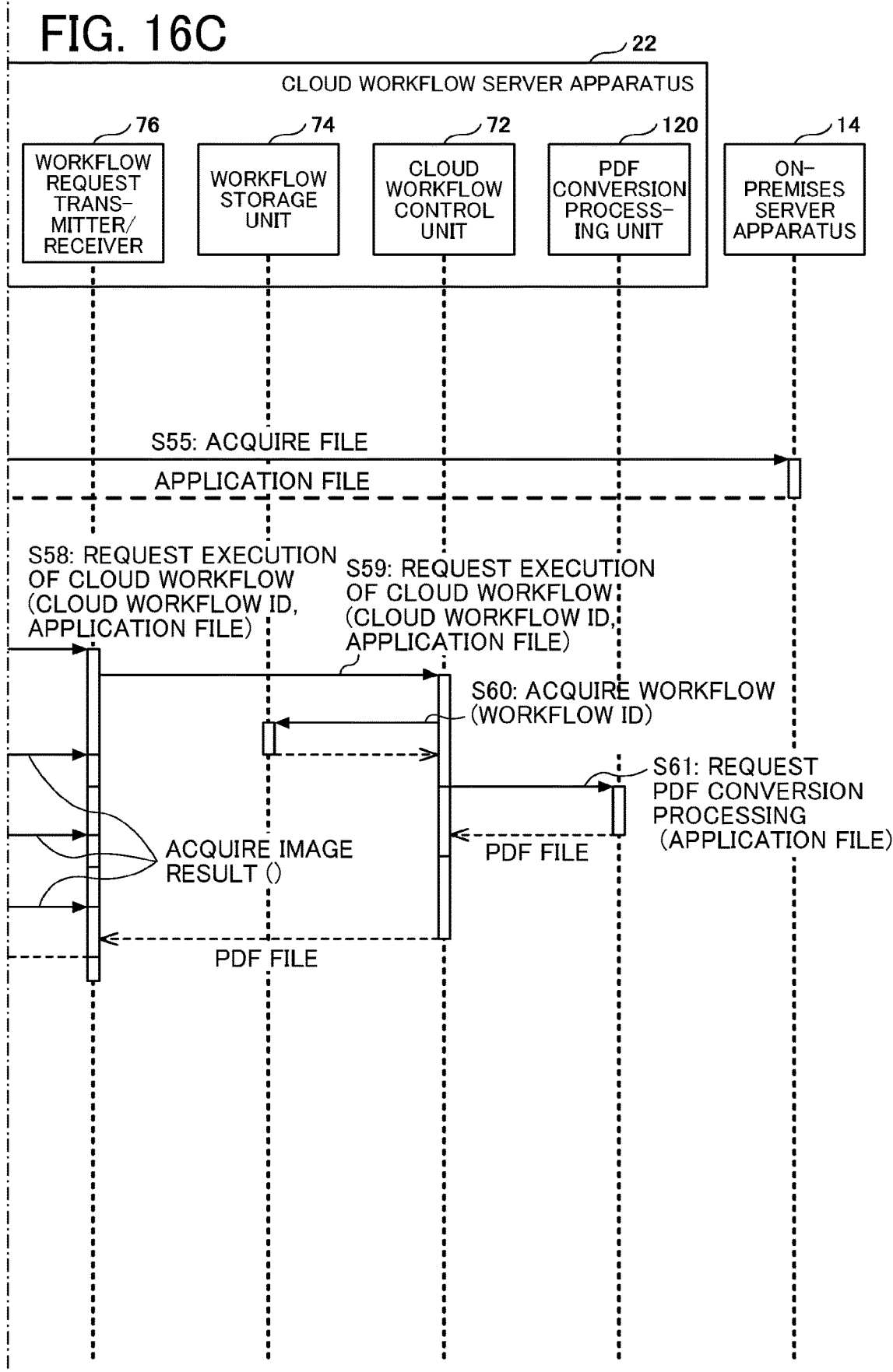

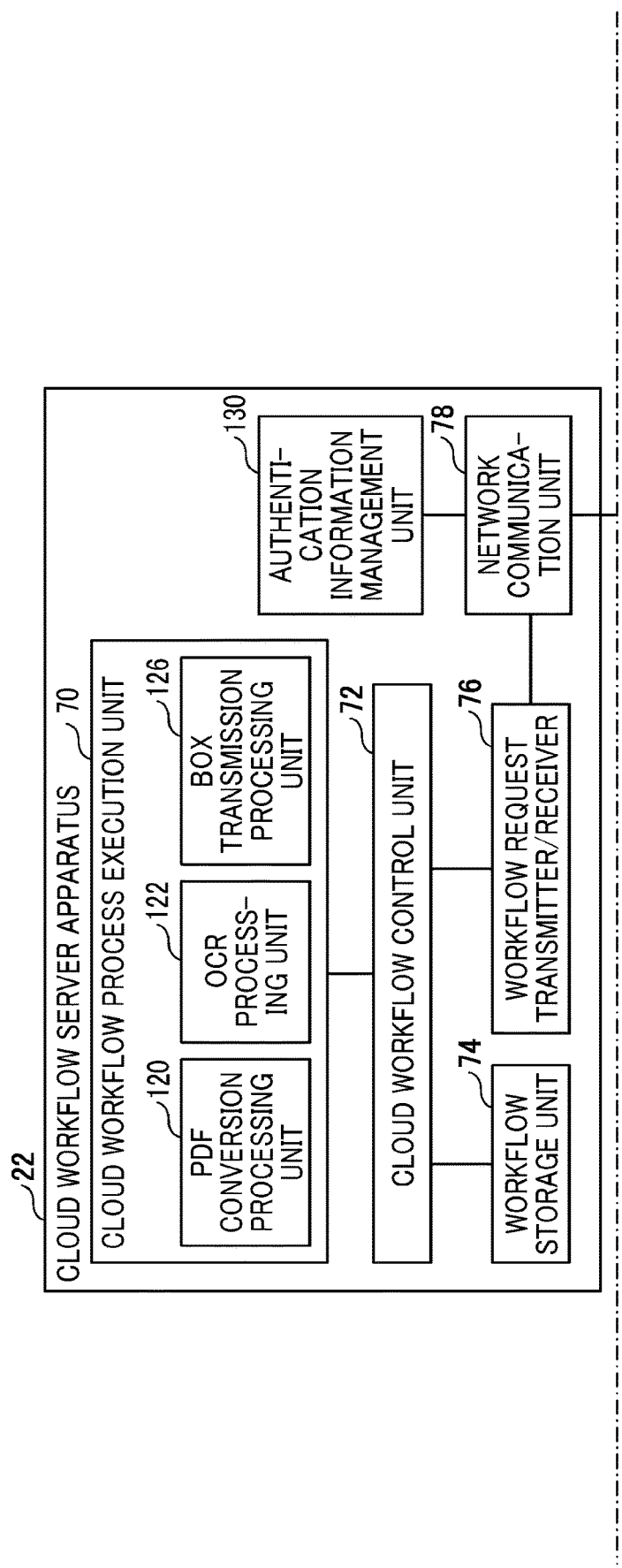

FIG. 18A

ON-PREMISES WORKFLOW (ON-PREMISES WORKFLOW ID)

| Processing order | Processing unit | Parameter |
|---|---|---|
| 1 | Cloud workflow server link processing unit | – |
| 2 | Authentication processing unit | – |
| 3 | FTP transmission processing unit | – |
| 4 | On-premises monitoring processing unit | – |
| 5 | Cloud workflow server link processing unit | – |
| ... | ... | ... |

FIG. 18B

CLOUD WORKFLOW (CLOUD WORKFLOW ID)

| Processing order | Processing unit | Parameter |
|---|---|---|
| 1 | PDF conversion processing unit | Size: A4 |
| 2 | OCR processing unit | Language: Japanese |
| 3 | Box transmission processing unit | – |
| ... | ... | ... |

| FIG. 19AA |
|---|
| FIG. 19AB |
| FIG. 19AC |

| FIG. 19BA |
| FIG. 19BB |
| FIG. 19BC |

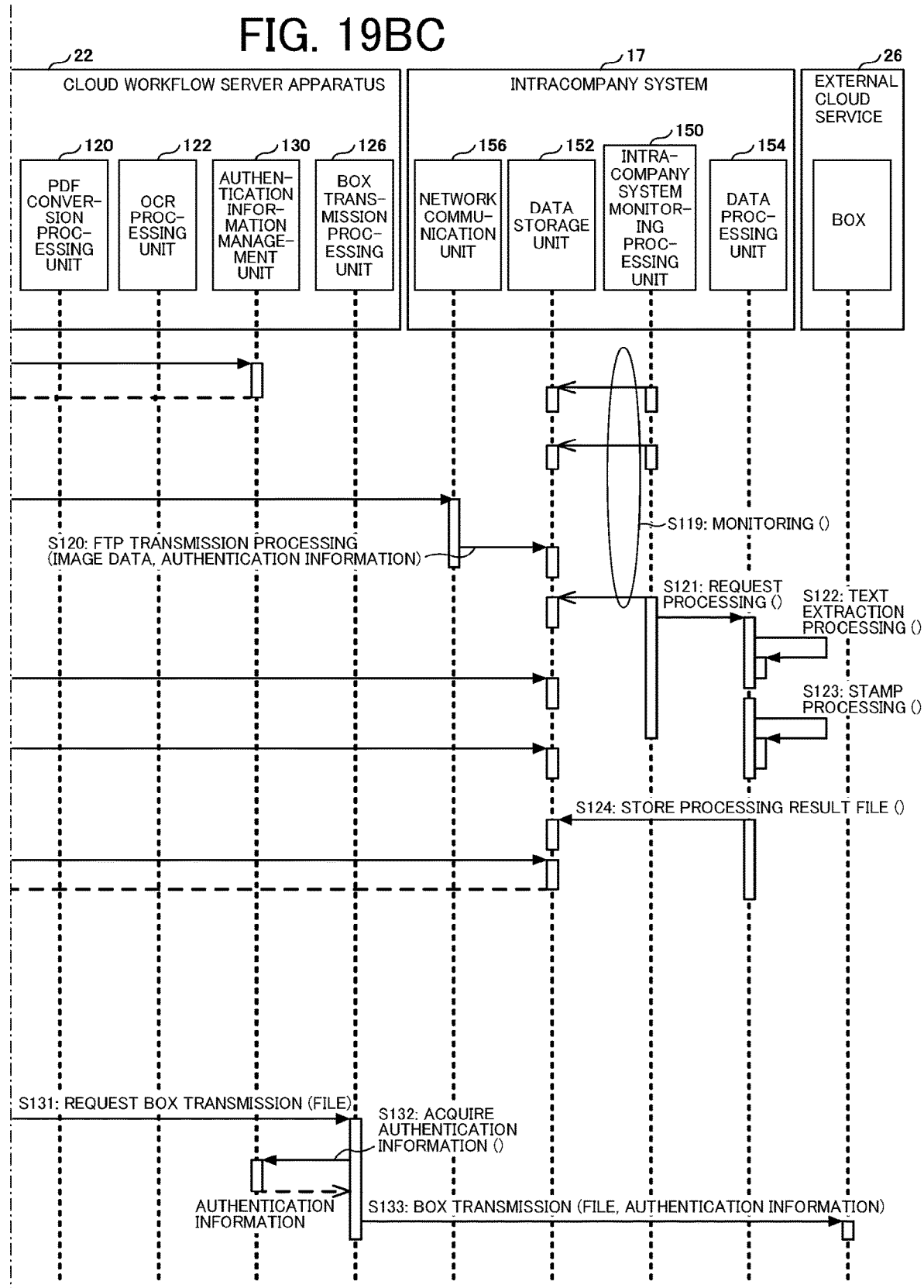

| FIG. 20 | FIG. 20A |
|---|---|
| | FIG. 20B |

FIG. 21A

ON-PREMISES WORKFLOW (ON-PREMISES WORKFLOW ID)

| Processing order | Processing unit | Parameter |
|---|---|---|
| 1 | Authentication processing unit | - |
| 2 | FTP transmission processing unit | - |
| ... | ... | ... |

FIG. 21B

CLOUD WORKFLOW (CLOUD WORKFLOW ID)

| Processing order | Processing unit | Parameter |
|---|---|---|
| 1 | PDF conversion processing unit | Size: A4 |
| 2 | OCR processing unit | Language: Japanese |
| ... | ... | ... |

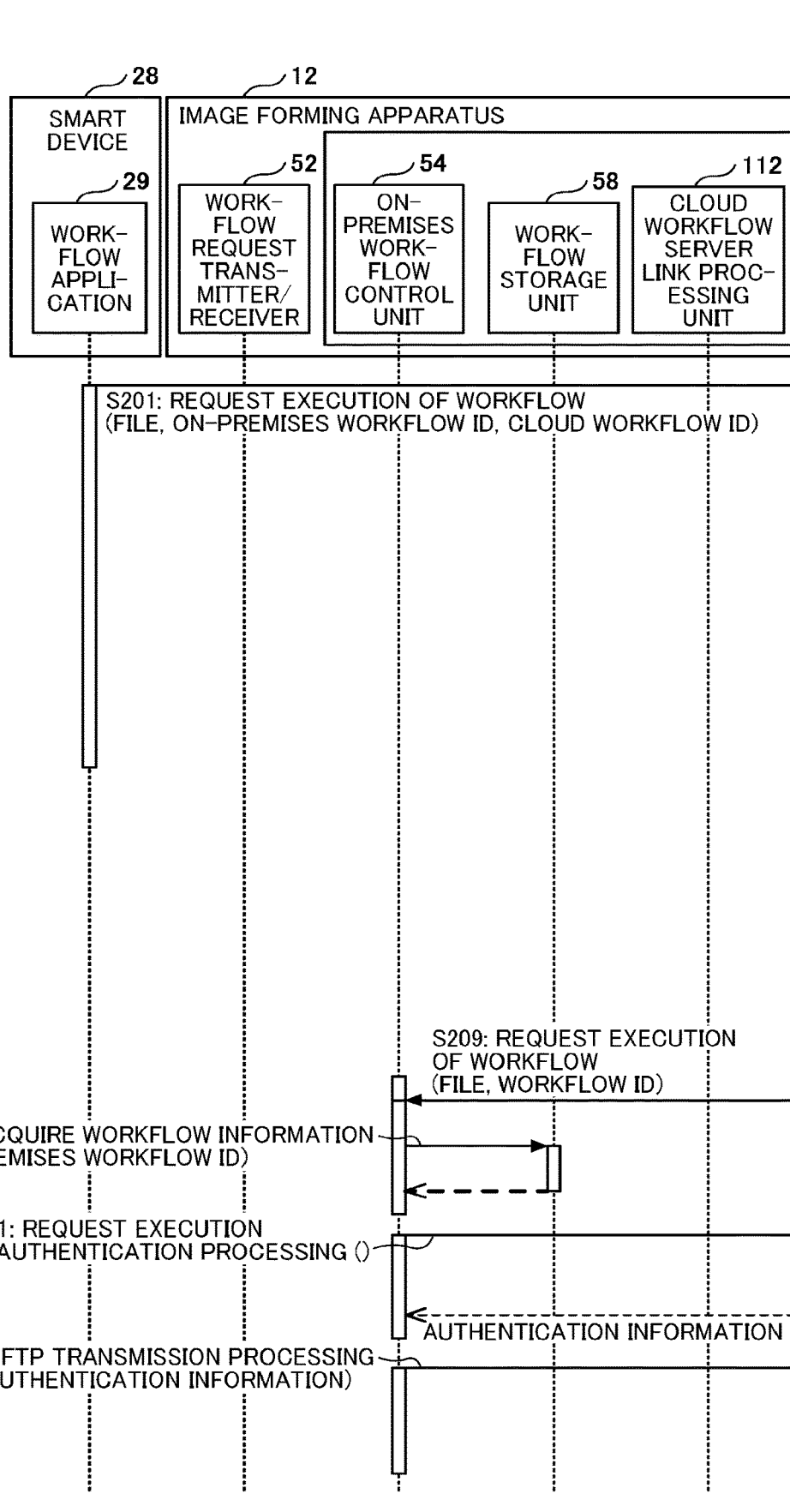

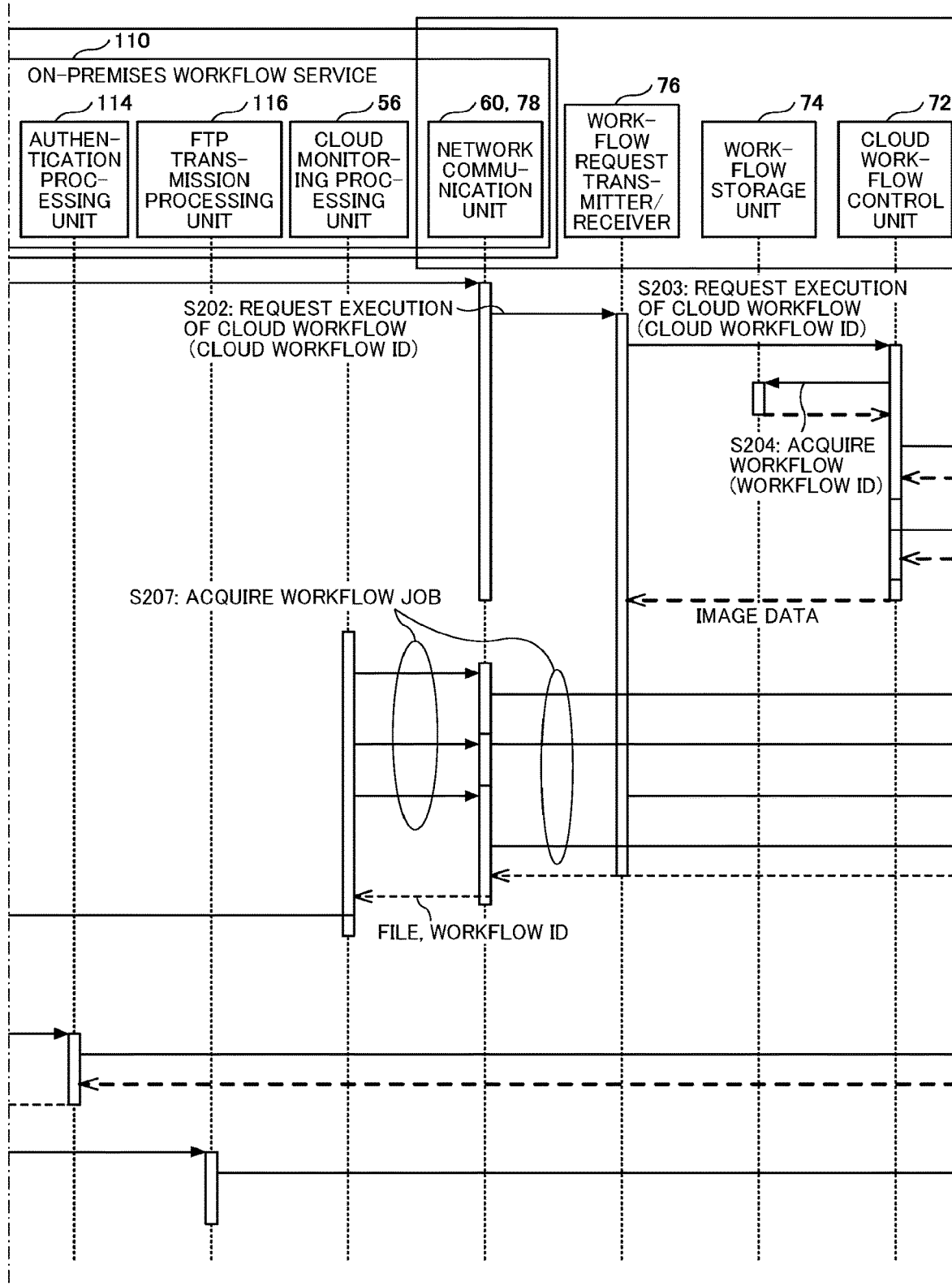

FIG. 24A

ON-PREMISES WORKFLOW (ON-PREMISES WORKFLOW ID)

| Processing order | Processing unit | Parameter |
|---|---|---|
| 1 | Authentication processing unit | - |
| 2 | FTP transmission processing unit | - |
| 3 | On-premises monitoring processing unit | - |
| 4 | Cloud workflow server link processing unit | - |
| ... | ... | ... |

FIG. 24B

CLOUD WORKFLOW (CLOUD WORKFLOW ID)

| Processing order | Processing unit | Parameter |
|---|---|---|
| 1 | PDF conversion processing unit | Size: A4 |
| 2 | OCR processing unit | Language: Japanese |
| 3 | Box transmission processing unit | - |
| ... | ... | ... |

| FIG. 25BA |
| FIG. 25BB |
| FIG. 25BC |

| FIG. 26 |
|---|
| FIG. 26A |
| FIG. 26B |
| FIG. 26C |

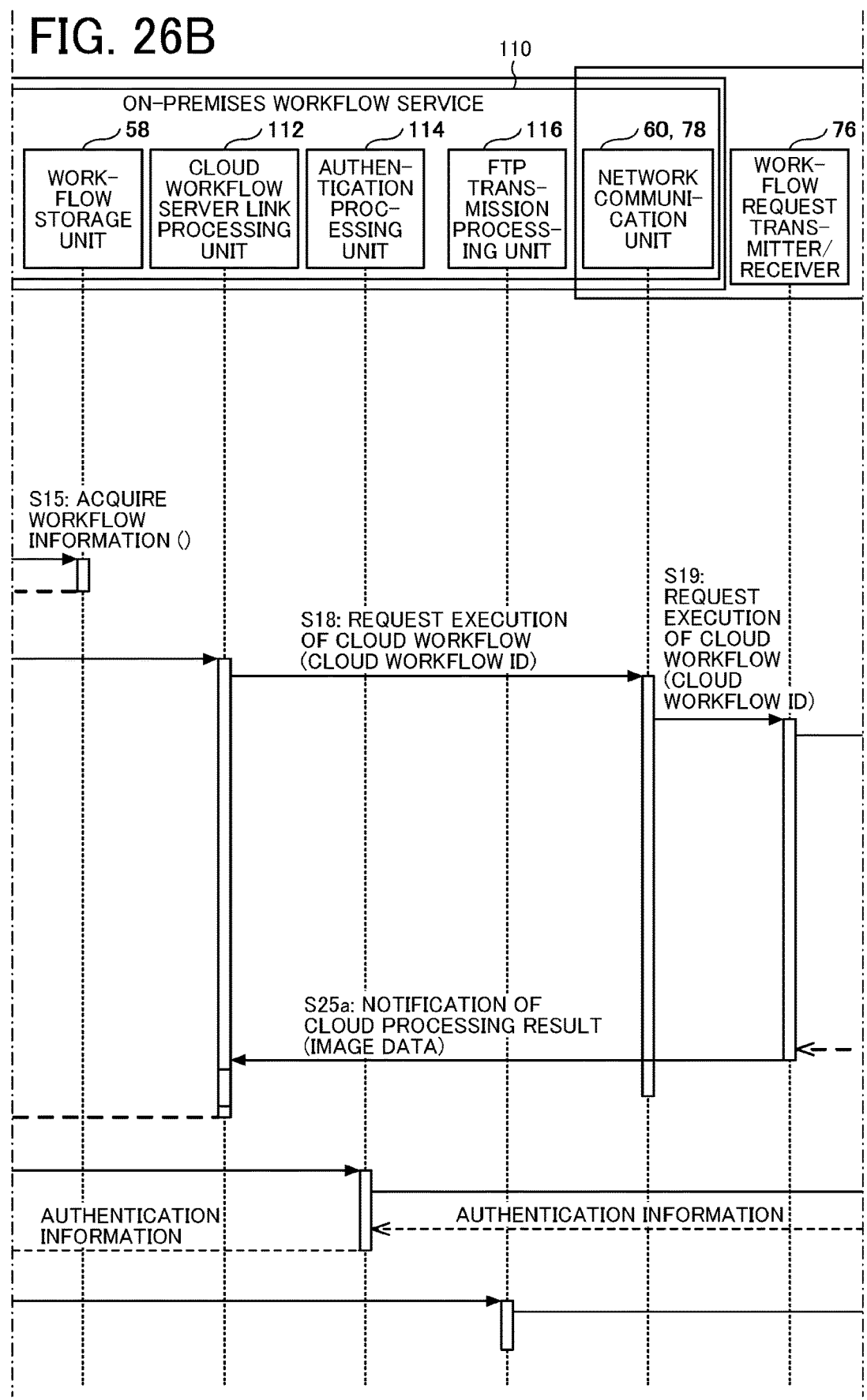

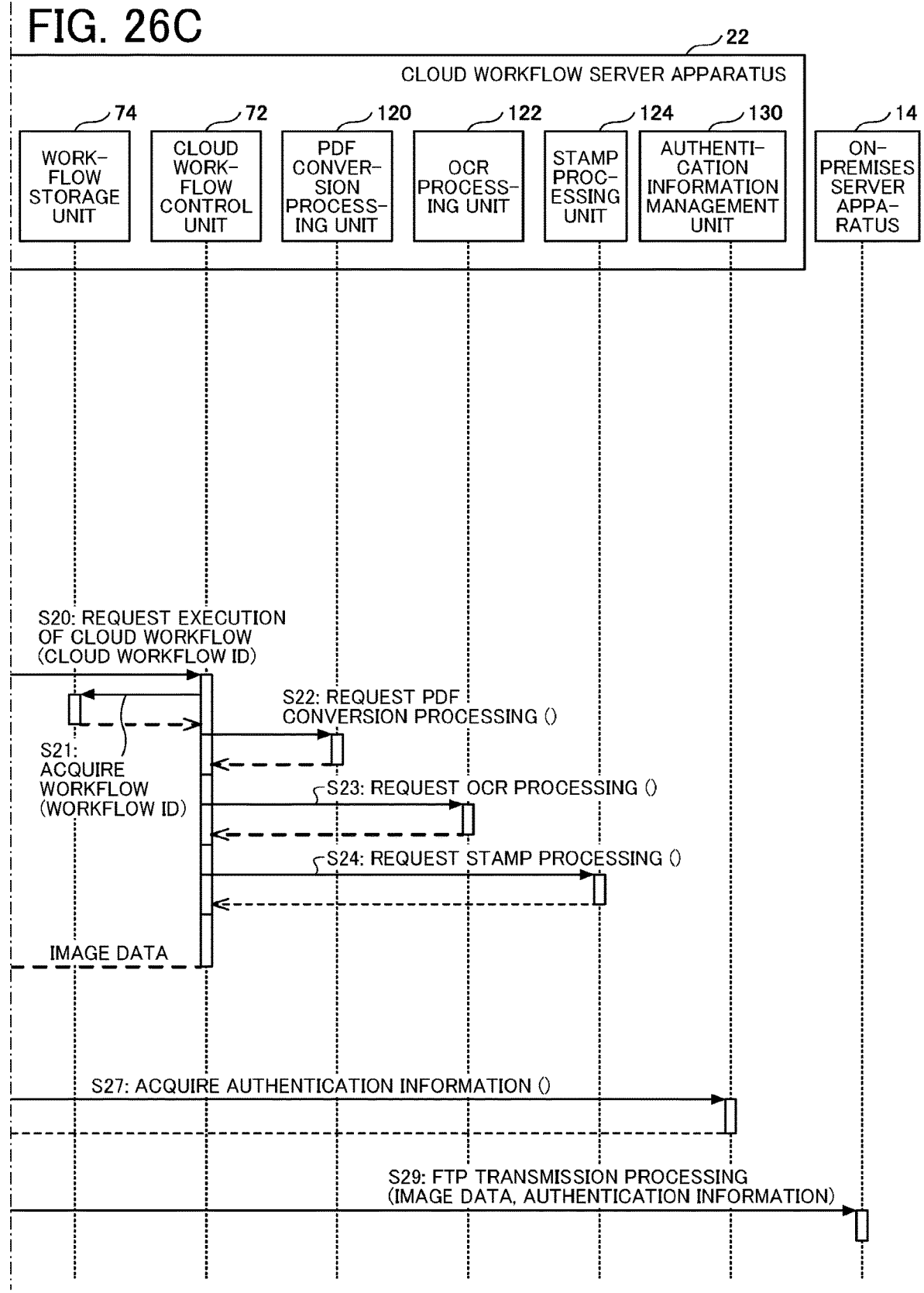

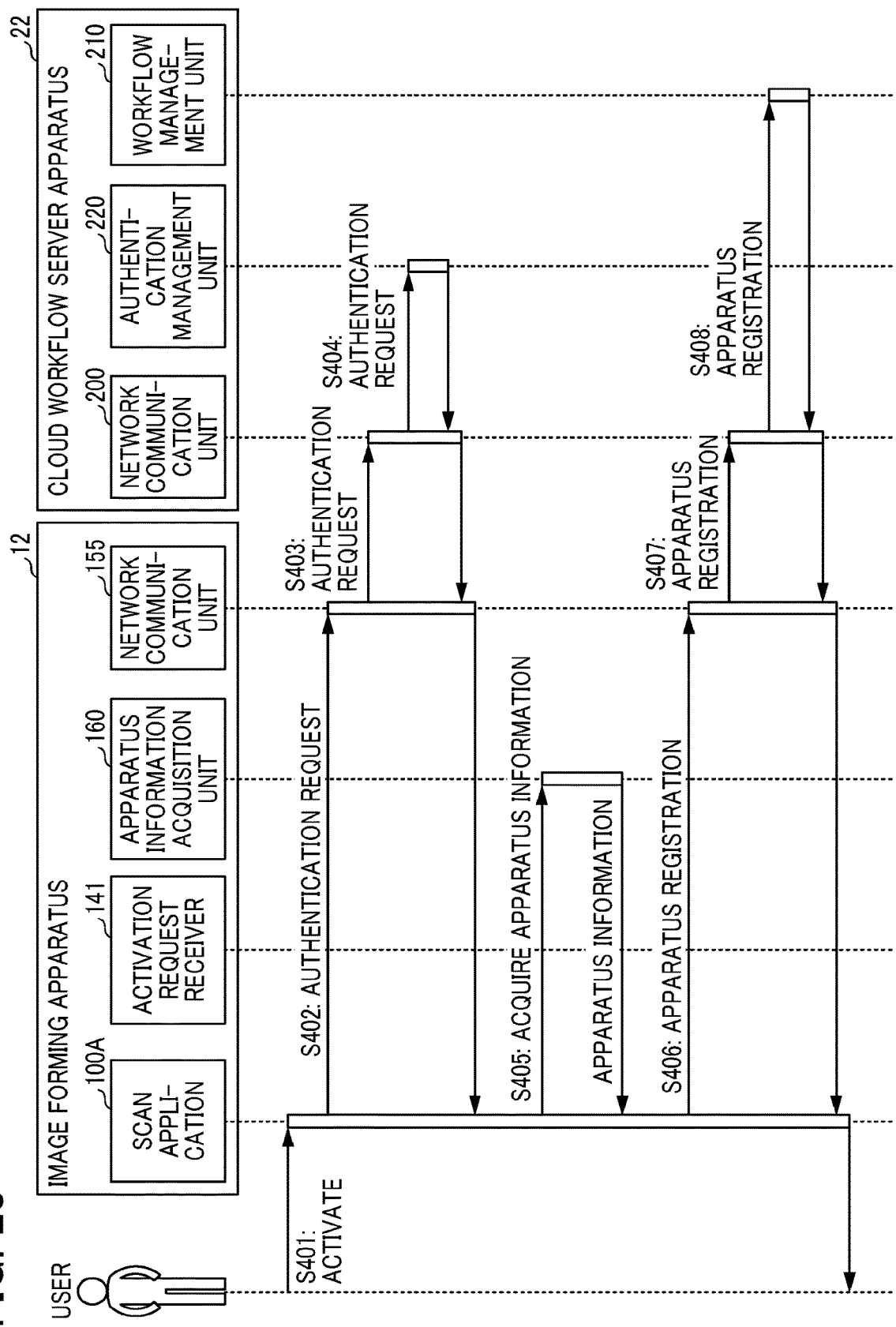

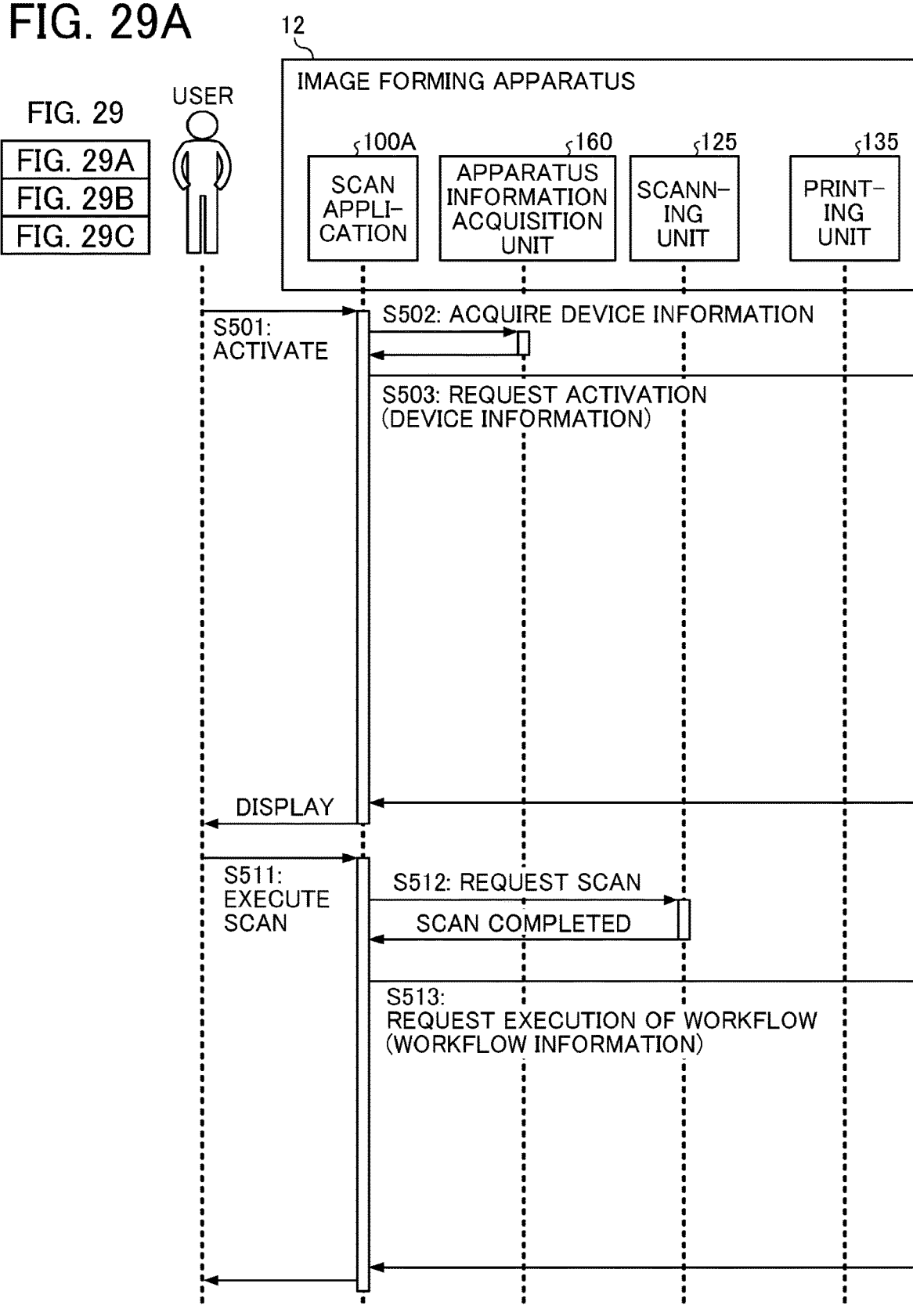

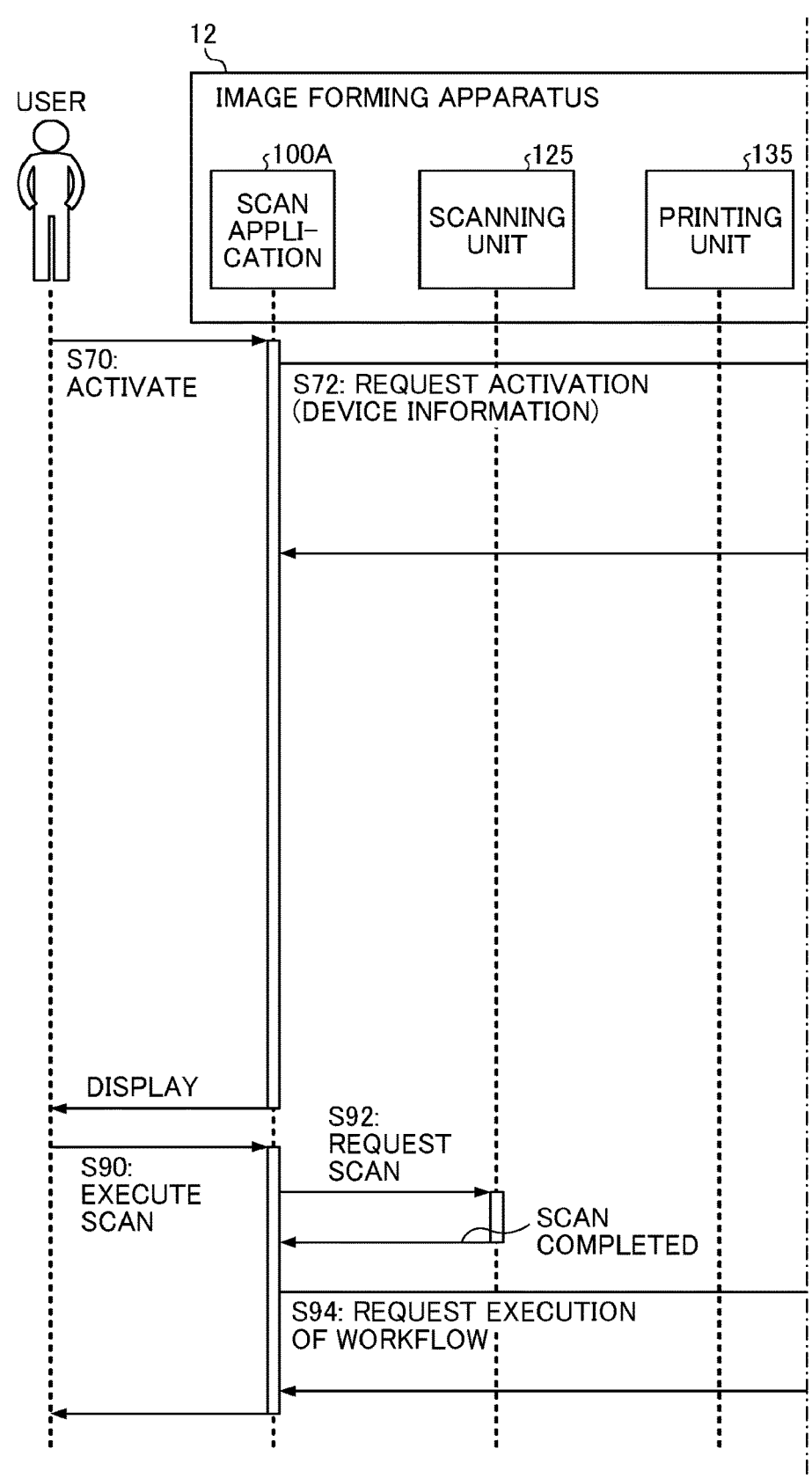

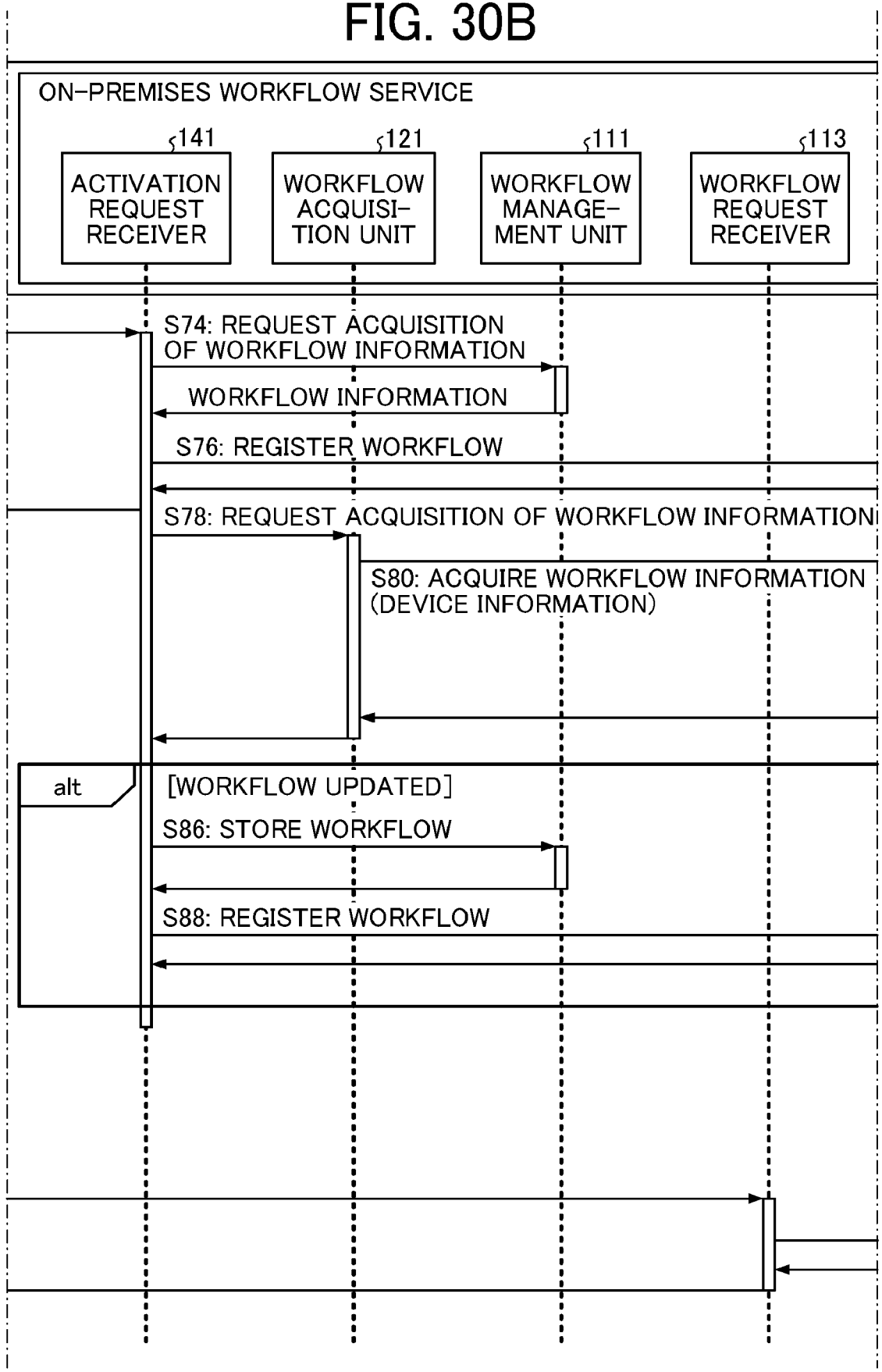

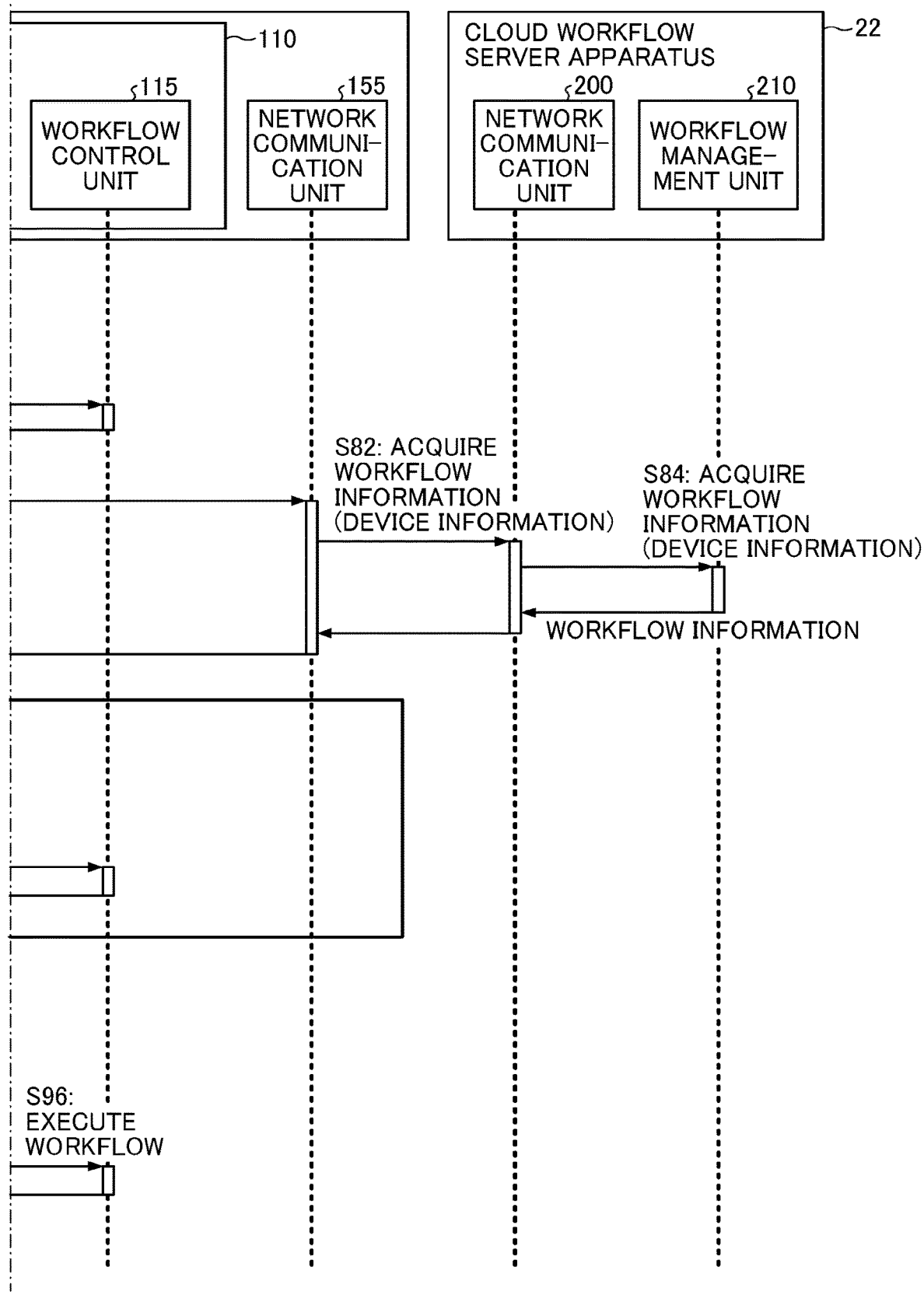

FIG. 31

```
{
  "apps": [
    {
      "name": "ocr-ftp-scan",
      "flows": [
        {
          "flowDetails": [
            {
              "operationName": "cloudOcr",
              "parameters": {
                "lng": "en",
                "outputType": "pdf"
              }
            },
            {
              "operationName": "ftpUpload",
              "parameters": {
                "userId": "user",
                "password": "pass",
                "server": "0.0.0.0",
                "path": "/upload",
                "port": 21
              }
            }
          ],
          "name": "ocr-ftp-upload"
        },
        {
          ...
        }
      ]
    },
    {
      "name": "ftp-print",
      "flows": [
        ...
      ],
      ...
    },
    {
      ...
    }
  ]
}
```

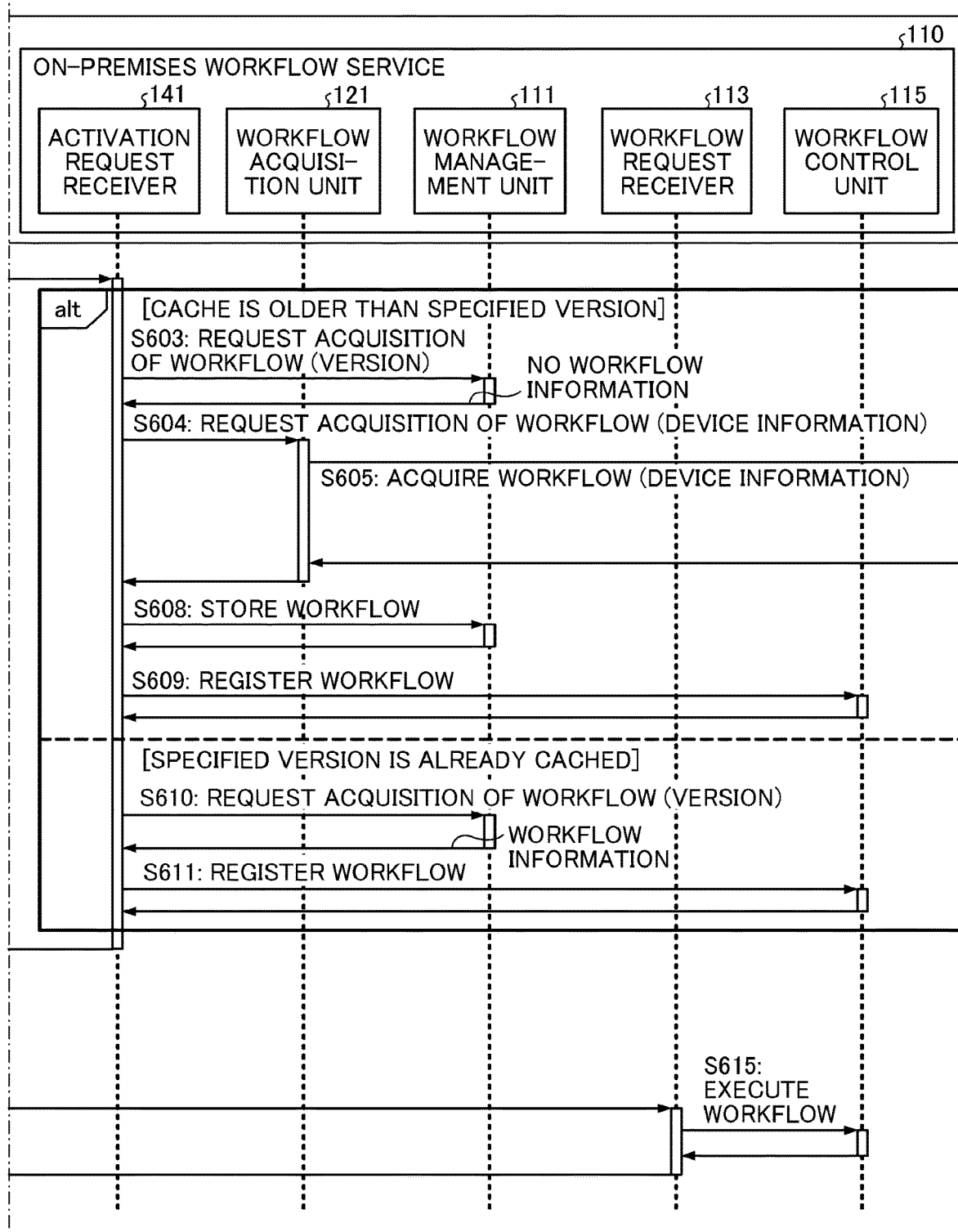

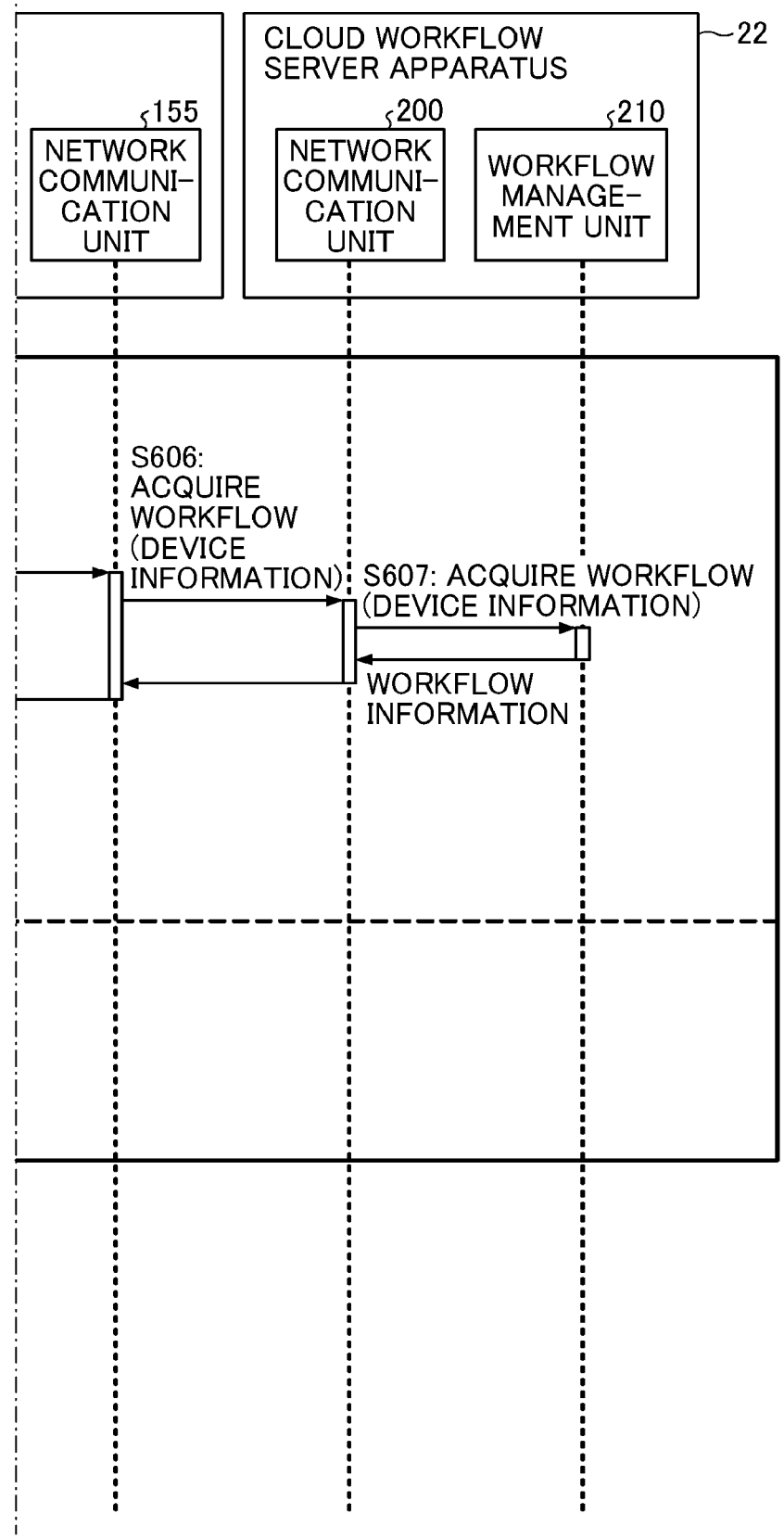

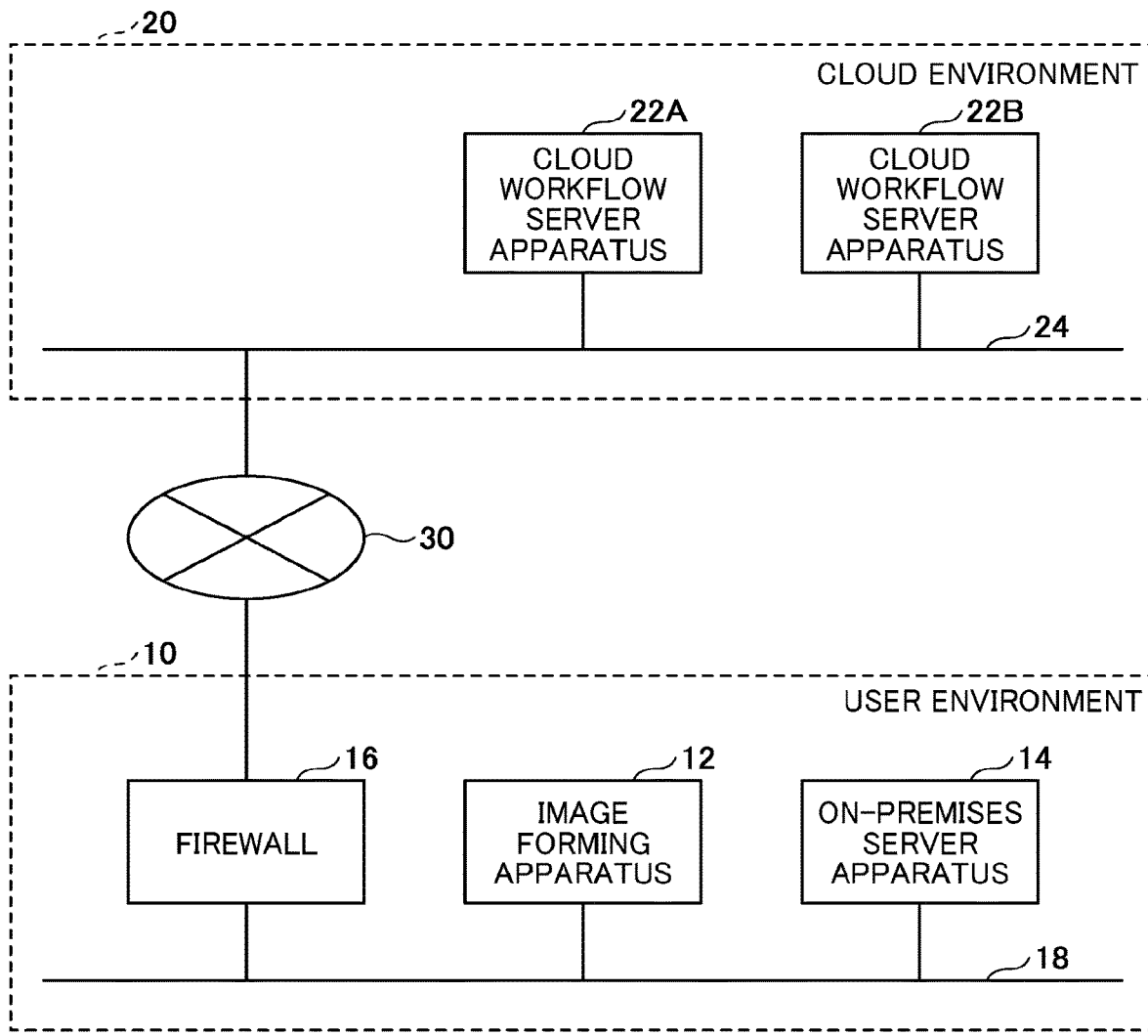

INFORMATION PROCESSING SYSTEM, SYSTEM, AND METHOD OF PROCESSING WORKFLOW

CROSS-REFERENCE TO RELATED APPLICATIONS

This patent application is based on and claims priority pursuant to 35 U.S.C. § 119(a) to Japanese Patent Application Nos. 2018-041250, filed on Mar. 7, 2018; 2018-163753, filed on Aug. 31, 2018; and 2018-041247, filed on Mar. 7, 2018, the entire disclosures of each of which are incorporated herein by reference.

BACKGROUND

Technical Field

The present disclosure relates to an information processing system, a system, and a method of processing a workflow.

Description of the Related Art

For example, multifunction peripherals are known that perform, on image data captured by a scanner or the like, a workflow in which a procedure of a plurality of processes is defined in advance. In addition, servers are known that receive image data captured by a multifunction peripheral and preforms a workflow on the image data. Information processing systems are also known that perform a workflow in cooperation with such multifunction peripherals and servers.

In recent years, for example, a workflow is registered in an information processing system in a user environment such as on-premises and executed. In addition, for example, a workflow is registered in an information processing system in a service provision environment such as the Internet, which is different from the user environment, and executed. Conventionally, when workflows are registered in such different information processing systems, there is no mechanism for linking one workflow executed in one information processing system with the other workflow executed in the other information processing system.

SUMMARY

According to an embodiment, a first information processing system (or apparatus) is provided that resides on a first network and communicably connected with a second information processing system that resides on a second network, the second network being different from the first network. The first information processing system includes circuitry configured to perform one or more processes among a plurality of processes included in a first workflow; perform a link processing process of requesting the second information processing system to execute a second workflow including another plurality of processes to be executed in series, the another plurality of processes included in the second workflow being different from the plurality of processes included in the first workflow; receive an execution result of the second workflow from the second information processing system; and perform another one or more processes among the plurality of processes included in the first workflow based on the execution result of the second workflow.

According to an embodiment, the circuitry is further configured to invoke the link processing process according to workflow information that defines a processing order in which the plurality of processes in the first workflow are to be executed, to cause the second information processing system to execute the second workflow as a part of the plurality of processes of the first workflow.

According to an embodiment, the plurality of processes include a process to be performed in cooperation with an information processing apparatus that is not connected to the second network.

According to an embodiment, after requesting the second information processing system to execute the second workflow, the circuitry continuously requests the second information processing system for the execution result of the second workflow until the circuitry receives the execution result of the second workflow from the second information processing system.

According to an embodiment, after requesting the second information processing system to execute the second workflow, the circuitry acquires the execution result of the second workflow by push notification from the second information processing system.

According to an embodiment, the circuitry is further configured to receive an execution request including first workflow identification information of the first workflow and second workflow information of the second workflow from an application for receiving a user operation; and perform the first workflow and request execution of the second workflow identified with the first workflow identification information and the second workflow identification information in response to the execution request.

According to an embodiment, the circuitry is further configured to receive a request for executing the first workflow from the second information processing system that has received an execution request including first workflow identification information of the first workflow and second workflow identification information of the second workflow from a device on which an application for receiving a user operation is installed.

According to an embodiment, the circuitry invokes, for a plurality of times, the link processing process according to workflow information that defines a processing order in which the plurality of processes of the first workflow are to be executed.

According to an embodiment, the circuitry is further configured to: the circuitry is further configured to: receive a user operation for creating a processing order in which the plurality of processes in the first workflow and the another plurality of processes the second workflow are to be executed; generate workflow information that defines a processing order in which the plurality of processes in the first workflow are to be executed; and store the workflow information in a memory provided for the first information processing system.

According to an embodiment, in generating the workflow information, the circuitry displays a screen that allows a user to arrange display components representing the plurality of processes to create the processing order in which the plurality of processes in the first workflow and the another plurality of processes in the second workflow are to be executed, and the display components arranged on the screen include a display component representing the link processing process representing the another plurality of processes of the second workflow that are to be executed as a part of the plurality of processes of the first workflow.

According to an embodiment, the first information processing system executes the first workflow including the plurality of processes in cooperation with an information processing apparatus connected to the first network, and the circuitry is further configured to:

acquire workflow information relating to the first workflow from the second information processing system; and control execution of a process executed by at least the information processing apparatus based on the workflow information, to control execution of the first workflow cooperating with the information processing apparatus.

According to an embodiment, the circuitry performs, as a part of the plurality of processes of the first workflow, one of a process executed by the first information processing system, a process executed by the information processing apparatus, and a process executed by the second information processing system, based on the workflow information, and the circuitry invokes the plurality of processes according to the workflow information to control execution of the first workflow.

According to an embodiment, the circuitry is further configured to store the workflow information acquired from the second information processing system in a memory provided for the first information processing system, wherein in a case where the workflow information is stored in the memory, the circuitry acquires the workflow information from the memory, and in a case where no workflow information is stored in the memory, the circuitry acquires the workflow information from the second information processing system.

According to an embodiment, the circuitry sends, to the second information processing system, an inquiry inquiring whether the second information processing system holds an updated version of the workflow information stored in the memory provided for the first information processing system, and when the second information processing system holds the updated version of the workflow information stored in the memory provided for the first information processing system, the circuitry acquires the updated version of the workflow information from the second information processing system.

According to an embodiment, when a version of the workflow information stored in the memory provided for the first information processing system is older than a version of the workflow information specified by an application installed in the first information processing system, the circuitry reacquires the workflow information from the second information processing system.

According to an embodiment, the circuitry reacquires the workflow information from the second information processing system, at one of timings when the first information processing system is started, when an application installed in the first information processing system is activated, when the first information processing system returns from an energy saving mode, and when the first information processing system starts to receive a user operation on a control panel of the information processing system.

According to an embodiment, the circuitry stores the workflow information in association with information of the second information processing system from which the workflow information is acquired, and when a plurality of information processing apparatuses are connected to the second network, the circuitry acquires the workflow information of one of the plurality of information processing apparatuses, the one of the plurality of information processing apparatuses being specified by an application installed in the first information processing system.

According to an embodiment, the information processing system further includes at least one of a printer and scanner, and each of the first workflow and the second workflow include processes performed on electronic data or image data generated by the at least one of a printer and scanner.

According to an embodiment, a system is provided, including: a first information processing system configured to execute a first workflow including a plurality of processes to be executed in series, the first information processing system being connected to a first network; and a second information processing system configured to execute a second workflow including another plurality of processes to be executed in series, the another plurality of processes included in the second workflow being different form the plurality of processes included in the first workflow, the second information processing system being connected to a second network that is different from the first network, wherein the first information processing apparatus comprises first circuitry configured to execute one or more processes among the plurality of processes included in the first workflow; execute a link processing process of transmitting a request to the second information processing system requesting execution of the second workflow; and perform another one or more processes among the plurality of processes included in the first workflow based on an execution result received in response to the request from the second information processing system, and the second information processing apparatus comprises second circuitry configured to perform the another plurality of processes included in the second workflow in response to receiving the request from the first information processing system.

According to an embodiment, a workflow processing method is provided performed by a first information processing system that resides on a first network and communicably connected with a second information processing system that resides on a second network, the second network being different from the first network, the method including: performing one or more processes among a plurality of processes included in a first workflow; performing a link processing process of requesting the second information processing system to execute a second workflow including another plurality of processes to be executed in series, the another plurality of processes included in the second workflow being different from the plurality of processes included in the first workflow; receiving an execution result of the second workflow from the second information processing system; and performing another one or more processes among the plurality of processes included in the first workflow based on the execution result of the second workflow.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is an illustration for explaining an example of an operation in which an on-premises workflow and a cloud workflow cooperate, according to an embodiment of the present disclosure;

FIG. 6 is a diagram for explaining an example of association between an on-premises workflow and a cloud workflow, according to an embodiment of the present disclosure;

FIG. 7 is an illustration of an example of a workflow information generation screen, according to an embodiment of the present disclosure;

FIG. 9 is an illustration of another example of the workflow information generation screen, according to an embodiment of the present disclosure;

FIGS. 10A and 10B are diagrams illustrating an example of a configuration of workflow information, according to an embodiment of the present disclosure;

FIGS. 12A and 12B are diagrams illustrating an example of a configuration of workflow information, according to an embodiment of the present disclosure;

FIGS. 13A, 13B, and 13C (FIG. 13) are a sequence diagram of an example of a workflow that uses the scanner unit, according to an embodiment of the present disclosure;

FIGS. 15A and 15B are diagrams illustrating an example of a configuration of workflow information, according to an embodiment of the present disclosure;

FIGS. 16A, 16B, and 16C (FIG. 16) are a sequence diagram of an example of a workflow that uses the printing unit, according to an embodiment of the present disclosure;

FIGS. 17A and 17B (FIG. 17) are a block diagram illustrating an example of a functional configuration of the information processing system that performs a workflow with the workflow application using the scanner unit, according to an embodiment of the present disclosure;

FIGS. 18A and 18B are diagrams illustrating an example of a configuration of workflow information, according to an embodiment of the present disclosure;

FIGS. 21A and 21B are diagrams illustrating an example of a configuration of workflow information, according to an embodiment of the present disclosure;

FIGS. 22A, 22B and 22C (FIG. 22) are a sequence diagram of an example of a workflow executed from a workflow application installed in a smart device, according to an embodiment of the present disclosure;

FIGS. 24A and 24B are diagrams illustrating an example of a configuration of workflow information, according to an embodiment of the present disclosure;

FIGS. 26A, 26B, and 26C (FIG. 26) are a sequence diagram of an example of a workflow implementing push type notification from a cloud side using the WebSocket protocol, according to the sixth embodiment of the present disclosure;

FIG. 28 is a sequence diagram illustrating an example of an operation of associating workflow information registered in a cloud workflow server apparatus with the image forming apparatus, according to the seventh embodiment of the present disclosure;

FIGS. 29A, 29B and 29C (FIG. 29) are a sequence diagram illustrating an example of an operation performed when no workflow information is cached in the image forming apparatus, according to the seventh embodiment of the present disclosure;

FIGS. 30A, 30B, and 30C (FIG. 30) are a sequence diagram illustrating an example of an operation performed when workflow information is cached in the image forming apparatus, according to the seventh embodiment of the present disclosure;

FIG. 31 is a diagram illustrating an example of a configuration of workflow information, according to the seventh embodiment of the present disclosure;

FIGS. 32A, 32B, and 32C (FIG. 32) are a sequence diagram illustrating an example of an operation performed when workflow information is cached in the image forming apparatus, according to the eighth embodiment of the present disclosure;

FIG. 34 is a schematic view illustrating another example of a configuration of the information processing system, according to eleventh embodiment of the present disclosure, and FIG. 35 is a diagram illustrating an example of a configuration of workflow management information, according to the eleventh embodiment of the present disclosure.

Figure 1:
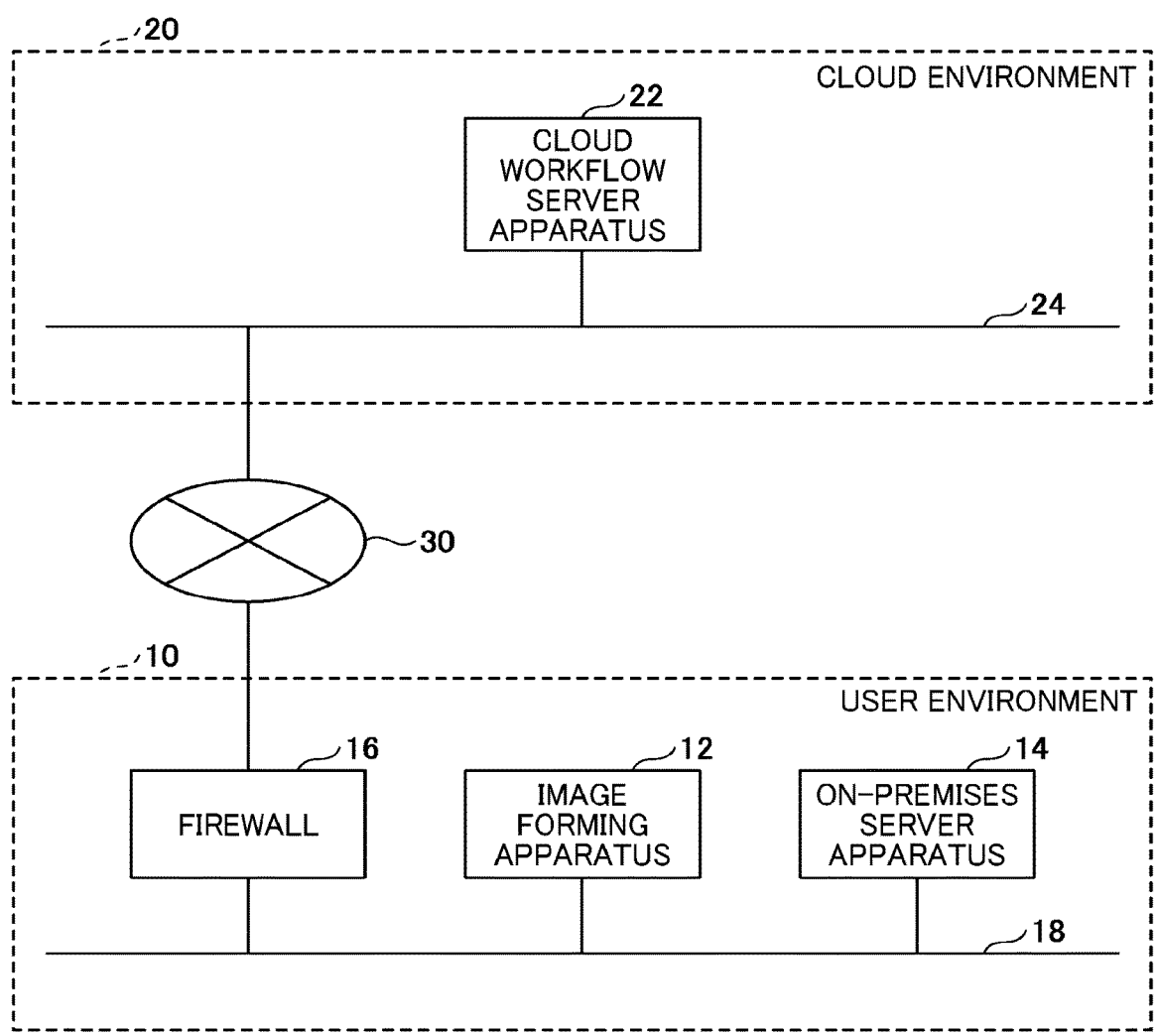
FIG. 1 is a schematic view illustrating an example of a configuration of an information processing system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail below, with reference to the drawings.

First Embodiment

System Configuration:

A system configuration of an information processing system 1 according to a first embodiment is described below with reference to FIG. 1. FIG. 1 is a schematic view illustrating an example of a configuration of an information processing system 1 according to the present embodiment.

The information processing system 1 illustrated in FIG. 1 includes a user environment 10 and a cloud environment 20, which are communicably connected with each other via a network 30 such as the Internet. The cloud environment 20, which is an example of a service provision environment, includes a cloud workflow server apparatus 22. The cloud workflow server apparatus 22 is connected to the network 30 via a network 24 provided in the cloud environment 20. The cloud workflow server apparatus 22 executes a workflow of the cloud environment 20, as described later.

The user environment 10 in FIG. 1 includes an image forming apparatus 12, an on-premises server apparatus 14, and a firewall 16. The image forming apparatus 12 and the on-premises server apparatus 14 in FIG. 1 are connected to the network 30 via a network 18 and the firewall 16, which are provided in the user environment 10. The image forming apparatus 12, which is an example of an electronic apparatus, executes a workflow of the user environment 10, as described later. Alternatively, the workflow of the user environment 10 can be implemented by an information processing apparatus other than the image forming apparatus 12 connected to the network 18. As describe later, the workflow of the user environment 10 cooperates with the on-premises server apparatus 14 and the cloud workflow server apparatus 22.

The on-premises server apparatus 14 is often operated so as to accept requests only from the same network environment where the on-premises server apparatus 14 resides, that is, from the user environment 10. Conventionally, in this case, although the on-premises server apparatus is an apparatus having a server function, the on-premises server apparatus 4 cannot receive execution requests from an apparatus connected to the different network or a network other than a specific network, e.g., from the cloud workflow server apparatus. In other words, conventionally, when controlling a workflow including a process to be performed by the on-premises server apparatus operating as described above, an execution request of a process included in the workflow cannot be sent from the cloud workflow server apparatus to the on-premises server apparatus. For this reason, conventionally, a workflow including processes to be performed by different apparatuses respectively provided in different networks cannot be controlled.

The configuration illustrated in FIG. 1 is just an example of the configuration of the information processing system 1, and the information processing system 1 can have any other suitable system configuration. For example, the user environment 10 can include electronic apparatuses such as a scanner, a printer, a facsimile, a projector and an electronic whiteboard, in addition to the image forming apparatus 12. The electronic apparatuses such as the image forming apparatus 12, the scanner, the printer, the facsimile, the projector, and the electronic whiteboard are examples of an electronic apparatus that executes a workflow.

Figure 2:
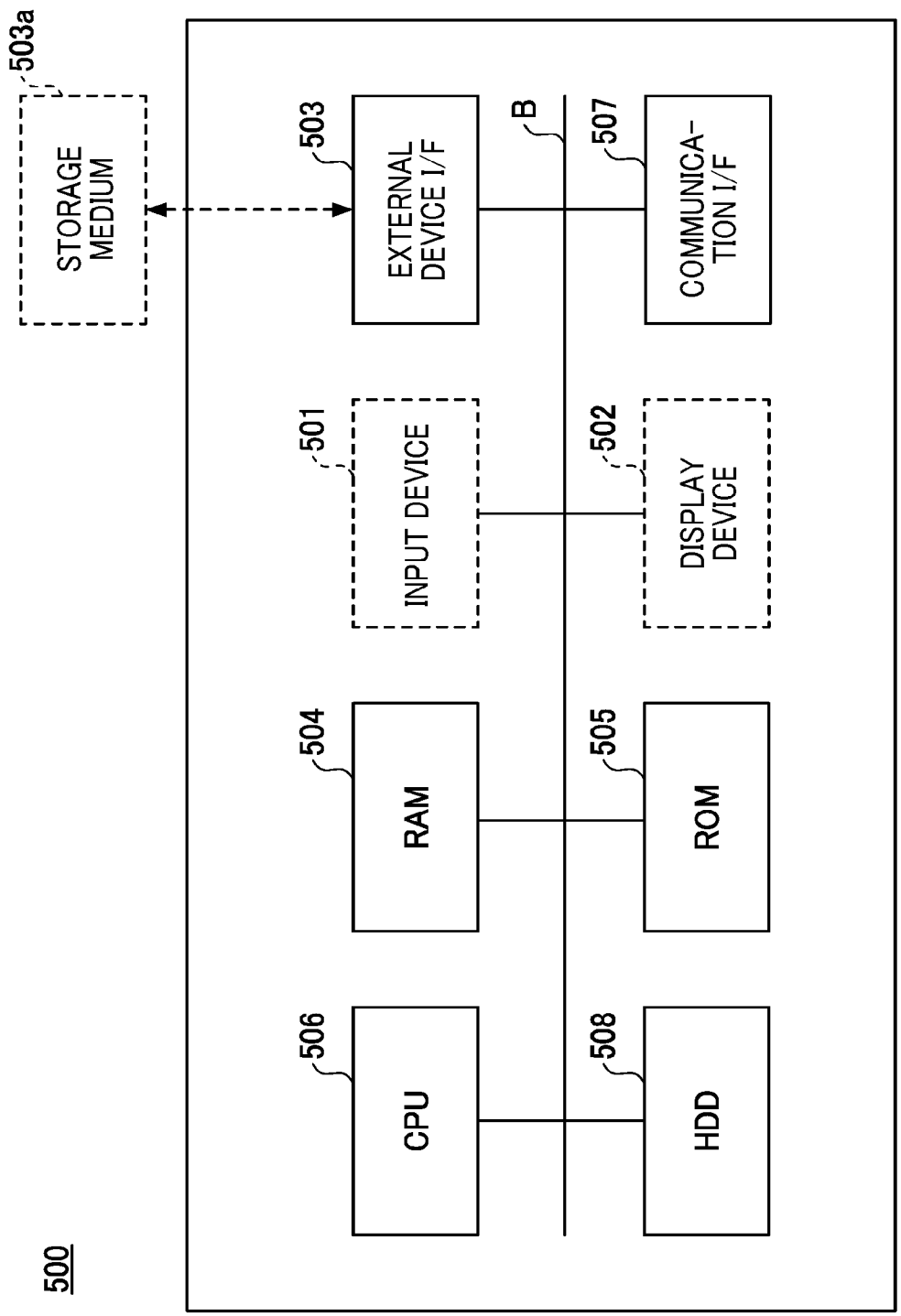
FIG. 2 is a block diagram illustrating an example of hardware configuration of a computer, according to an embodiment of the present disclosure.

Hardware Configuration:

Hardware Configuration of Computer:

Each of the on-premises server apparatus 14 and the cloud workflow server apparatus 22 is implemented by, for example, a computer having a hardware configuration illustrated in FIG. 2. FIG. 2 is a block diagram illustrating an example of hardware configuration of a computer 500, according to the present embodiment.

As illustrated in FIG. 2, the computer 500 includes an input device 501, a display device 502, an external device interface (I/F) 503, a random access memory (RAM) 504, a read only memory (ROM) 505, a central processing unit (CPU) 506, a communication interface (I/F) 507 and a hard disk drive (HDD) 508, which are connected to one another via a bus B. In another example, the input device 501 and the display device 502 can be separate from the computer 500, such that they may be connected to the computer 500 as needed.

The input device 501 includes a keyboard, a mouse, and/or a touch panel enabling a user to input various operation signals. The display device 502 includes a display on which results of processing performed by the computer 500 are displayed.

The communication I/F 507 is an interface that connects the computer 500 to various networks. The computer 500 communicates data with extraneous sources via the communication I/F 507.

The HDD 508 is an example of a nonvolatile storage device storing programs and data. Examples of the programs or data stored in the HDD 508 include an operating system (OS) for controlling entire operation of the computer 500 and programs providing various functions on the OS. In another example, the computer 500 can include, instead of or in addition to the HDD 508, a drive device such as a solid-state drive (SSD) that uses a flash memory as a storage medium.

The external device I/F 503 is an interface that connects the computer 500 to an external device. Examples of the external device include a storage medium 503a. The external device I/F 503 enables the computer 500 to read or write data from or to the storage medium 503a. Examples of the storage medium 503a include a flexible disc, a compact disc (CD), a digital versatile disc (DVD), a secure digital (SD) memory card, and a universal serial bus (USB) memory.

The ROM 505 is an example of a nonvolatile semiconductor memory (storage device), which holds programs and/or data even after the computer 500 is turned off as the power is not supplied. The ROM 505 stores programs and data such as a basic input/output program, which is executed when the computer 500 starts up, OS settings, and network settings. The RAM 504 is an example of a volatile semiconductor memory (storage device) that temporarily stores the programs and data.

The CPU 506 loads programs or data from a storage device such as the ROM 505 and the HDD 508 onto the RAM 504 and executes processes to control entire operation of the computer 500 or implement functions of the computer 500. The on-premises server apparatus 14 and the cloud workflow server apparatus 22 implement various processes as described later with the hardware configuration illustrated in FIG. 2, for example.

Figure 3:
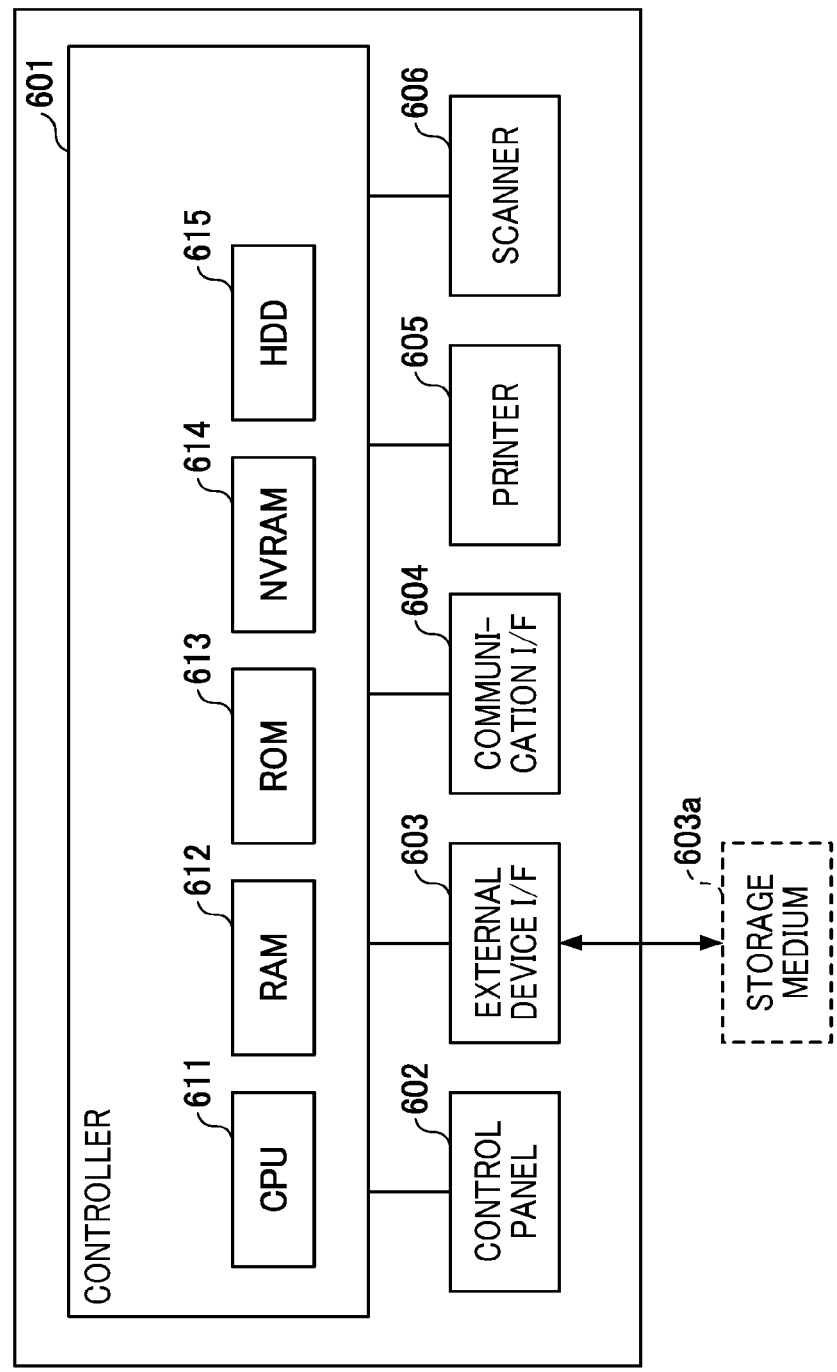
FIG. 3 is a block diagram illustrating an example of a hardware configuration of an image forming apparatus, according to an embodiment of the present disclosure.

Hardware Configuration of Image Forming Apparatus 12:

The image forming apparatus 12 of FIG. 1 is implemented by, for example, a computer having a hardware configuration as illustrated in FIG. 3. FIG. 3 is a block diagram illustrating an example of a hardware configuration of the image forming apparatus 12, according to the present embodiment. As illustrated in FIG. 3, the image forming apparatus 12 includes a controller 601, a control panel 602, an external device I/F 603, a communication I/F 604, a printer 605, and a scanner 606.

The controller 601 includes a CPU 611, a RAM 612, a ROM 613, a non-volatile random-access memory (NVRAM) 614, and an HDD 615. The ROM 613 stores various programs and data. The RAM 612 temporarily stores programs and data. The NVRAM 614 stores, for example, setting information. The HDD 615 stores various programs and data.

The CPU 611 loads the programs, data, or setting information from the ROM 613, the NVRAM 614, the HDD 615, etc., onto the RAM 612 and executes processes to control entire operation of the image forming apparatus 12 or implement functions of the image forming apparatus 12.

The control panel 602 includes an input unit that receives a user input, and a display unit that displays various types of information. The external device I/F 603 is an interface that connects the image forming apparatus 12 to an external device. Examples of the external device include a storage medium 603a. The external device I/F 603 enables the image forming apparatus 12 to read or write data from or to the storage medium 603a. Examples of the storage medium 603a include an integrated circuit (IC) card, a flexible disc, a CD, a DVD, a SD memory card, and a USB memory.

The communication I/F 604 is an interface that connects the image forming apparatus 12 to the network 18. The image forming apparatus 12 communicates data with extraneous sources via the communication I/F 604. The printer 605 is a printing device that forms an image on a sheet of paper in accordance with print data. The scanner 606 is a reading device that scans a document to obtain image data (electronic data).

Functional Configuration:

A description is given below of a functional configuration of the information processing system 1, according to the present embodiment. In the following description, a workflow of the user environment 10 is referred to as an "on-premises workflow", and a workflow of the cloud environment 20 is referred to as a "cloud workflow".

Figure 4:
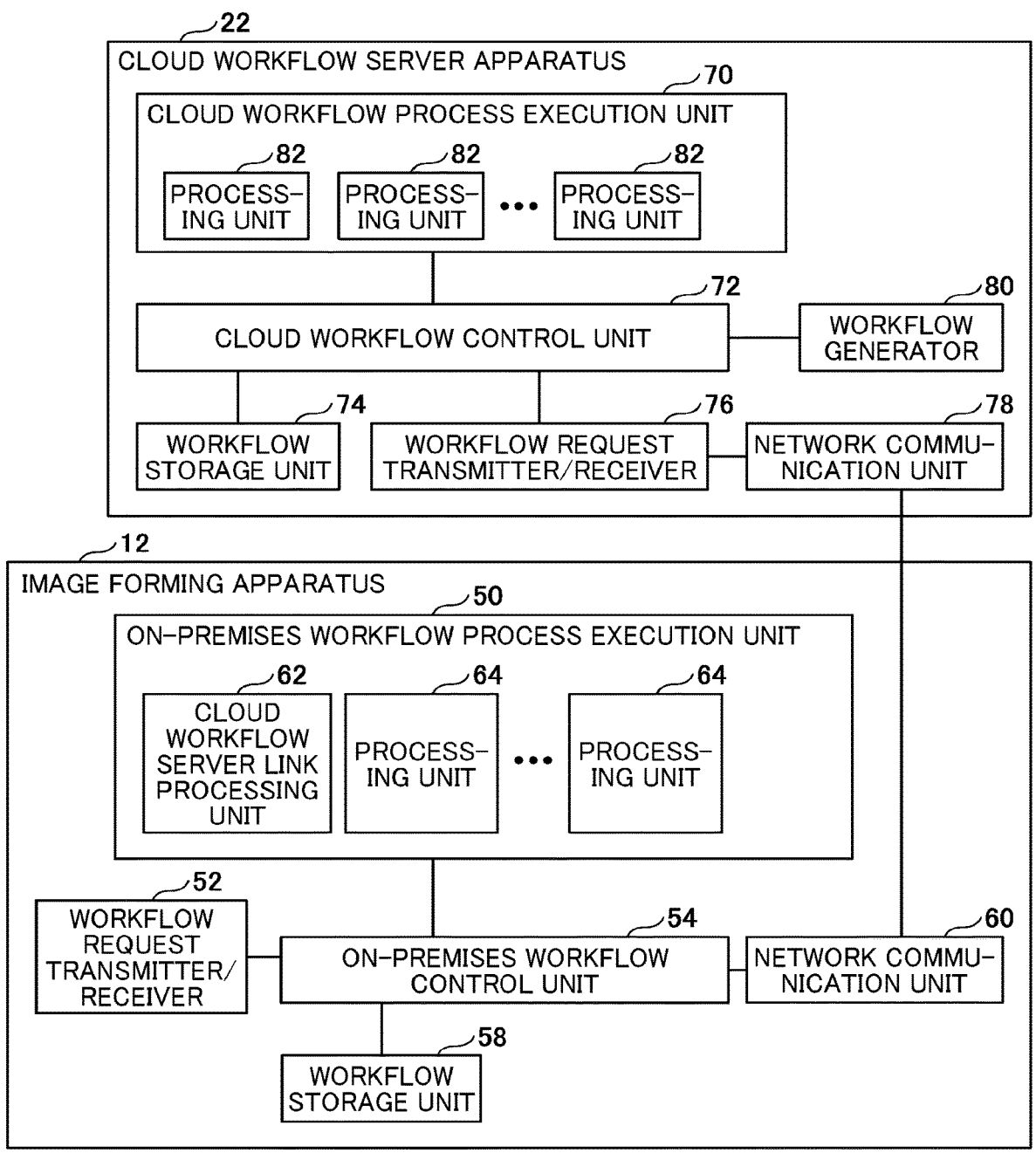
FIG. 4 is a block diagram illustrating an example of a functional configuration of the information processing system, according to an embodiment of the present disclosure.

FIG. 4 is a block diagram illustrating an example of a functional configuration of the information processing system 1 according to the present embodiment. In the functional configuration diagram of FIG. 4, the on-premises server apparatus 14 and the firewall 16 are omitted, in order to simplify the drawing. The image forming apparatus 12 includes an on-premises workflow process execution unit 50, a workflow request transmitter/receiver 52, an on-premises workflow control unit 54, a workflow storage unit 58, and a network communication unit 60.

The on-premises workflow process execution unit 50 includes a cloud workflow server link processing unit 62 and one or more processing units 64. As described later, the cloud workflow server link processing unit 62 requests the cloud workflow server apparatus 22 to execute a cloud workflow and acquires a result of the cloud workflow from the cloud workflow server apparatus 22.

The cloud workflow server link processing unit 62 receives the request from the on-premises workflow control unit 54 and sends the request for execution to the cloud workflow server apparatus 22. The cloud workflow server link processing unit 62 specifies information for identifying a workflow to be executed in the cloud environment 20, such as identification information (workflow ID) for identifying the cloud workflow, and requests execution of the cloud workflow that is identified. The cloud workflow server link processing unit 62 notifies the on-premises workflow control unit 54 of a result of the execution of the cloud workflow acquired from the cloud workflow server apparatus 22. As described later, the cloud workflow server link processing unit 62 sends a request for acquisition of the result of the execution of the cloud workflow to the cloud workflow server apparatus 22, to acquire the result. In another example, the result of the execution of the cloud workflow can be automatically transmitted from the cloud workflow server apparatus 22 to the image forming apparatus 12.

Each processing unit 64 executes a process in the user environment 10, such as SMB (Server Message Block) transmission processing and FTP (File Transfer Protocol) transmission processing as described later. The processing unit 64 executes specific processing content in response to a request from the on-premises workflow control unit 54. Further, the processing unit 64 notifies the on-premises workflow control unit 54 of a result of the execution. The processing unit 64 executes any predetermined specific processing contents, and the processing contents are not limited to the SMB transmission processing and the FTP transmission processing. For example, the processing unit 64 can perform OCR processing and file conversion processing in the same or substantially the same manner as a processing unit 82, which is to be described later.

The on-premises workflow control unit 54 reads out workflow information stored in the workflow storage unit 58. Further, the on-premises workflow control unit 54 invokes the cloud workflow server link processing unit 62 and the processing unit 64 of the on-premises workflow process execution unit 50 in an order defined by the read-out workflow information, to control execution of an on-premises workflow. Thus, the on-premises workflow control unit 54 causes at least one processing unit 64 to execute processing based on the execution result of the cloud workflow received by the cloud workflow server link processing unit 62. Accordingly, a workflow is executed in the cloud environment 20, and further processing is executed in the user environment 10 based on the execution result of processing executed in the cloud environment 20.

The workflow storage unit 58 stores workflow information indicating a workflow to be executed in at least the user environment 10. Alternatively, the workflow storage unit 58 can store a workflow to be executed in the cloud environment 20 as well as the workflow to be executed in the user environment 10. The workflow request transmitter/receiver 52 receives a request requesting execution of a workflow from a workflow application described later and transmits a result of the execution of the workflow to the workflow application as needed. The network communication unit 60 performs network communication with the cloud workflow server apparatus 22.

These units are functions that are implemented by or that are caused to function by operating any of the hardware elements illustrated in FIG. 3 in cooperation with the instructions of the CPU 611 according to the program or setting information expanded from the ROM 613, the NVRAM 614 and/or the HDD 615 to the RAM 612.

The cloud workflow server apparatus 22 includes a cloud workflow process execution unit 70, a cloud workflow control unit 72, a workflow storage unit 74, a workflow request transmitter/receiver 76, a network communication unit 78, and a workflow generator 80. In addition, the cloud workflow process execution unit 70 includes one or more processing units 82.

The processing unit 82 executes processes in the cloud environment 20, such as OCR (optical character recognition) processing, file conversion processing, and transmission processing to a storage service as described later. The processing unit 82 executes specific processing content in response to a request from the cloud workflow control unit 72. Further, the processing unit 82 notifies the cloud workflow control unit 72 of a result of the execution of the processing. The processing unit 82 executes any predetermined specific processing contents, and the processing contents are not limited to the OCR processing, the file conversion processing, and the transmission processing to a storage service. For example, the processing unit 82 can perform file transmission processing in the same or substantially the same manner as the processing unit 64. The cloud workflow control unit 72 reads out workflow information stored in the workflow storage unit 74 based on the information for identifying a workflow specified by the cloud workflow server link processing unit 62. Further, the cloud workflow control unit 72 invokes the processing unit 82 of the cloud workflow process execution unit 70 in an order defined by the read-out workflow information, to control execution of a cloud workflow.

The workflow storage unit 74 stores workflow information. In one example, the workflow information to be executed in the cloud environment 20 can be included in the information itself for identifying the workflow. In this case, the cloud workflow control unit 72 does not need to read out the workflow information from the workflow storage unit 74.

The workflow request transmitter/receiver 76 receives a request requesting execution of the cloud workflow from the image forming apparatus 12 and transmits a result of the execution of the cloud workflow to the image forming apparatus 12 as a request source. The network communication unit 78 performs network communication with the image forming apparatus 12.

The workflow generator 80 receives an instruction for generating a workflow as described later from a personal computer (PC) or the like operated by a user and generates the workflow information of the cloud workflow and the workflow information of the on-premises workflow. Further, the workflow generator 80 stores the generated workflow information in the workflow storage unit 74. The image forming apparatus 12 acquires the workflow information of the on-premises workflow from the workflow storage unit 74 of the cloud workflow server apparatus 22 and stores the acquired workflow information in the workflow storage unit 58.

These units are functions that are implemented by or that are caused to function by operating any of the hardware elements illustrated in FIG. 2 in cooperation with the instructions of the CPU 506 according to the program and/or data expanded from the ROM 505 and/or the HDD 508 to the RAM 504.

In another example, a workflow generator is provided in the image forming apparatus 12, and the workflow information of the on-premises workflow is generated by operating the workflow generator.

Linkage Between On-Premises Workflow and Cloud Workflow

FIG. 5 is a diagram for explaining an example of an operation in which an on-premises workflow and a cloud workflow are linked with each other. FIG. 5 illustrates, as an example of an operation in which an on-premises workflow and a cloud workflow are linked with each other, an operation in which image data obtained through scanning is transmitted by SMB and a PDF file on which OCR processing has been performed and a stamp has been printed is transmitted by FTP.

In the example of FIG. 5, the on-premises workflow control unit 54 invokes a SMB transmission processing unit, a cloud workflow server link processing unit, an authentication processing unit of an FTP server apparatus, and an FTP transmission processing unit of the on-premises workflow process execution unit 50, to execute a on-premises workflow. A cloud workflow to be executed by the cloud workflow process execution unit 70 is linked to the on-premises workflow by being invoked from the cloud workflow server link processing unit of the on-premises workflow process execution unit 50.

In order to implement the link between the cloud workflow and the on-premises workflow, the cloud workflow server apparatus 22 registers a cloud workflow (in the order of PDF conversion process, OCR process, and stamp process) in advance. Then, the cloud workflow server link processing unit sends a request for execution of the cloud workflow to the cloud workflow server apparatus 22 together with a parameter specifying the cloud workflow. This implements a link (cooperative operation) with the cloud workflow. For example, the parameter specifying the cloud workflow is previously set. Alternatively, the parameter can be changed each time the on-premises workflow is input.

The association between an on-premises workflow and a cloud workflow can be performed as illustrated in FIG. 6, for example. FIG. 6 is a diagram for explaining an example of association between an on-premises workflow and a cloud workflow. FIG. 6 illustrates an example of a table in which on-premises workflows and cloud workflows are associated with each other in advance, in a case where the cloud workflow is to be invoked from the cloud workflow server link processing unit 62.

Examples of a workflow application that executes a workflow include a web application that is displayed on the image forming apparatus 12 and executed. In a case where an on-premises workflow and a cloud workflow are determined for each workflow application, each workflow application holds an on-premises workflow ID and a cloud workflow ID, so that the on-premises workflow and the cloud workflow are invoked appropriately. The on-premises workflow ID is an example of information uniquely identifying an on-premises workflow. The cloud workflow ID is an example of information uniquely identifying a cloud workflow.

In the example of FIG. 6, the on-premises workflow ID and the cloud workflow ID set in the same row are associated with each other. According to the example of table of FIG. 6, when the workflow application invokes an on-premises workflow whose on-premises workflow ID is "onpre_A00001", the cloud workflow server link processing unit 62 invokes a cloud workflow whose cloud workflow ID is "cloud_ZZ08001".

For example, the workflow application can hold one on-premises workflow ID and one cloud workflow ID associated with each other. In another example, the workflow application can hold a plurality of combinations of one on-premises workflow ID and one cloud workflow ID associated with each other. Alternatively, the workflow application can hold one on-premises workflow ID, and workflow information corresponding to the on-premises workflow ID can include a cloud workflow ID.

Details of Operation:

Hereinafter, a detailed description is given of an operation performed by the information processing system 1, according to the present embodiment.

Generating Workflow Information:

FIG. 7 is an illustration of an example of a workflow information generation screen 1000. The workflow information generation screen 1000 of FIG. 7 includes a processing unit list display area 1002 and a workflow generation area 1004. In the processing unit list display area 1002, a list of processing units for an on-premises workflow and a list of processing units for a cloud workflow are displayed. The workflow generation area 1004 is used to generate an on-premises workflow and a cloud workflow by arranging the processing units in the lists displayed in the processing unit list display area 1002 in order through dragging and dropping operations.

In the workflow generation area 1004 of FIG. 7, processing contents of the on-premises workflow to be executed by the image forming apparatus 12 are displayed in the lower row and processing contents of the cloud workflow to be executed by the cloud workflow server apparatus 22 is displayed in the upper row. In the example of FIG. 7, the link between the on-premises workflow and the cloud workflow is indicated by an arrow 1010 representing a request from the image forming apparatus 12 to the cloud workflow server apparatus 22 and an arrow 1014 representing acquisition of a result from the cloud workflow server apparatus 22.

The arrow 1010 is an arrow directed from a display component 1006 representing the cloud workflow server link processing unit to a display component 1008 representing a PDF conversion processing unit. The arrow 1014 is an arrow directed from a display component 1012 representing a stamp processing unit to the display component 1006 representing the cloud workflow server link processing unit.

For example, according to the workflow generated in the workflow generation area 1004 illustrated in FIG. 7, an SMB transmission process in the on-premises workflow is performed first, and thereafter the cloud workflow according to which a PDF conversion process, an OCR process, and a stamp process is invoked by a cloud workflow server link process. Thereafter, the cloud workflow server link process acquires the result from the cloud workflow, and performs processes remaining in the on-premises workflow, i.e., an authentication process and an FTP transmission process.

Thus, the workflow generator 80 of the cloud workflow server apparatus 22 generates workflow information based on the workflow generated using the workflow generation area 1004 and stores the workflow information in the workflow storage unit 58 and the workflow storage unit 74.

Figure 8A:
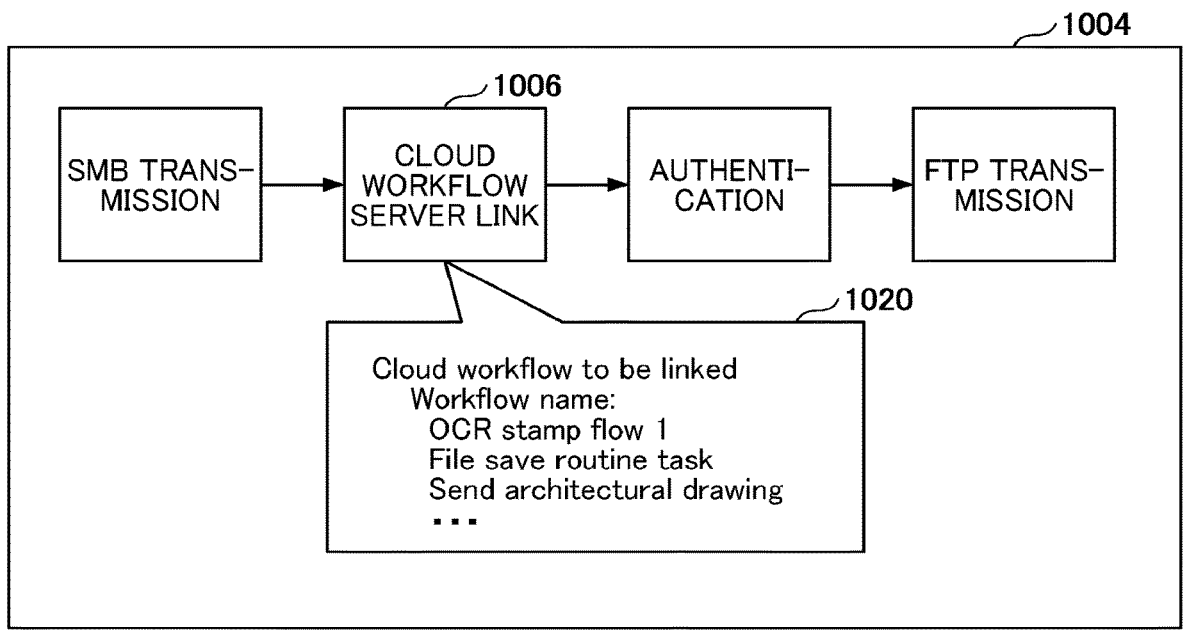
FIGS. 8A and 8B are illustrations of another example of the workflow information generation screen, according to an embodiment of the present disclosure.
Figure 8B:
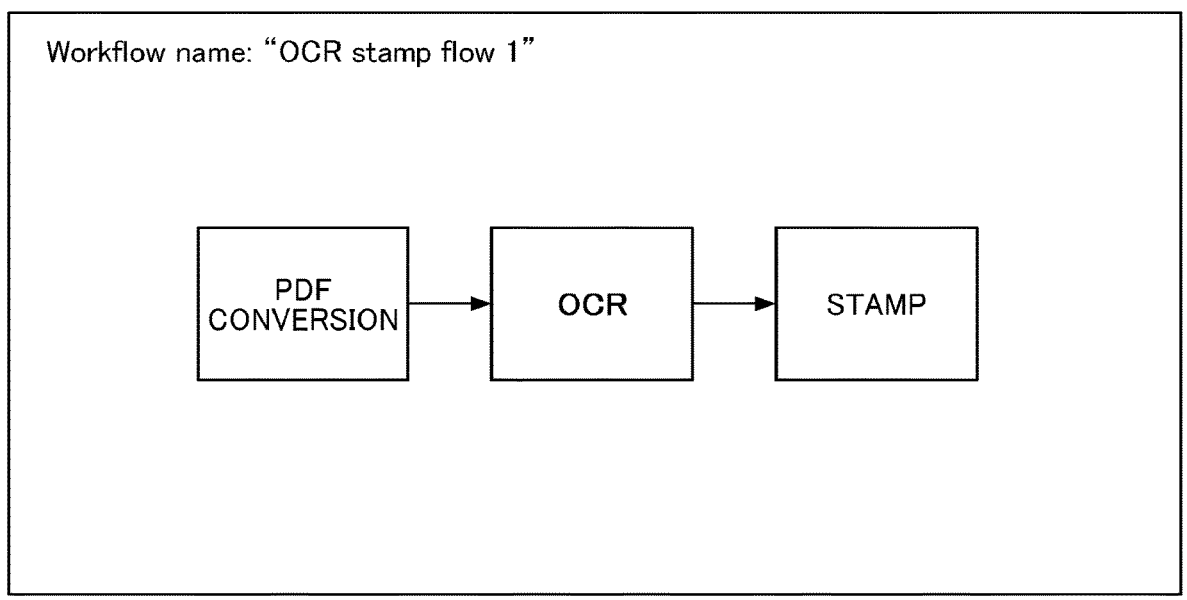

The workflow information generation screen 1000 illustrated in FIG. 7 is one example. Alternatively, the workflow information generation screen 1000 can include the workflow generation area 1004 as illustrated in FIG. 8A, for example. FIG. 8A is an illustration of another example of the workflow information generation screen 1000. When using the workflow information generation screen 1000 of FIG. 8A, a cloud workflow as illustrated in FIG. 8B, for example, needs to be registered in the cloud workflow server apparatus 22. To the cloud workflow illustrated in FIG. 8B, information for uniquely identifying the cloud workflow such as a workflow name "OCR stamp flow 1" is assigned.

FIG. 8A illustrates the workflow generation area 1004 of the workflow information generation screen 1000. In the workflow generation area 1004 of FIG. 8A, an on-premises workflow including a cloud workflow server link process is generated. In the example of FIG. 8A, when a user performs an operation such as clicking the display component 1006 representing the cloud workflow server link processing unit, a cloud workflow selection field 1020 for selecting a workflow to be linked is displayed. A user can select a desired cloud workflow to be linked from a list of workflow names displayed in the cloud workflow selection field 1020. The list of workflow names displayed in the cloud workflow selection field 1020 includes workflow names of workflows registered in the cloud workflow server apparatus 22.

According to the on-premises workflow illustrated in FIG. 8A, the cloud workflow having a workflow name "OCR stamp flow 1" is invoked through cloud workflow server link process so that the cloud workflow is linked.

In still another example, the workflow information generation screen 1000 as illustrated in FIG. 9 can be used instead of the workflow information generation screen 1000 as illustrated in FIG. 7. FIG. 9 is an illustration of another example of the workflow information generation screen 1000. The workflow information generation screen 1000 of FIG. 9 displays processing contents of the cloud workflow to be invoked through the cloud workflow server link process in a dialogue balloon from the display component 1006 representing the cloud workflow server link processing unit. According to the example of FIG. 9, when generating the workflow information, information indicating how the on-premises workflow and the cloud workflow are linked with each other are visually presented to a user.

FIGS. 10A and 10B are diagrams illustrating an example of a configuration of the workflow information. The workflow information includes a processing order, a processing unit and a parameter. FIG. 10A is an example of workflow information of the on-premises workflow. FIG. 10B is an example of workflow information of the cloud workflow.

The workflow information of FIG. 10A indicates that the on-premises workflow is executed in the order of an SMB processing unit, the cloud workflow server link processing unit 62, an authentication processing unit, and an FTP transmission processing unit. In the workflow information of FIG. 10B, the processing order of the cloud workflow is defined in substantially the same manner as FIG. 10A. In addition, in the workflow information of FIG. 10B, parameters are set that designate a size "A4" for the PDF conversion processing and designating a language "Japanese" for the OCR processing. These parameters are not necessarily set in the workflow information. For example, the parameters can be set by arguments from the workflow application, which is a source that invokes the workflow.

Figure 11:
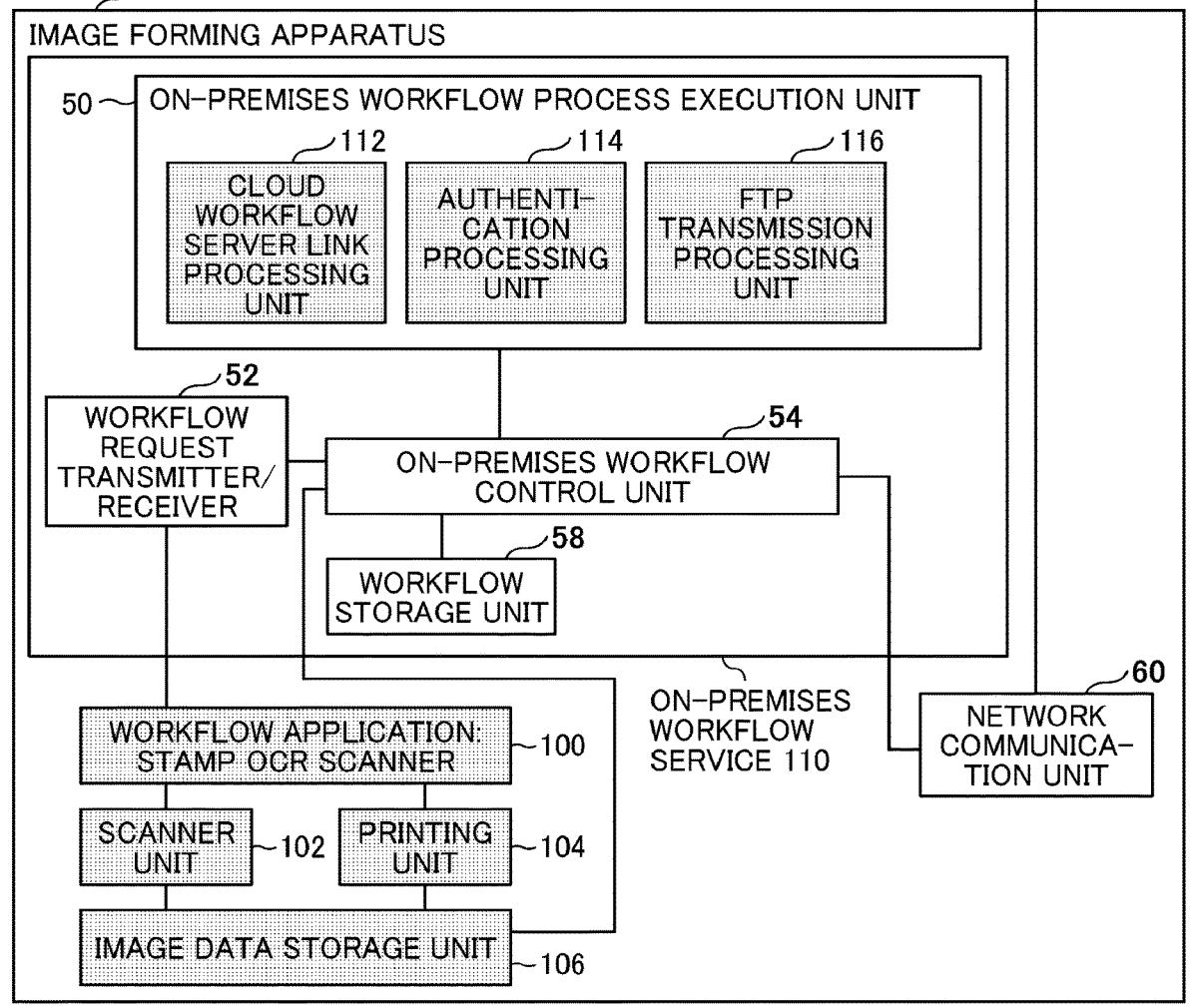
FIG. 11 is a block diagram illustrating an example of a functional configuration of the information processing system that performs a workflow with a workflow application that uses a scanner unit, according to an embodiment of the present disclosure.

Execution of Workflow:

FIG. 11 is a block diagram illustrating an example of a functional configuration of the information processing system 1 that performs a workflow with the workflow application that uses a scanner unit. More specifically, FIG. 11 illustrates an example of a functional configuration in which a workflow application 100 is a "stamp OCR scanner", and image data obtained by scanning is converted to a PDF file that includes text data as a result of OCR processing and stamped characters "CONFIDENTIAL" and the PDF file is transmitted by FTP.

Since a part of the functional configuration illustrated in FIG. 11 is the same as the functional configuration illustrated in FIG. 4, the redundant description thereof is omitted below. The "stamp OCR scanner" application, which is an example of the workflow application 100, is an application installed in the image forming apparatus 12. For example, the "stamp OCR scanner" application is a web application. In another example, the "stamp OCR scanner" is a native application. The workflow application 100 internally holds, for example, an on-premises workflow ID of the on-premises workflow to be executed and a cloud workflow ID of the cloud workflow to be executed.

The workflow application 100 includes a user interface (UI) through which a user can input an instruction for operation and means for setting a job and executing a job. For example, the workflow application 100 can receive setting of scanning resolution, scanning size, color, etc., and an instruction for starting execution of a scan job from the user.

A scanner unit 102, which is implemented by, for example, the scanner 606, executes scanning. A printing unit 104, which is implement by, for example, the printer 605, executes printing. An image data storage unit 106 stores image data. For example, the image data storage unit 106 stores image data obtained by scanning by the scanner unit 102 and image data to be printed by the printing unit 104.

A workflow service provided by the image forming apparatus 12 is referred to as an on-premises workflow service 110.

The on-premises workflow process execution unit 50 of the on-premises workflow service 110 includes a cloud workflow server link processing unit 112, an authentication processing unit 114, and an FTP transmission processing unit 116. The authentication processing unit 114 performs FTP authentication processing. FIG. 11 illustrates an example in which the authentication processing unit 114 acquires a connection destination and an authentication account from the cloud workflow server apparatus 22. In another example, the connection destination and the authentication account can be read out from information stored in the image forming apparatus 12. The FTP transmission processing unit 116 executes FTP transmission processing.

These units are functions that are implemented by or that are caused to function by operating any of the hardware elements illustrated in FIG. 3 in cooperation with the instructions of the CPU 611 according to the program or setting information expanded from the ROM 613, the NVRAM 614 and/or the HDD 615 to the RAM 612.

The cloud workflow process execution unit 70 includes a PDF conversion processing unit 120, an OCR processing unit 122, and a stamp processing unit 124. The PDF conversion processing unit 120 converts a file into a file in a PDF format. The OCR processing unit 122 performs OCR processing. The stamp processing unit 124 adds a stamp to image data obtained by scanning. An authentication information management unit 130 manages and stores connection destinations and authentication accounts used for the FTP authentication processing.

These units are functions that are implemented by or that are caused to function by operating any of the hardware elements illustrated in FIG. 2 in cooperation with the instructions of the CPU 506 according to the program and/or data expanded from the ROM 505 and/or the HDD 508 to the RAM 504.

The functional configuration of the image forming apparatus 12 illustrated in FIG. 11 is just an example. In another example, in a case where the image forming apparatus 12 includes a main unit and an operation unit separated from the main unit, the scanner unit 102, the printing unit 104, and the image data storage unit 106 are provided in the main body, and the remaining functional units are provided in the operation unit.

When the information processing system 1 has the functional configuration as illustrated in FIG. 11, contents of the workflow information are as illustrated in FIGS. 12A and 12B, for example. FIGS. 12A and 12B are diagrams illustrating an example of a configuration of the workflow information. FIG. 12A is an example of the workflow information of the on-premises workflow. FIG. 12B is an example of the workflow information of the cloud workflow.

The workflow information of FIG. 12A indicates that the on-premises workflow is executed in the order of the cloud workflow server link processing unit 112, the authentication processing unit 114, and the FTP transmission processing unit 116. The workflow information of FIG. 12B is the same as the workflow information of FIG. 10B. The workflow information of FIG. 12B indicates that the cloud workflow is executed in the order of the PDF conversion processing unit 120, the OCR processing unit 122, and the stamp processing unit 124.

Figure 13A:
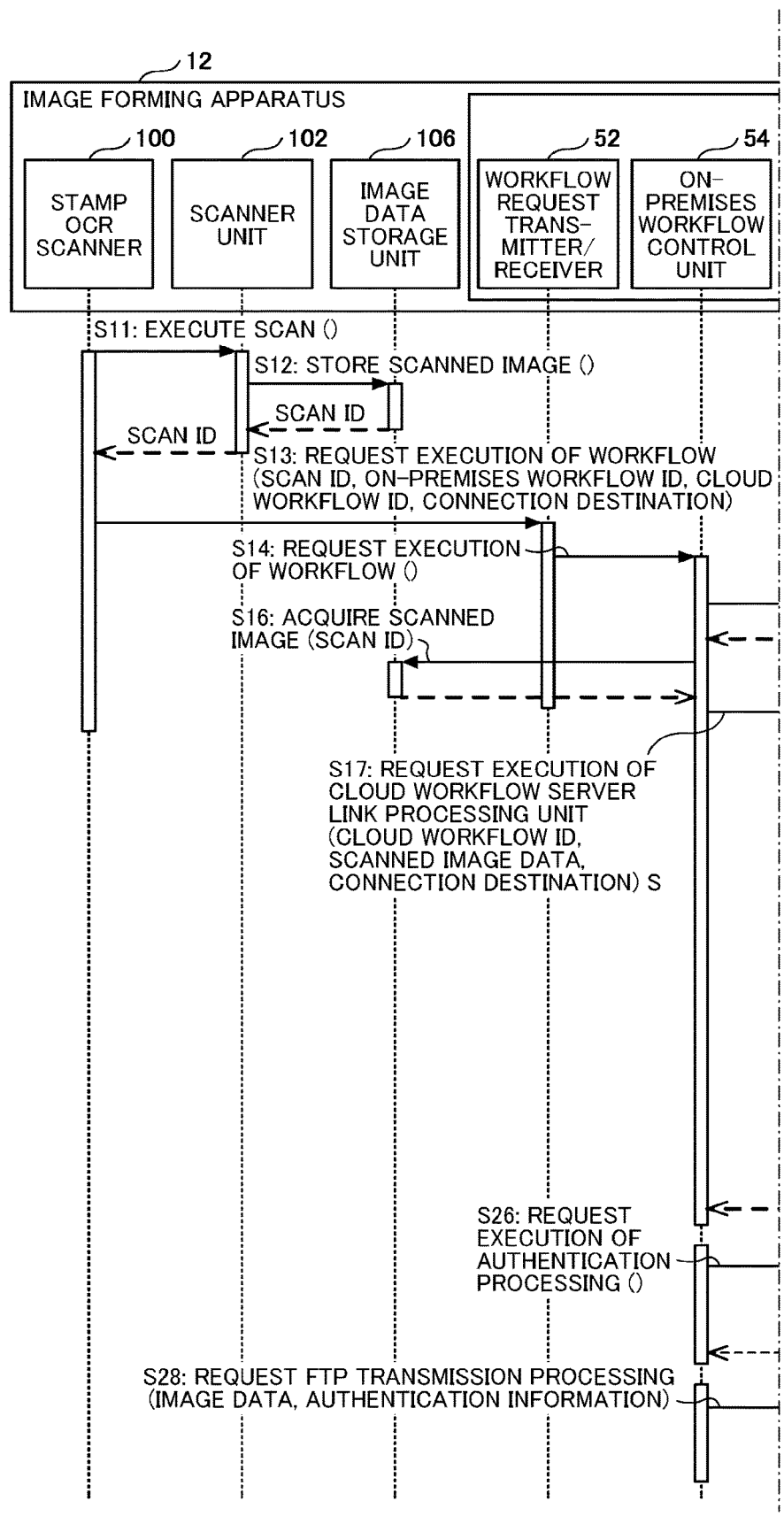
Figure 13B:
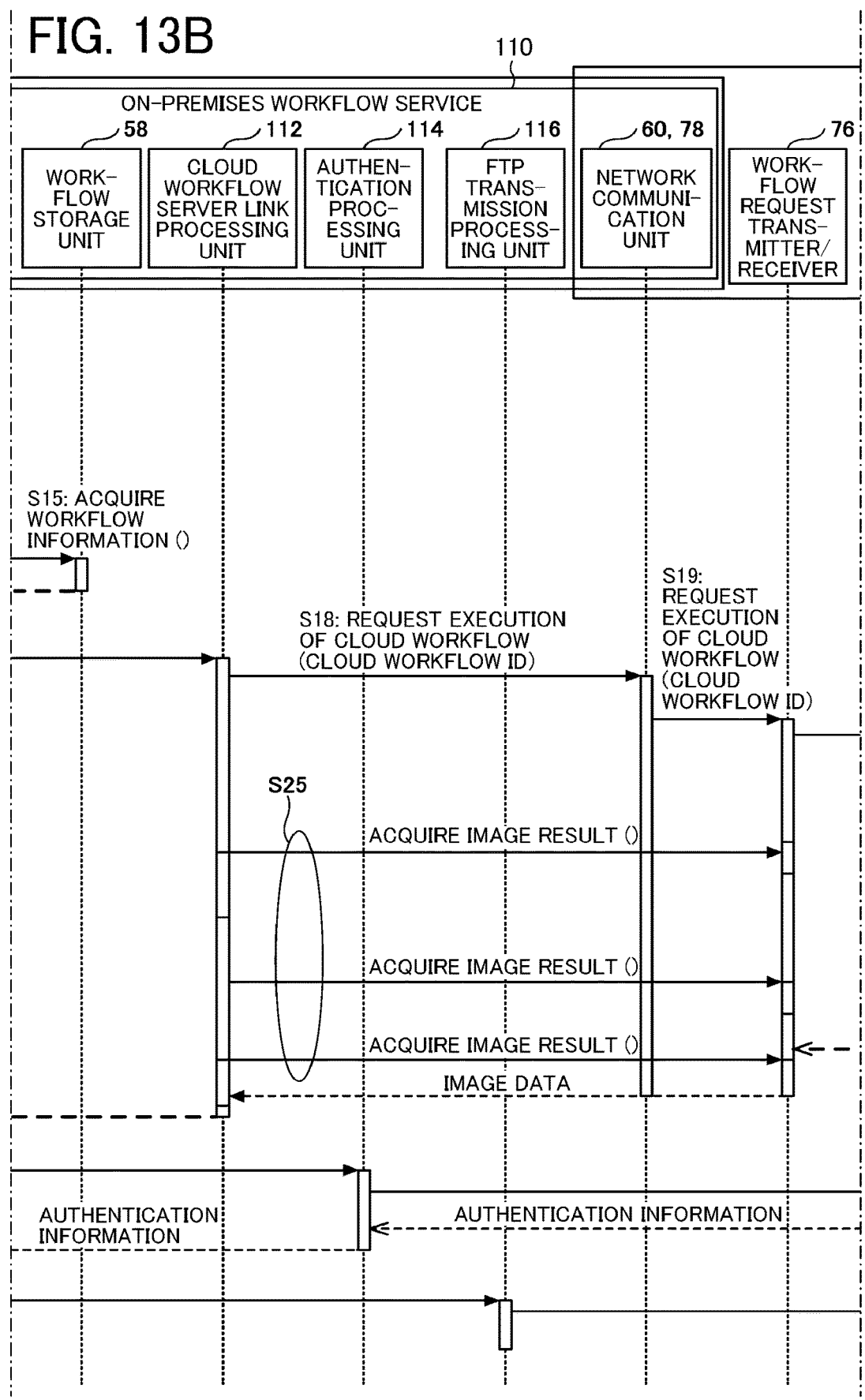

FIGS. 13A, 13B, and 13C (FIG. 13) are a sequence diagram of an example of a workflow that uses the scanner unit 102. In step S11, the workflow application 100 of "Stamp OCR Scanner" requests the scanner unit 102 to execute scanning. The scanner unit 102 executes scanning. In step S12, the scanner unit 102 stores scanned image data obtained by scanning in the image data storage unit 106 and acquires a scan ID associated with the scanned image data.

In step S13, the workflow application 100 specifies the acquired scan ID, the on-premises workflow ID and the cloud workflow ID held by itself, and a connection destination, to request the on-premises workflow service 110 to execute a workflow. The operation proceeds to step S14, and the workflow request transmitter/receiver 52 of the on-premises workflow service 110 requests the on-premises workflow control unit 54 to execute the workflow.

In step S15, the on-premises workflow control unit 54 specifies the on-premises workflow ID to acquire the workflow information from the workflow storage unit 58. The operation proceeds to step S16, and the on-premises workflow control unit 54 acquires the scanned image data associated with the scan ID from the image data storage unit 106. In another example, the processes in steps S15 and S16 can be performed in a reverse order or simultaneously.

The on-premises workflow control unit 54 executes workflow processes in order defined by the workflow information acquired in step S15. First, in step S17, the on-premises workflow control unit 54 specifies the cloud workflow ID and the scanned image data, to request the cloud workflow server link processing unit 112 to execute processing. In step S18, the cloud workflow server link processing unit 112 specifies the cloud workflow ID, the connection destination, and the scanned image data, to send a request for execution of the cloud workflow to the cloud workflow server apparatus 22.

In step S19, the workflow request transmitter/receiver 76 of the cloud workflow server apparatus 22 receives the cloud workflow execution request from the image forming apparatus 12. The operation proceeds to step S20, and the workflow request transmitter/receiver 76 sends, to the cloud workflow control unit 72, the cloud workflow execution request received from the image forming apparatus 12.

In step S21, the cloud workflow control unit 72 specifies the cloud workflow ID to acquire workflow information from the workflow storage unit 74. The cloud workflow control unit 72 sequentially executes processes of the workflow according to the workflow information acquired in step S21.

First, in step S22, the cloud workflow control unit 72 specifies the scanned image data, to request the PDF conversion processing unit 120 to perform PDF conversion processing. Next, the operation proceeds to step S23, and the cloud workflow control unit 72 requests the OCR processing unit 122 to perform OCR processing on the scanned image data. Next, the operation proceeds to step S24, and the cloud workflow control unit 72 requests the stamp processing unit 124 to perform stamp processing on the scanned image data.

When all of the processes in the workflow information acquired in step S21 are completed, the cloud workflow control unit 72 transmits the image data, which is a result of the cloud workflow, to the workflow request transmitter/receiver 76.

After sending the cloud workflow execution request to the cloud workflow server apparatus 22 in step S18, the cloud workflow server link processing unit 112 of the image forming apparatus 12 performs polling, to request acquisition of an image result in step S25. FIG. 13 illustrates an example in which the image forming apparatus 12 polls the cloud workflow server apparatus 22 to request acquisition of the image result. In another example, the cloud workflow server apparatus 22 can perform push delivery to the image forming apparatus 12. After receiving the image data, which is the result of the cloud workflow, the cloud workflow server apparatus 22 transmits the image data, which is the result of the cloud workflow, in response to receiving the image result acquisition request from the cloud workflow server link processing unit 112 of the image forming apparatus 12.

The operation proceeds to step S26, and the on-premises workflow control unit 54 of the image forming apparatus 12 requests the authentication processing unit 114 to execute processing. The operation proceeds to step S27, and the authentication processing unit 114 acquires the authentication information from the authentication information management unit 130 of the cloud workflow server apparatus 22. The operation proceeds to step S28, and the on-premises workflow control unit 54 specifies the image data and the authentication information, to request the FTP transmission processing unit 116 to execute processing. The operation proceeds to step S29, and the FTP transmission processing unit 116 stores the image data in the on-premises server apparatus 14 using the specified authentication information.

As described heretofore, since the connection destination is specified, the cloud workflow server link processing unit 112 according to the present embodiment accesses directly to the cloud workflow server apparatus 22, to transit from the on-premises workflow to the cloud workflow. Accordingly, efficiency of workflow execution is improved. For example, according to a method in which the cloud workflow and the on-premises workflow are separately invoked successively by using the workflow application 100, the workflow application 100 needs to acquire results such as image data each time. This makes a data communication path complicated. In addition, when creating a workflow, the workflow needs to be divided at a point where the calling of the cloud workflow and the calling of the on-premises workflow are switched. This makes the creation of the workflow complicated.

Therefore, in the information processing system 1 according to the present embodiment, the cloud workflow server apparatus 22 is accessed directly from the on-premises workflow service 110, not from the workflow application 100. This makes a processing route less complicated compared with a route via the workflow application 100.

According to the present embodiment, by providing a processing unit that calls a cloud workflow and acquires a result of the cloud workflow as a part of processing units of the on-premises workflow that uses the scanner unit 102, the on-premises workflow and the cloud workflow are linked with each other.

Second Embodiment

In the first embodiment, the information processing system 1 executes a workflow with the workflow application 100 that uses the scanner unit 102. The information processing system 1 according to the second embodiment executes a workflow with the workflow application 100 that uses the printing unit 104. Since the second embodiment is the same as the first embodiment in a part, the redundant description is omitted below.

Figure 14A:
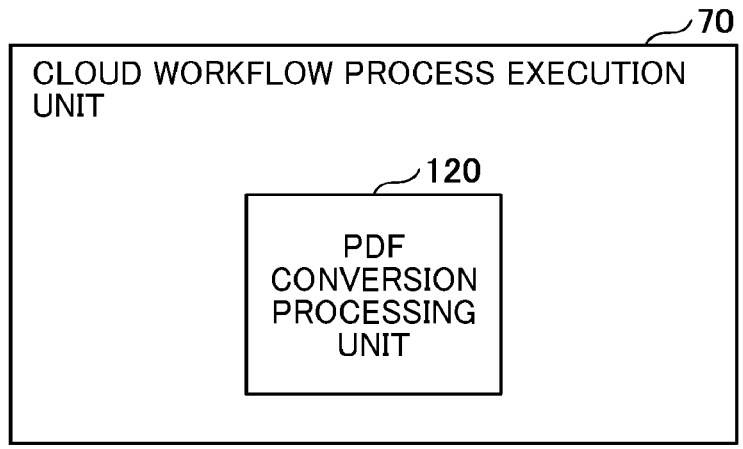
FIGS. 14A, 14B and 14C are diagrams illustrating an example of a functional configuration of the information processing system that performs a workflow with the workflow application that uses a printing unit, according to an embodiment of the present disclosure.
Figure 14B:
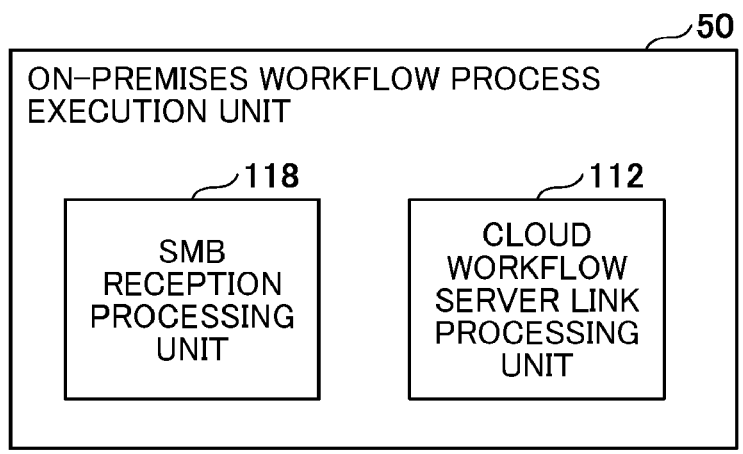
Figure 14C:
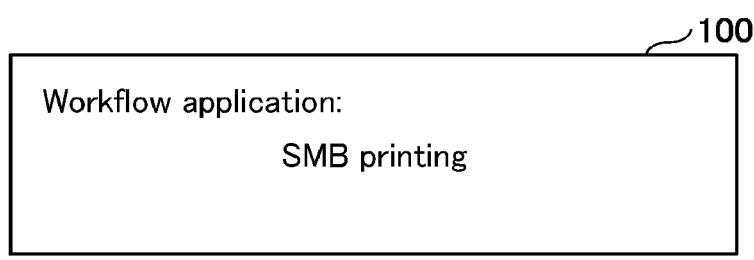

FIGS. 14A, 14B and 14C are diagrams illustrating an example of a functional configuration of the information processing system 1 that performs a workflow with the workflow application 100 that uses the printing unit 104. FIGS. 14A, 14B and 14C illustrate differences from the functional configuration of the first embodiment illustrated in FIG. 11.

FIG. 14A indicates that the cloud workflow process execution unit 70 includes the PDF conversion processing unit 120. FIG. 14B indicates that the on-premises workflow process execution unit 50 includes the cloud workflow server link processing unit 112 and an SMB reception processing unit 118. In addition, FIG. 14C indicates that the workflow application 100 is an application of "SMB printing".

An application of "SMB printing", which is an example of the workflow application 100, uses a workflow that acquires an application file in the on-premises server apparatus 14 by SMB communication, converts the file into a PDF file, and prints the PDF file.

When the information processing system 1 has the functional configuration as illustrated in FIGS. 14A, 14B and 14C, contents of the workflow information are as illustrated in FIGS. 15A and 15B, for example. FIGS. 15A and 15B are diagrams illustrating an example of a configuration of the workflow information. FIG. 15A is an example of the workflow information of the on-premises workflow. FIG. 15B is an example of the workflow information of the cloud workflow.

The workflow information of FIG. 15A indicates that the on-premises workflow is executed in the order of the SMB reception processing unit 118 and the cloud workflow server link processing unit 112. Further, the workflow information in FIG. 15B indicates that a PDF conversion process is performed in the cloud workflow.

Figure 16A:
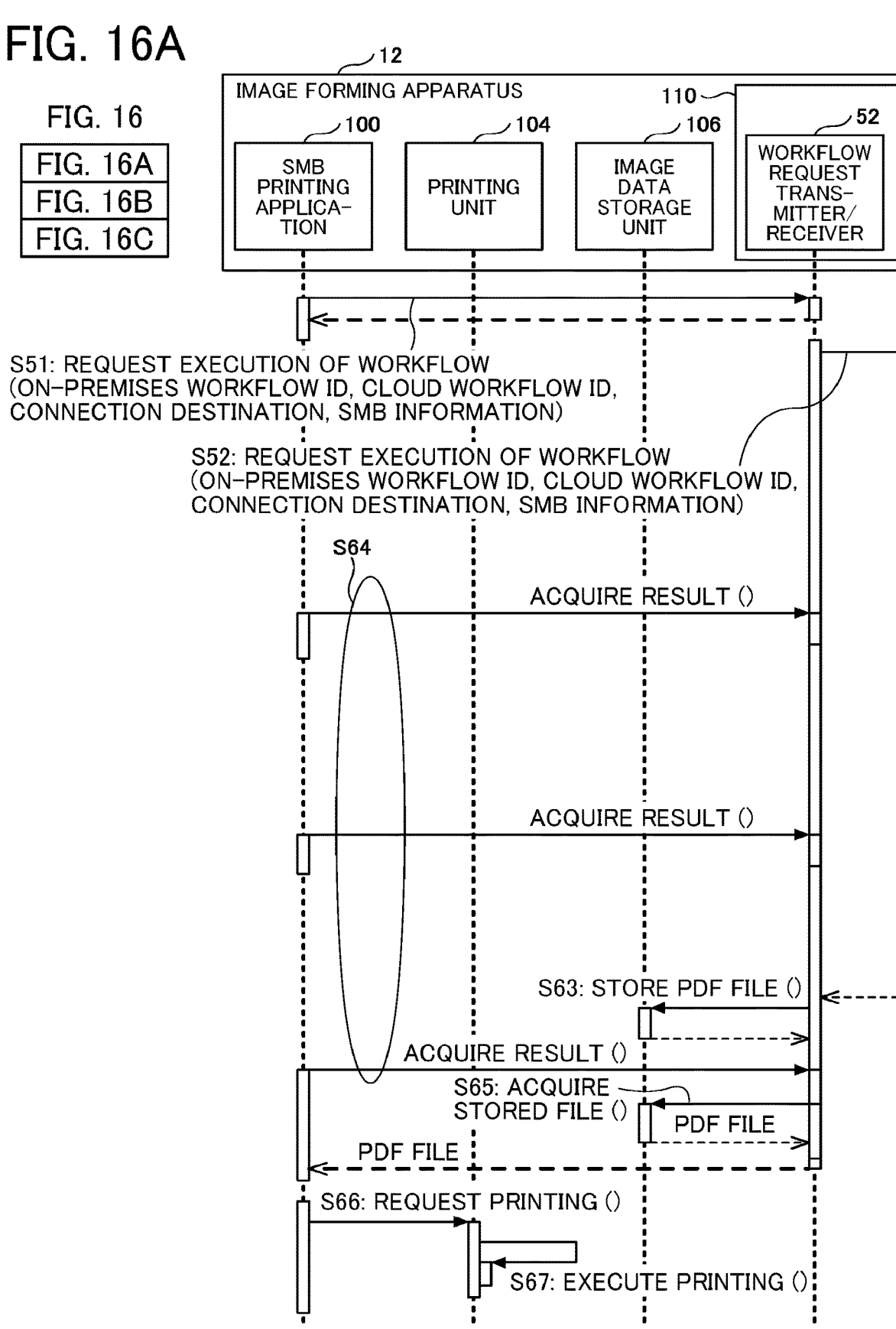

FIGS. 16A, 16B, and 16C (FIG. 16) are a sequence diagram of an example of a workflow that uses the printing unit 104. In step S51, the workflow application 100 of "SMB printing" specifies the on-premises workflow ID, the cloud workflow ID, the connection destination and SMB information, to request the on-premises workflow service 110 to execute the workflow. The operation proceeds to step S52, and the workflow request transmitter/receiver 52 of the on-premises workflow service 110 requests the on-premises workflow control unit 54 to execute the workflow.

In step S53, the on-premises workflow control unit 54 specifies the on-premises workflow ID to acquire the workflow information from the workflow storage unit 58. The on-premises workflow control unit 54 executes workflow processes in order defined by the workflow information acquired in step S53.

First, in step S54, the on-premises workflow control unit 54 specifies the SMB information, to request the SMB reception processing unit 118 to execute processing. The operation proceeds to step S55, and the SMB reception processing unit 118 requests the on-premises server apparatus 14 to acquire a file and receives an application file. A connection path and a file name are passed by arguments as the SMB information from the workflow application 100.

In step S56, the on-premises workflow control unit 54 specifies the cloud workflow ID, the connection destination, and the application file, to request the cloud workflow server link processing unit 112 to execute processing. The operation proceeds to step S57, and the cloud workflow server link processing unit 112 specifies the cloud workflow ID and the application file, to request the cloud workflow server apparatus 22 to execute a cloud workflow.

In step S58, the workflow request transmitter/receiver 76 of the cloud workflow server apparatus 22 receives the cloud workflow execution request from the image forming apparatus 12. The operation proceeds to step S59, and the workflow request transmitter/receiver 76 sends, to the cloud workflow control unit 72, the cloud workflow execution request received from the image forming apparatus 12.

In step S60, the cloud workflow control unit 72 specifies the cloud workflow ID to acquire workflow information from the workflow storage unit 74. The cloud workflow control unit 72 executes processes of the workflow according to the workflow information acquired in step S60.

In step S61, the cloud workflow control unit 72 specifies the application file, to request the PDF conversion processing unit 120 to perform PDF conversion processing. Thus, the cloud workflow control unit 72 acquires the PDF file. When the processes of the workflow information acquired in step S60 is completed, the cloud workflow control unit 72 sends the PDF file, which is a result of the cloud workflow, to the workflow request transmitter/receiver 76.

After sending the cloud workflow execution request to the cloud workflow server apparatus 22 in step S57, the cloud workflow server link processing unit 112 of the image forming apparatus 12 performs polling, to request acquisition of an image result in step S62. After receiving the PDF file, which is the result of the cloud workflow, the cloud workflow server apparatus 22 transmits the PDF file, which is the result of the cloud workflow, in response to receiving the image result acquisition request from the cloud workflow server link processing unit 112 of the image forming apparatus 12.

The operation proceeds to step S63, the workflow request transmitter/receiver 52 of the image forming apparatus 12 temporarily saves the transmitted PDF file in the image data storage unit 106. After sending the workflow execution request to the on-premises workflow service 110 in step S51, the workflow application 100 performs polling to request acquisition of the result in step S64.

When the workflow request transmitter/receiver 52 of the image forming apparatus 12 receives the request for acquisition of the result from the workflow application 100 after saving the PDF file, which is the result of the cloud workflow, in the image data storage unit 106, the operation proceeds to step S65. In step S65, the workflow request transmitter/receiver 52 acquires the PDF file from the image data storage unit 106 and sends the PDF file to the workflow application 100. In step S66, the workflow application 100 send a printing request to the printing unit 104 and causes the printing unit 104 to execute printing in step S67.

According to the present embodiment, by providing a processing unit that calls a cloud workflow and acquires a result of the cloud workflow as a part of processing units of the on-premises workflow that uses the printing unit 104, the on-premises workflow and the cloud workflow are linked with each other. In addition, according to the present embodiment, an operation transits from the on-premises workflow to the cloud workflow, while the on-premises workflow is in progress. Further, according to the present embodiment, the on-premises workflow and the cloud workflow can be executed in cooperation, while saving a user who operates the image forming apparatus 12 and gives an instruction relating to the execution of the workflow from a need of being conscious about which process is executed by an on-premises apparatus (e.g., an apparatus in the user environment) and which process is executed by an apparatus on the cloud (e.g., an apparatus in the service provision environment).

Furthermore, according to the present embodiment, even when controlling a workflow including a process by the on-premises server apparatus 14 that is operated so as to accept a request only from the user environment 10, a workflow including a process by an apparatus provided in the different network can be controlled.

Third Embodiment

The information processing system 1 according to the third embodiment executes a workflow with the workflow application 100 that uses the scanner unit 102, and a cloud workflow execution request is generated twice. Since the third embodiment is the same as the first embodiment in a part, the redundant description is omitted below.

Figure 17B:
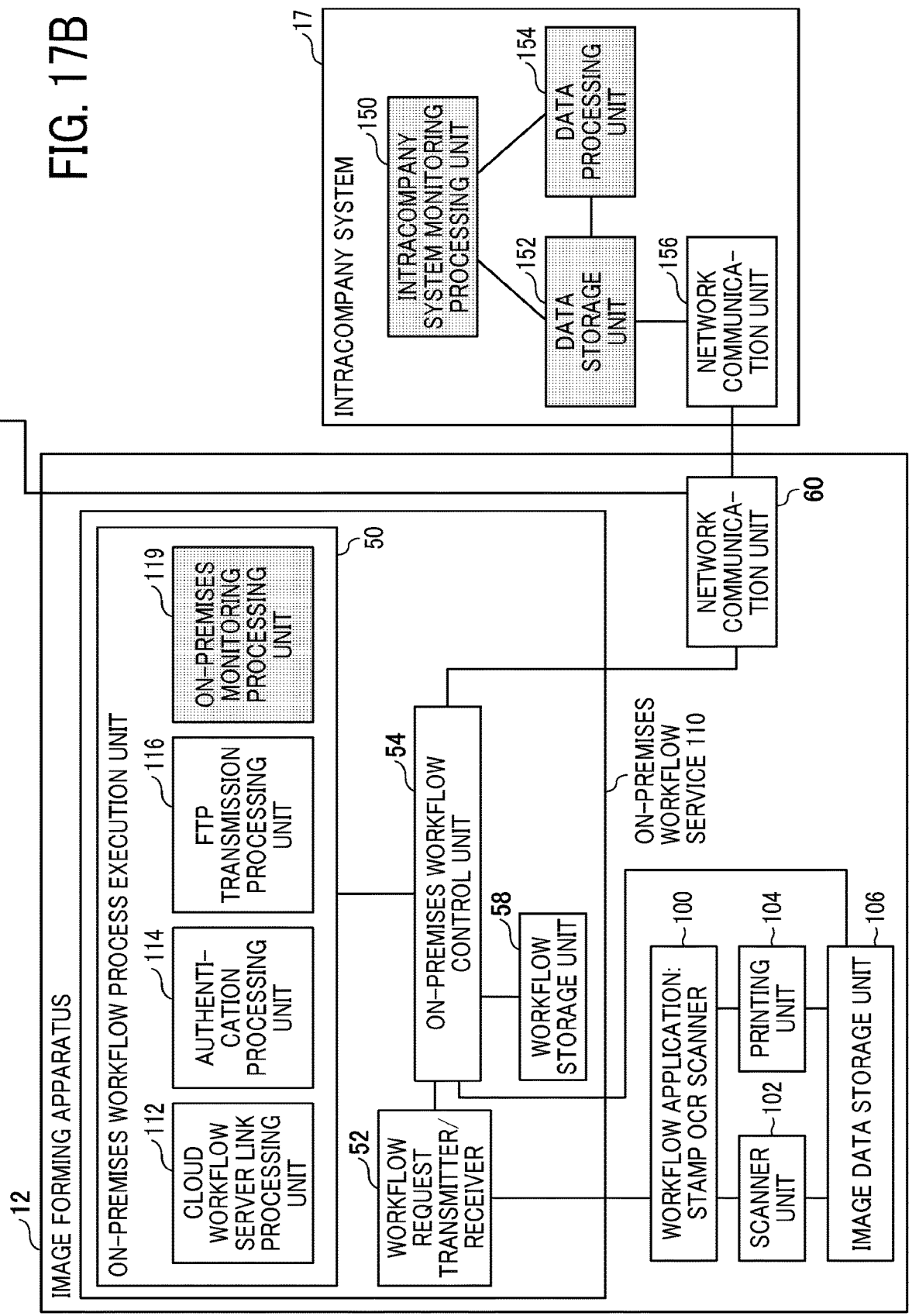

FIGS. 17A and 17B (FIG. 17) are a block diagram illustrating an example of a functional configuration of the information processing system 1 that performs a workflow with the workflow application 100 that uses the scanner unit 102. FIG. 17 illustrates an example in which the workflow application 100 is "stamp OCR scanner". More specifically, FIG. 17 illustrates an example of a functional configuration in which image data obtained by scanning is subjected to OCR processing on the cloud side, an intracompany system 17 performs intracompany stamp processing on an PDF file including text data as the OCR processing result, and the PDF file is transmitted to "Box", which is a cloud service.

Since a part of the functional configuration illustrated in FIG. 17 is the same as the functional configuration illustrated in FIG. 11, the redundant description thereof is omitted below. The information processing system 1 illustrated in FIG. 17 includes an intracompany system 17 in addition to the configuration of the information processing system 1 illustrated in FIG. 1. In FIG. 17, the image forming apparatus 12 and the intracompany system 17 are connected via the network 18.

The on-premises workflow service 110 of FIG. 17 includes an on-premises monitoring processing unit 119 in addition to the configuration of the on-premises workflow process execution unit 50 of FIG. 11. The on-premises monitoring processing unit 119, which is an example of the processing unit 64, monitors a specific folder of the intracompany system 17 as a workflow.

The cloud workflow process execution unit 70 of the cloud workflow server apparatus 22 has a configuration in which the stamp processing unit 124 of the cloud workflow process execution unit 70 of FIG. 11 is replaced with a box transmission processing unit 126. The box transmission processing unit 126, which is an example of the processing unit 82, transmits a file to "Box" which is a cloud service.

The intracompany system 17 includes an intracompany system monitoring processing unit 150, a data storage unit 152, a data processing unit 154, and a network communication unit 156. The intracompany system monitoring processing unit 150 monitors a specific folder on the intracompany system 17 and invokes a specific process in response to detection of a file. The intracompany system monitoring processing unit 150 can perform deferent processes according to folders.

The data storage unit 152 can store a plurality of folders, and each of the plurality of folders can store a file. The data processing unit 154 can perform processing such as text extraction, text conversion, and text insertion into an image. The network communication unit 156 performs network communication with the image forming apparatus 12.

When the information processing system 1 has the functional configuration as illustrated in FIG. 17, contents of the workflow information are as illustrated in FIGS. 18A and 18B, for example. FIGS. 18A and 18B are diagrams illustrating an example of a configuration of the workflow information. FIG. 18A is an example of the workflow information of the on-premises workflow. FIG. 18B is an example of the workflow information of the cloud workflow.

The workflow information of FIG. 18A indicates that the on-premises workflow is executed in the order of the cloud workflow server link processing unit 112, the authentication processing unit 114, the FTP transmission processing unit 116, the On-premises monitoring processing unit 119, and the cloud workflow server link processing unit 112. The workflow information of FIG. 18B indicates that the cloud workflow is executed in the order of the PDF conversion processing unit 120, the OCR processing unit 122, and the box transmission processing unit 126.

Figure 19A:
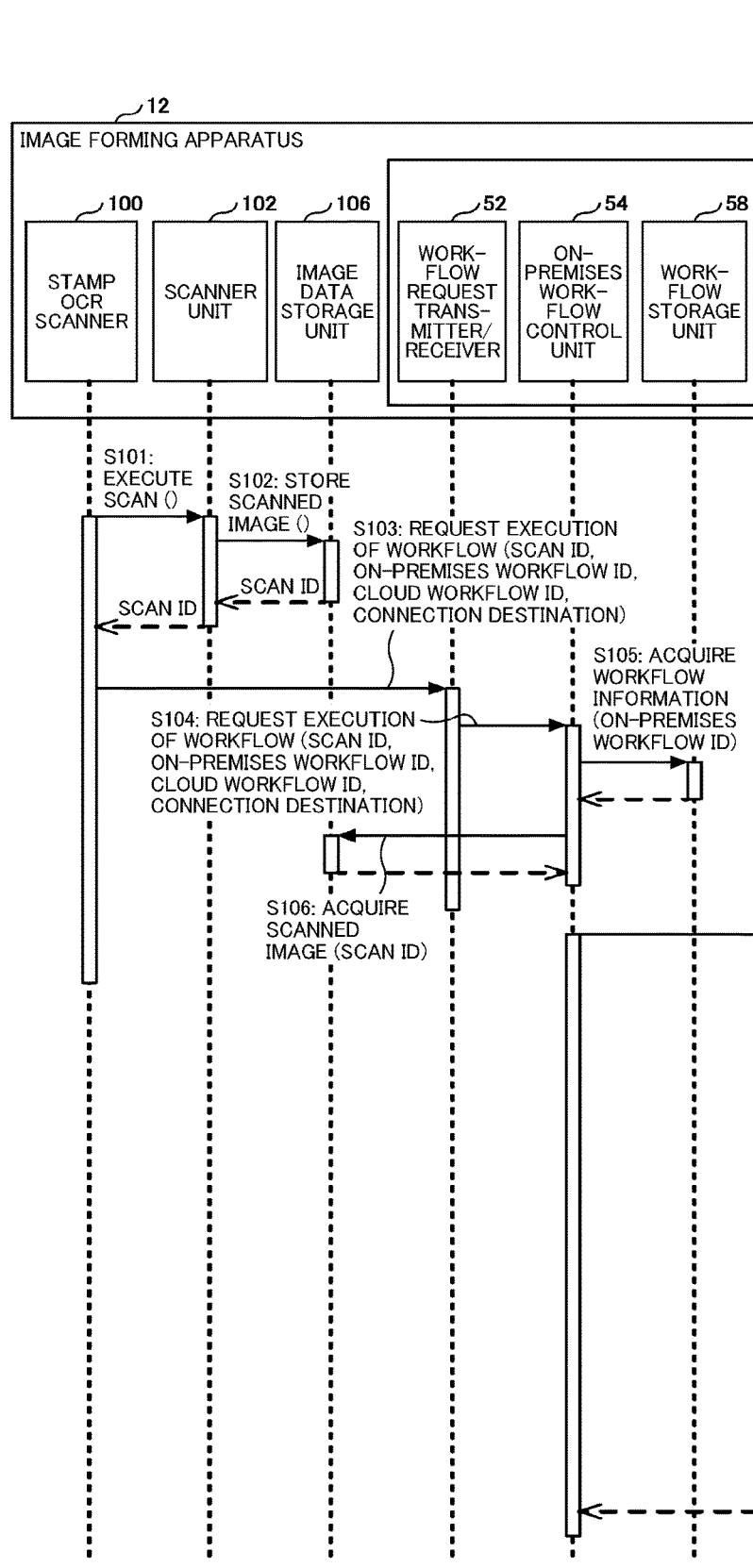
FIGS. 19AA, 19AB and 19AC (FIG. 19A) and FIGS. 19BA, 19BB, and 19BC (FIG. 19B) are sequence diagrams of an example of a workflow that uses the scanner unit, according to an embodiment of the present disclosure.
Figure 19A:
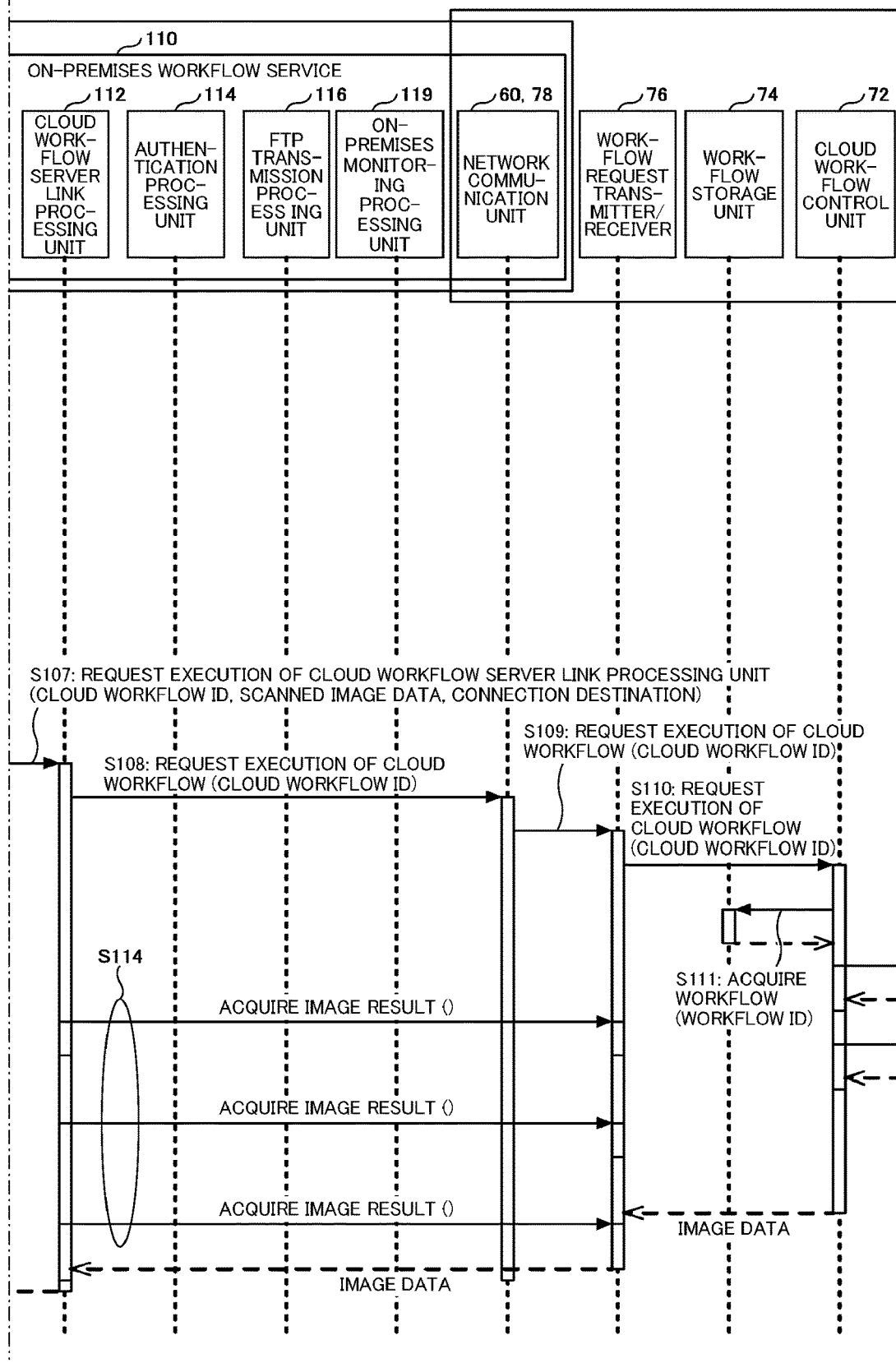
Figure 19A:
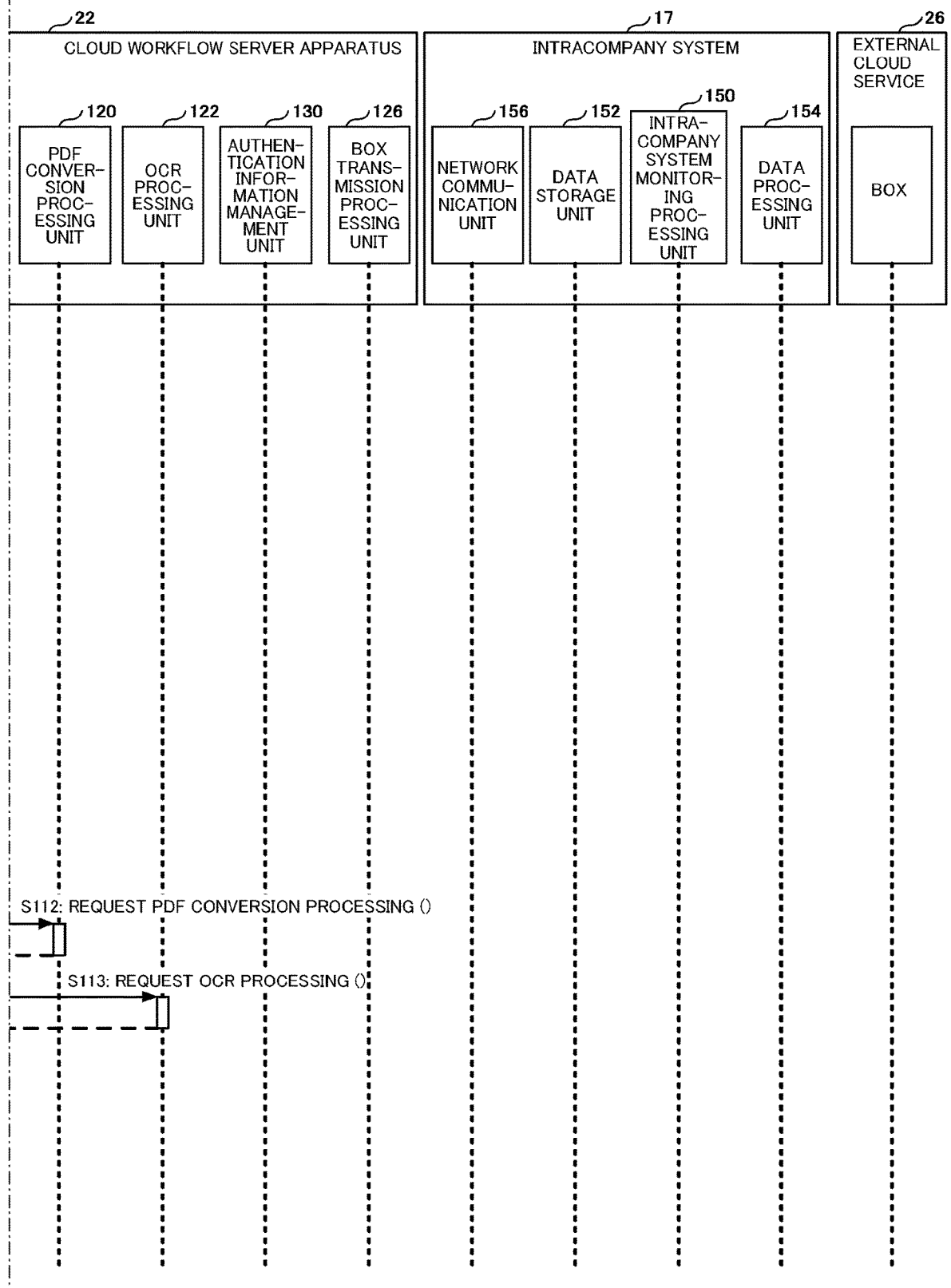
Figure 19B:
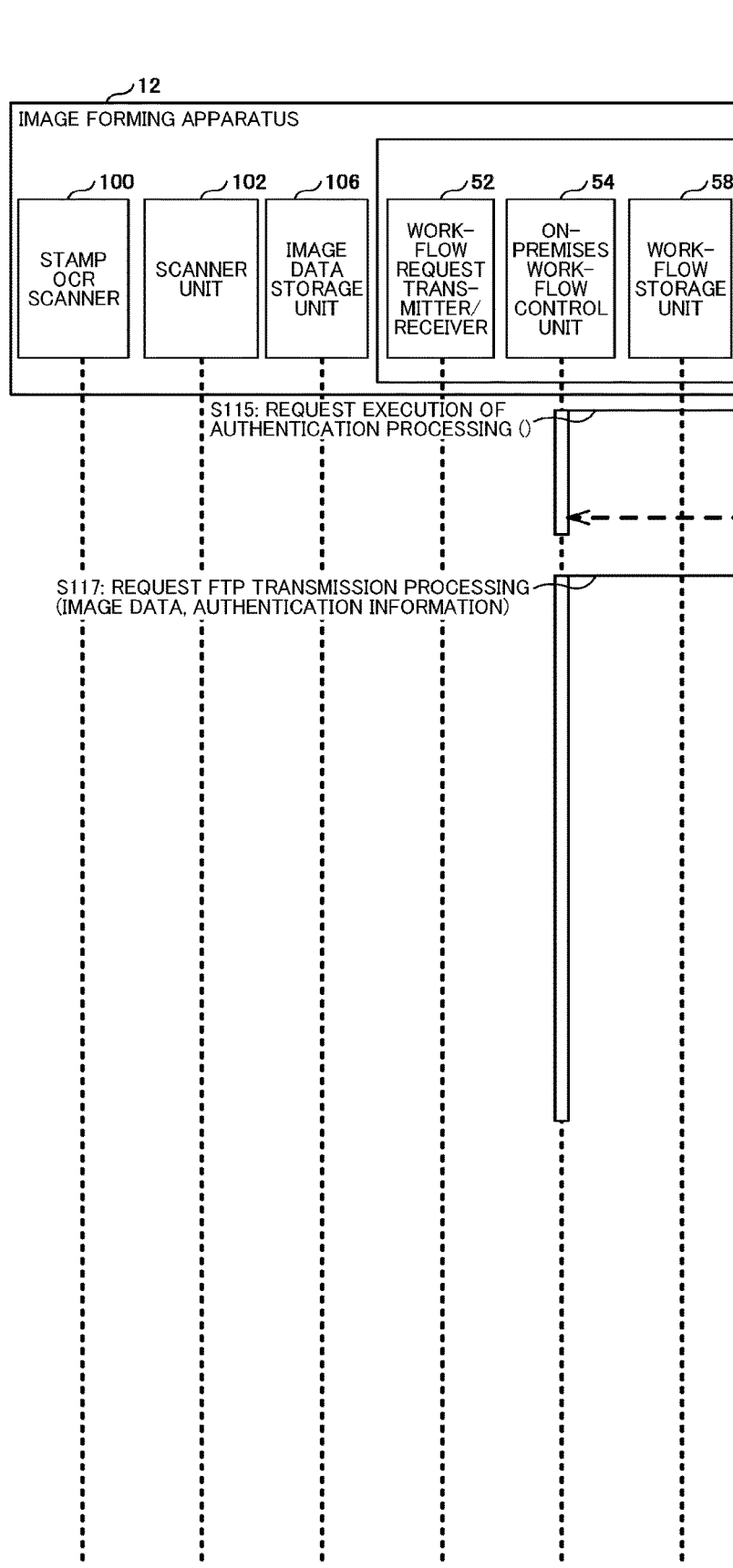
Figure 19B:
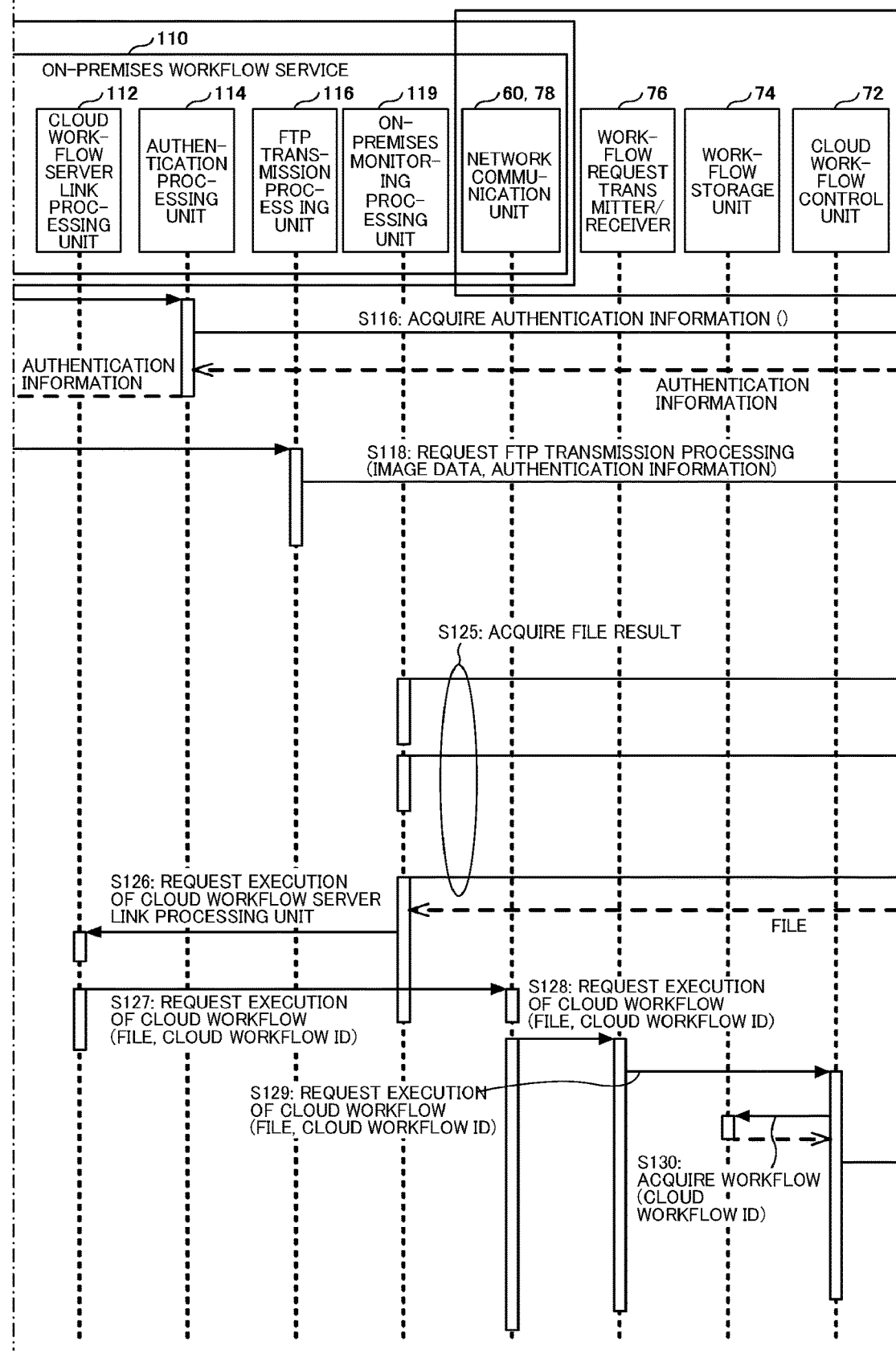

FIGS. 19A and 19B are sequence diagrams of an example of a workflow that uses the scanner unit 102. Since a part of the sequence diagrams of FIGS. 19A and 19B are the same as the sequence diagram of FIG. 13, the redundant description thereof is omitted below.

Processes of S101 to S111 are performed in substantially the similar manner as described above referring to steps S11 to S21 of FIG. 13, and the redundant description is omitted. In step S112, the cloud workflow control unit 72 specifies the scanned image data, to request the PDF conversion processing unit 120 to perform PDF conversion processing. The operation proceeds to step S113, and the cloud workflow control unit 72 requests the OCR processing unit 122 to perform OCR processing on the scanned image data. When all of the processes in the workflow information acquired in step S111 are completed, the cloud workflow control unit 72 transmits image data, which is a result of the cloud workflow, to the workflow request transmitter/receiver 76.

After sending the cloud workflow execution request to the cloud workflow server apparatus 22 in step S108, the cloud workflow server link processing unit 112 of the image forming apparatus 12 performs polling, to request acquisition of an image result in step S114. After receiving the image data, which is the result of the cloud workflow, the cloud workflow server apparatus 22 transmits the image data, which is the result of the cloud workflow, in response to receiving the image result acquisition request from the cloud workflow server link processing unit 112 of the image forming apparatus 12.

The operation proceeds to step S115, and the on-premises workflow control unit 54 of the image forming apparatus 12 requests the authentication processing unit 114 to execute processing. The operation proceeds to step S116, and the authentication processing unit 114 acquires the authentication information from the authentication information management unit 130 of the cloud workflow server apparatus 22. The operation proceeds to step S117, and the on-premises workflow control unit 54 specifies the image data and the authentication information, to request the FTP transmission processing unit 116 to execute processing.

The operation proceeds to step S118, and the FTP transmission processing unit 116 transmits the image data to the intracompany system 17 using the specified authentication information. A connection destination in step S118 is a monitored folder on which data processing is to be performed in the data storage unit 152 of the intracompany system 17. In step S119, the intracompany system monitoring processing unit 150 of the intracompany system 17 performs polling to monitor whether a file is stored in the monitored folder.

In step S120, the data storage unit 152 stores the file transmitted from the image forming apparatus 12 in the monitored folder. In response to detecting that the file is stored in the monitored folder in the data storage unit 152, the intracompany system monitoring processing unit 150 requests the data processing unit 154 to perform processing in step S121.

In step S122, the data processing unit 154 extracts text from image data on which OCR processing has been performed, which image data is the file stored in the monitored folder. The operation proceeds to S123, and the data processing unit 154 extracts specific text (e.g., real estate property management number, etc.) using a logic of the intracompany system 17. The data processing unit 154 generates a file (processing result file) in which the extracted specific text is converted to text in blue boldface, for example, and inserted as a stamp at the upper left corner of the image data.

The operation proceeds to step S124, the data processing unit 154 stores the processing result file in a folder dedicated to storing the processing result file. In step S125, the on-premises monitoring processing unit 119 of the on-premises workflow service 110 monitors the folder dedicated to storing the processing result file of the intracompany system 17, to acquire the processing result file stored in the dedicated folder.

When the on-premises monitoring processing unit 119 receives the processing result file, the operation proceeds to step S126. In step S126, the on-premises monitoring processing unit 119 requests the cloud workflow server link processing unit 112 to execute processing. The operation proceeds to step S127, and the cloud workflow server link processing unit 112 specifies the processing result file and the cloud workflow ID, to request the cloud workflow server apparatus 22 to execute a cloud workflow.

In step S128, the workflow request transmitter/receiver 76 of the cloud workflow server apparatus 22 receives the cloud workflow execution request from the image forming apparatus 12. The operation proceeds to step S129, and the workflow request transmitter/receiver 76 sends, to the cloud workflow control unit 72, the cloud workflow execution request received from the image forming apparatus 12.

The operation proceeds to step S130, and the cloud workflow control unit 72 specifies the cloud workflow ID to acquire workflow information from the workflow storage unit 74. The cloud workflow control unit 72 executes remaining processes of the workflow according to the workflow information acquired in step S130.

The operation proceeds to step S131, and the cloud workflow control unit 72 specifies the processing result file, to request the box transmission processing unit 126 to execute box transmission processing. In step S132, the box transmission processing unit 126 acquires authentication information of "Box" from the authentication information management unit 130. For example, an account that is commonly set in the cloud workflow server apparatus 22 is identified, if it is assumed that the web application is an application shared by users. The operation proceeds to step S133, the box transmission processing unit 126 stores the processing result file in "Box" of an external cloud service 26 using the acquired authentication information.

In the third embodiment, since the intracompany system 17 operates in cooperation, processes unique to the intracompany system 17 can be executed, such as generating a file into which a stamp dedicated to the intracompany system 17 is inserted at a specific position defined by the intracompany system 17 and storing a log of the processing result or a file itself as the processing result.

According to the present embodiment, by providing a processing unit that calls a cloud workflow twice and acquires a result of the cloud workflow as a part of processing units of the on-premises workflow that uses the printing unit 104, the on-premises workflow and the cloud workflow are linked with each other. In addition, according to the present embodiment, an operation transits from the on-premises workflow to the cloud workflow twice, while the on-premises workflow is in progress.

In the third embodiment, the cloud workflow execution is requested twice. The two cloud workflows can be different workflows having different cloud workflow IDs. Alternatively, one cloud workflow having one cloud workflow ID can be provided. In this case, the cloud workflow stores information specifying a process, from among processes of the cloud workflow, after which the cloud workflow in progress is to be interrupted. In other words, the cloud workflow stores information specifying a process after which the processing result is to be transmitted to the on-premises workflow. When the cloud workflow control unit 72 is called for the second time, the cloud workflow control unit 72 executes a process subsequent to the process after which the cloud workflow in progress is interrupted.

Fourth Embodiment

The information processing system 1 according to the fourth embodiment executes a workflow with a workflow application installed in a smart device. Since the fourth embodiment is the same as the first embodiment in a part, the redundant description is omitted below.

Figure 20A:
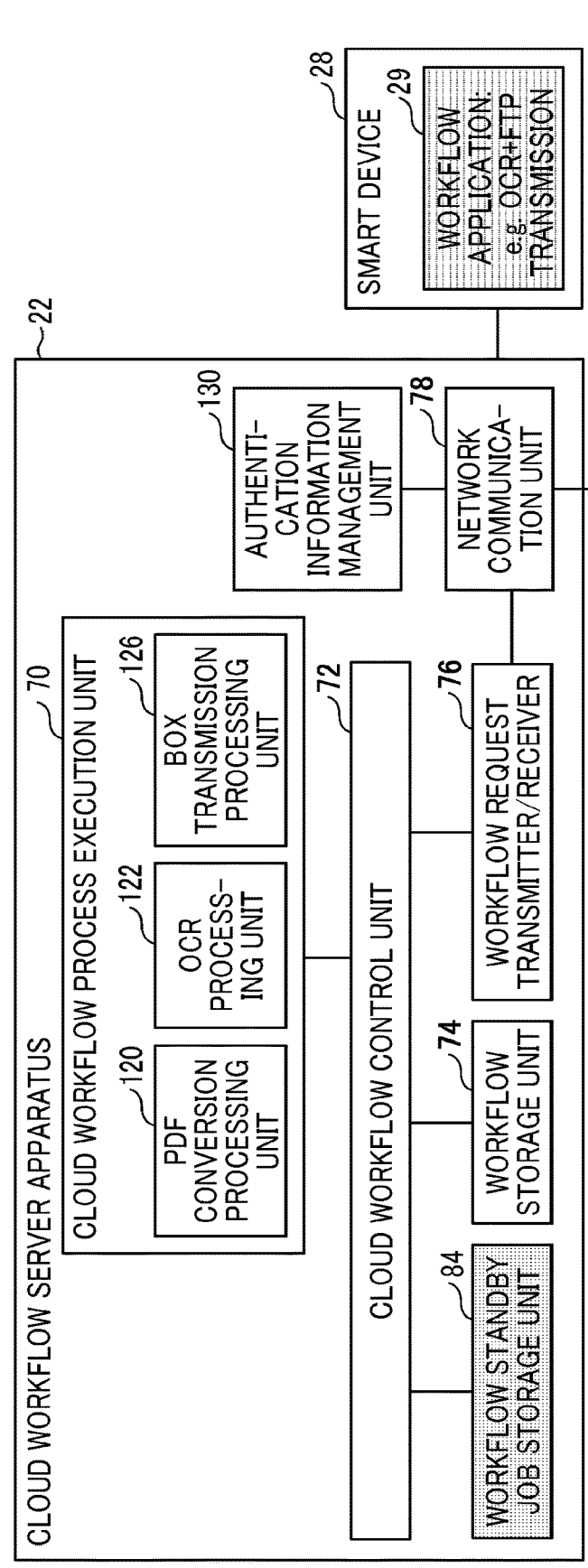
FIGS. 20A and 20B (FIG. 20) are a block diagram illustrating an example of a functional configuration of the information processing system that performs a workflow with a workflow application installed in a smart device, according to an embodiment of the present disclosure.
Figure 20B:
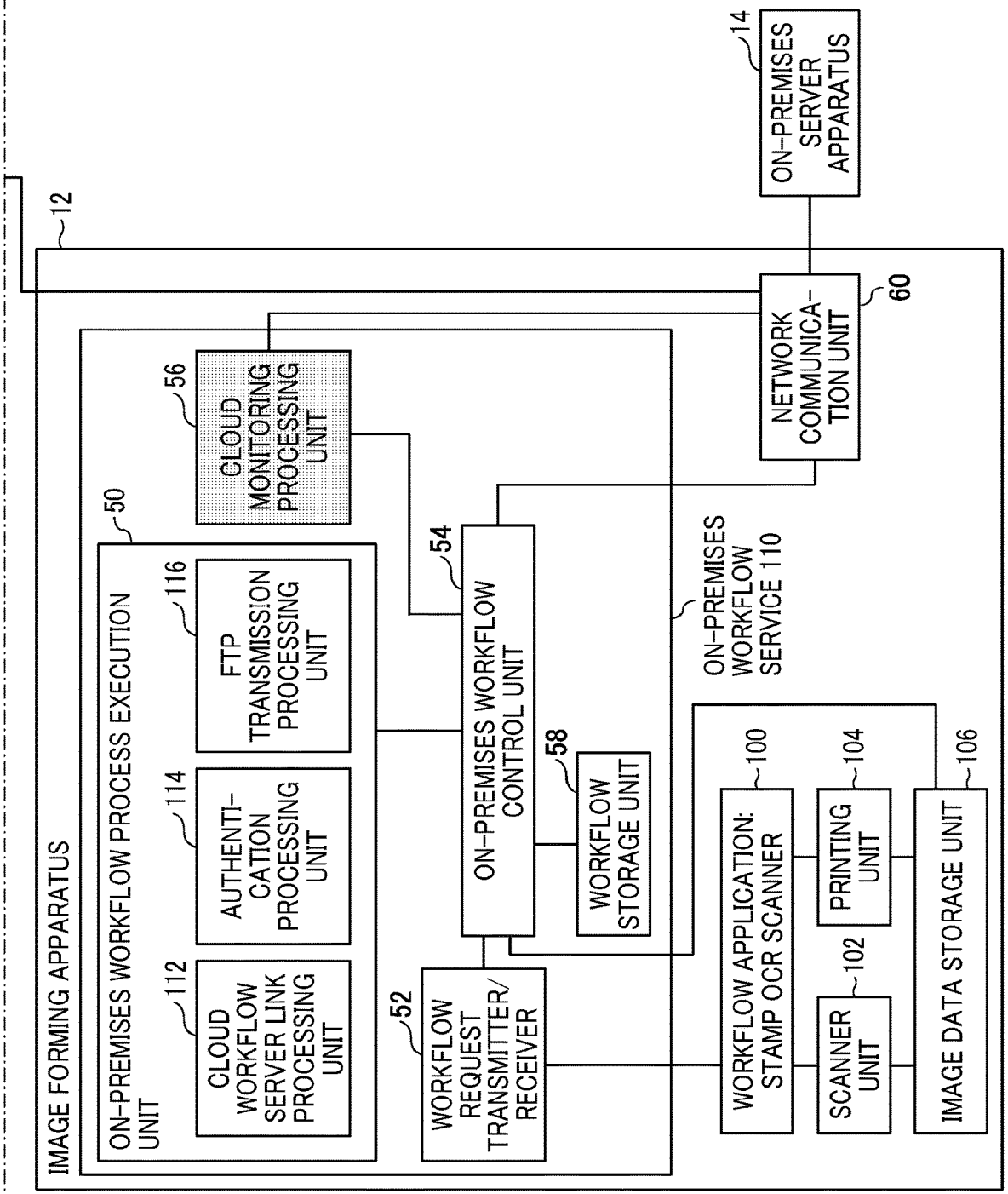

FIGS. 20A and 20B (FIG. 20) are a block diagram illustrating an example of a functional configuration of the information processing system that performs a workflow with a workflow application 29 installed in a smart device 28. FIG. 20 illustrates an example in which the workflow application 29 installed in the smart device 28 is "FTP transmission application with OCR processing". More specifically, FIG. 20 illustrates an example of the functional configuration in which a file on the smart device 28 (e.g., image data captured by a camera or image data stored in the smart device 28) is transmitted to the cloud workflow server apparatus 22, OCR processing is performed on the transmitted file on the cloud side, and the OCR-processed file is transmitted by FTP to the on-premises server apparatus 14.

The information processing system 1 illustrated in FIG. 20 includes the smart device 28 in addition to the configuration of the information processing system 1 illustrated in FIG. 11. The smart device 28 of FIG. 20 is connected to the cloud workflow server apparatus 22 via the network 30. The smart device 28 is installed with a web browser. The web browser browses the workflow application 29, which is a web application, to execute the workflow application 29. Since the workflow application 29 can perform the same operation by calling an application programming interface (API), the workflow application 29 can be a native application, instead of a web application.

The cloud workflow server apparatus 22 of FIG. 20 includes a workflow standby job storage unit 84 in addition to the configuration of the cloud workflow server apparatus 22 illustrated in FIG. 11. The workflow standby job storage unit 84 stores a workflow job that is executed from the smart device 28 and includes a remaining process or processes to be executed on the on-premises side. The image forming apparatus 12 polls the workflow standby job storage unit 84 to acquire an on-premises workflow standby job on the cloud side, so that the workflow is executed on the on-premises side.

The on-premises workflow service 110 of the image forming apparatus 12 of FIG. 20 includes a cloud monitoring processing apparatus 56 in addition to the configuration of the on-premises workflow service 110 of FIG. 11. The cloud monitoring processing unit 56 continuously monitors the on-premises workflow standby job on the cloud side. In response to detecting the on-premises workflow standby job on the cloud side, the cloud monitoring processing unit 56 requests execution of the workflow on the on-premises side.

When the information processing system 1 has the functional configuration as illustrated in FIG. 20, contents of the workflow information are as illustrated in FIGS. 21A and 21B, for example. FIGS. 21A and 21B are diagrams illustrating an example of a configuration of the workflow information. FIG. 21A is an example of the workflow information of the on-premises workflow. FIG. 21B is an example of the workflow information of the cloud workflow.

The workflow information of FIG. 21A indicates that the on-premises workflow is executed in the order of the authentication processing unit 114 and the FTP transmission processing unit 116. The workflow information of FIG. 21B indicates that the cloud workflow is executed in the order of the PDF conversion processing unit 120 and the OCR processing unit 122.

Figure 22C:
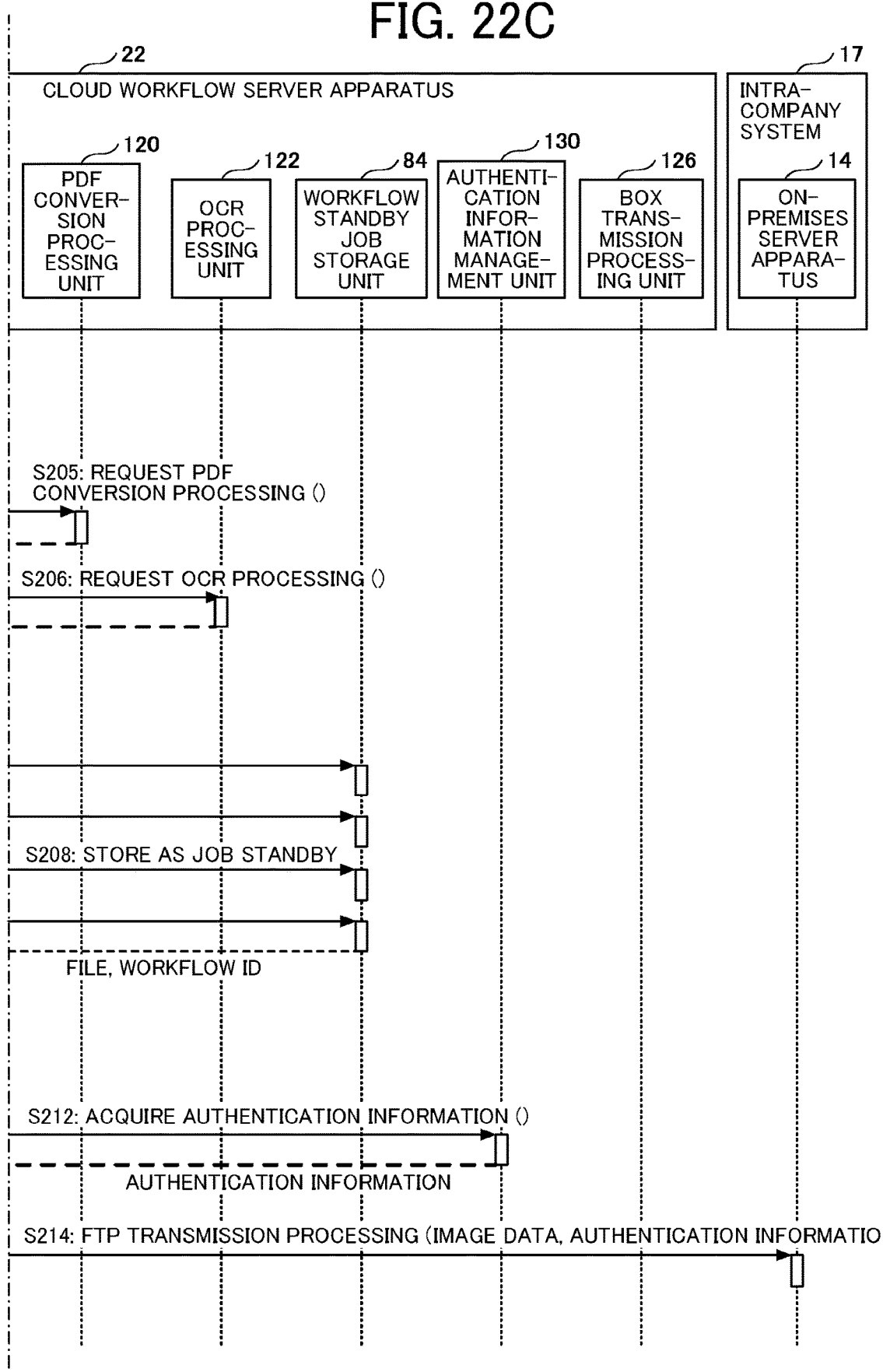

FIGS. 22A, 22B and 22C (FIG. 22) are a sequence diagram of an example of a workflow executed from the workflow application 29 installed in the smart device 28. In step S201, the workflow application 29 installed in the smart device 28 specifies a file, an on-premises workflow ID, and a cloud workflow ID, to requests the cloud workflow server apparatus 22 to execute a workflow. In step S202, the workflow request transmitter/receiver 76 of the cloud workflow server apparatus 22 receives the cloud workflow execution request from the smart device 28.

The operation proceeds to step S203, and the workflow request transmitter/receiver 76 sends, to the cloud workflow control unit 72, the cloud workflow execution request received from the smart device 28. The operation proceeds to step S204, and the cloud workflow control unit 72 specifies the cloud workflow ID to acquire workflow information from the workflow storage unit 74. The cloud workflow control unit 72 executes processes of the workflow according to the workflow information acquired in step S204.

First, in step S205, the cloud workflow control unit 72 specifies the file, to request the PDF conversion processing unit 120 to perform PDF conversion processing. Next, the operation proceeds to step S206, and the cloud workflow control unit 72 requests the OCR processing unit 122 to perform OCR processing on the file.

As part of the workflow processing, the cloud workflow control unit 72 transmits image data, which is a result of the cloud workflow, to the workflow request transmitter/receiver 76. In step S208, the workflow request transmitter/receiver 76 stores a on-premises workflow standby job on the cloud side in the workflow standby job storage unit 84.

In step S207, the cloud monitoring processing unit 56 of the image forming apparatus 12 continuously monitors the on-premises workflow standby job on the cloud side, to detect the on-premises workflow standby job on the cloud side and acquire the detected job. In the example of FIG. 22, in a case where there are a plurality of image forming apparatuses 12, one image forming apparatus 12 that first detects the on-premises workflow standby job on the cloud side can perform the processes of step S207 and the subsequent steps.

In another example, when the on-premises workflow includes a printing process, a particular image forming apparatus 12 specified by parameters or the like from the workflow application 29 of the smart device 28 can perform the processes of step S207 and the subsequent steps.

The operation proceeds to step S209, and the cloud monitoring processing unit 56 of the on-premises workflow service 110 requests the on-premises workflow control unit 54 to execute the workflow. In step S210, the on-premises workflow control unit 54 specifies the on-premises workflow ID to acquire the workflow information from the workflow storage unit 58.

The on-premises workflow control unit 54 executes workflow processes in order defined by the workflow information acquired in step S210. The operation proceeds to step S211, and the on-premises workflow control unit 54 of the image forming apparatus 12 requests the authentication processing unit 114 to execute processing. The operation proceeds to step S212, and the authentication processing unit 114 acquires the authentication information from the authentication information management unit 130 of the cloud workflow server apparatus 22. The operation proceeds to step S213, and the on-premises workflow control unit 54 specifies the image data and the authentication information, to request the FTP transmission processing unit 116 to execute processing. The operation proceeds to step S214, and the FTP transmission processing unit 116 stores the image data in the on-premises server apparatus 14 using the specified authentication information.

According to the present embodiment, a workflow in which an on-premises workflow and a cloud workflow cooperate can be executed from the workflow application 29 installed in the smart device 28.

Fifth Embodiment

The information processing system 1 according to the fifth embodiment executes a workflow with the workflow application 29 provided in the smart device 28, and a cloud workflow execution request is generated twice. Since the fifth embodiment is a combination of the third embodiment and the fourth embodiment, the redundant description is omitted below.

Figure 23A:
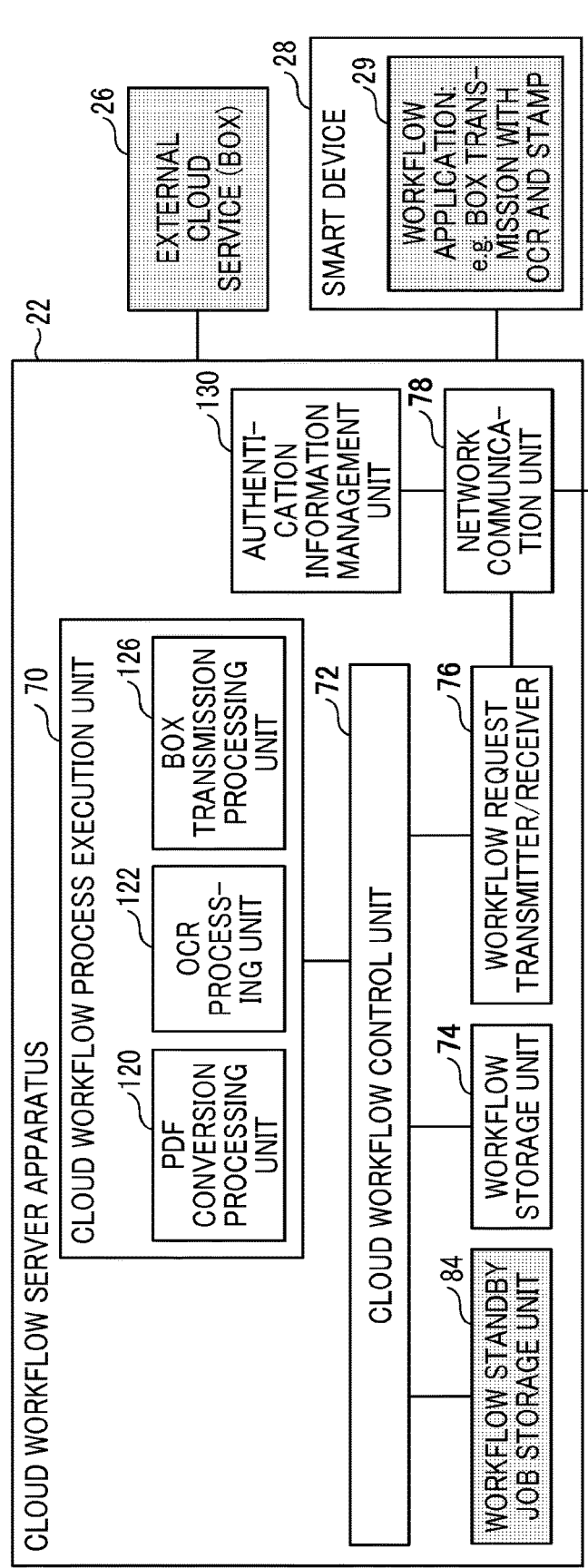
FIGS. 23A and 23B (FIG. 23) are a block diagram illustrating an example of a configuration of the information processing system, according to a fifth embodiment of the present disclosure.
Figure 23B:
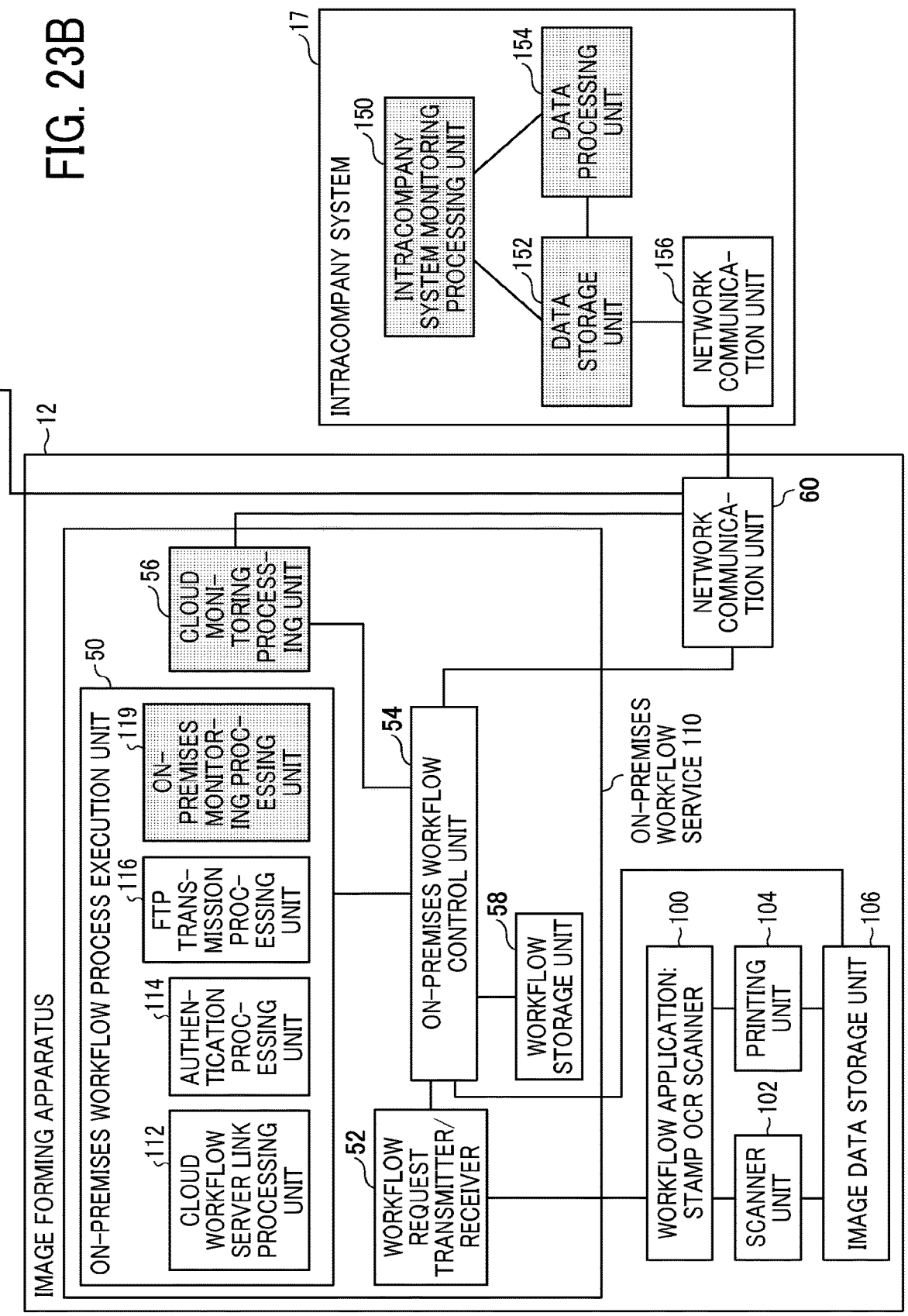

FIGS. 23A and 23B (FIG. 23) are a block diagram illustrating an example of a configuration of the information processing system 1 according to the fifth embodiment. More specifically, FIG. 23 illustrates an example of the functional configuration in which a file stored on the smart device 28 (e.g., image data captured by a camera or image data stored in the smart device 28) is transmitted to the cloud workflow server apparatus 22, OCR processing is performed on the transmitted file on the cloud side, the OCR-processed file is transmitted to the intracompany system 17, and an PDF file that includes text obtained by the OCR processing and a stamp inserted by the intracompany system 17 is transmitted to the "Box", which is a cloud service.

When the information processing system 1 has the functional configuration as illustrated in FIG. 23, contents of the workflow information are as illustrated in FIGS. 24A and 24B, for example. FIGS. 24A and 24B are diagrams illustrating an example of a configuration of the workflow information. FIG. 24A is an example of the workflow information of the on-premises workflow. FIG. 24B is an example of the workflow information of the cloud workflow.

The workflow information of FIG. 24A indicates that the on-premises workflow is executed in the order of the authentication processing unit 114, the FTP transmission processing unit 116, the on-premises monitoring processing unit 119, and the cloud workflow server link processing unit 112. The workflow information of FIG. 24B indicates that the cloud workflow is executed in the order of the PDF conversion processing unit 120, the OCR processing unit 122, and the box transmission processing unit 126.

Figure 25A:
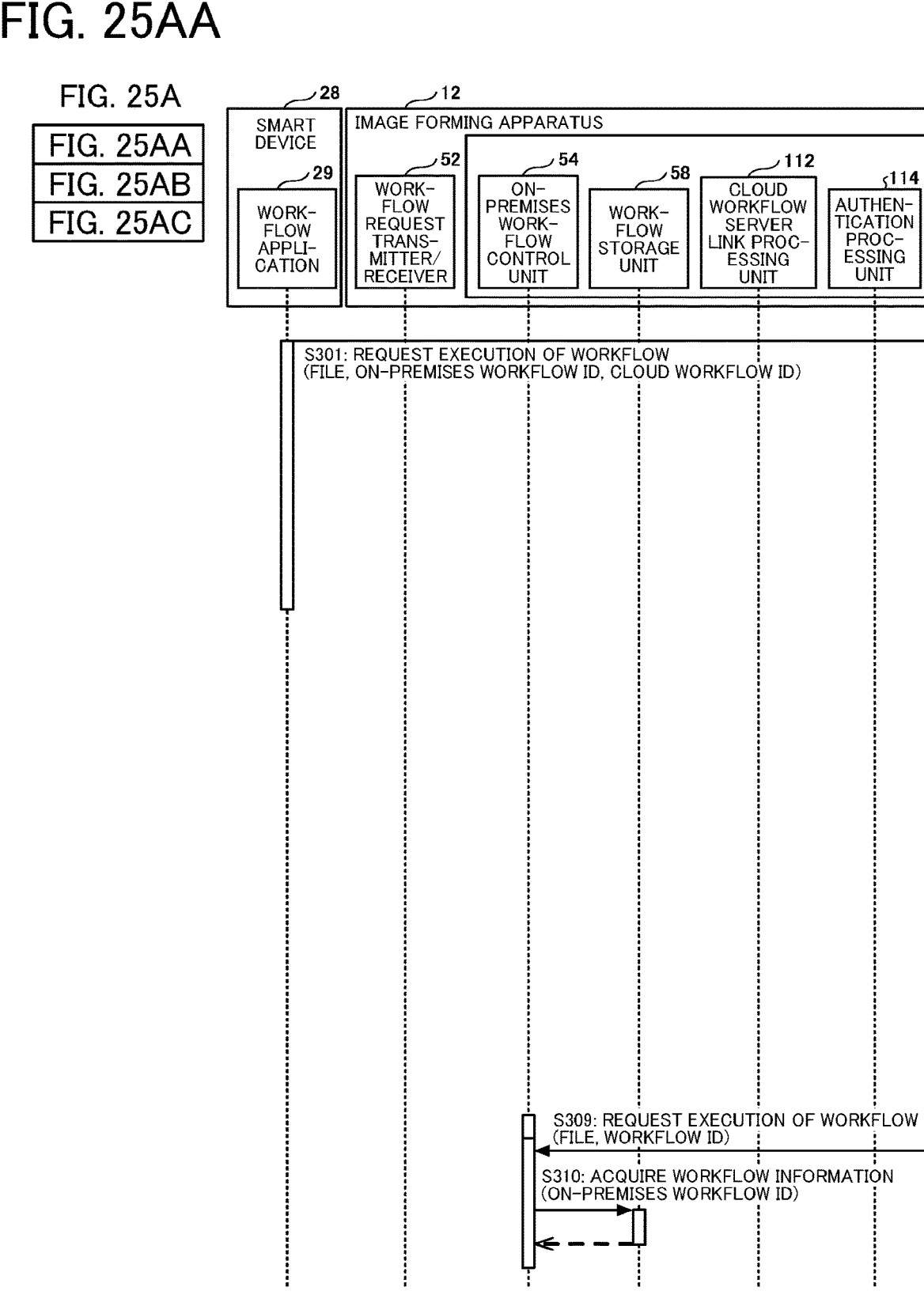
FIGS. 25AA, 25AB and 25AC (FIG. 25A) and FIGS. 25BA, 25BB and 25BC (FIG. 25B) are sequence diagrams illustrating an example of a workflow performed in the information processing system, according to the fifth embodiment of the present disclosure.
Figure 25A:
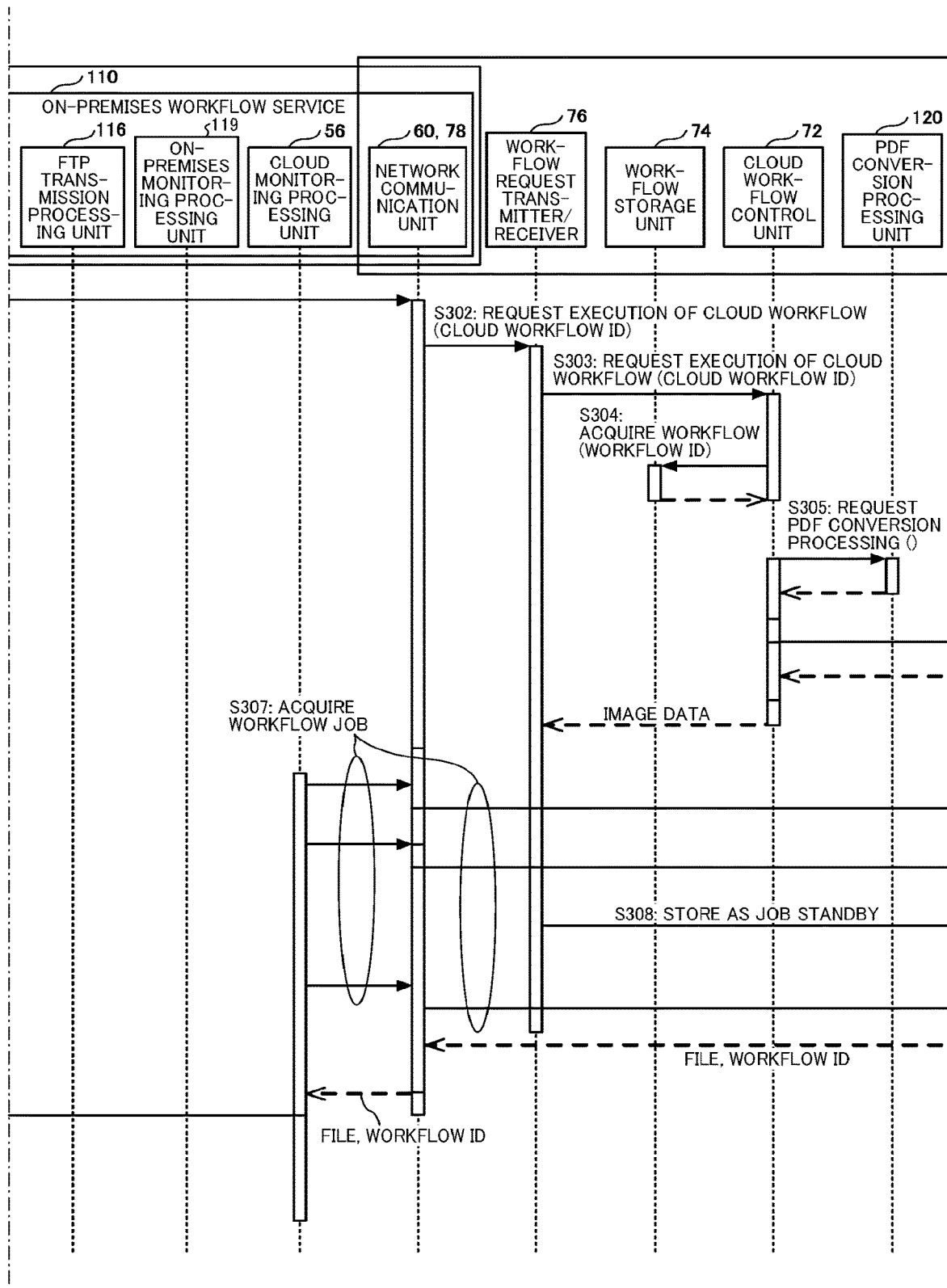
Figure 25A:
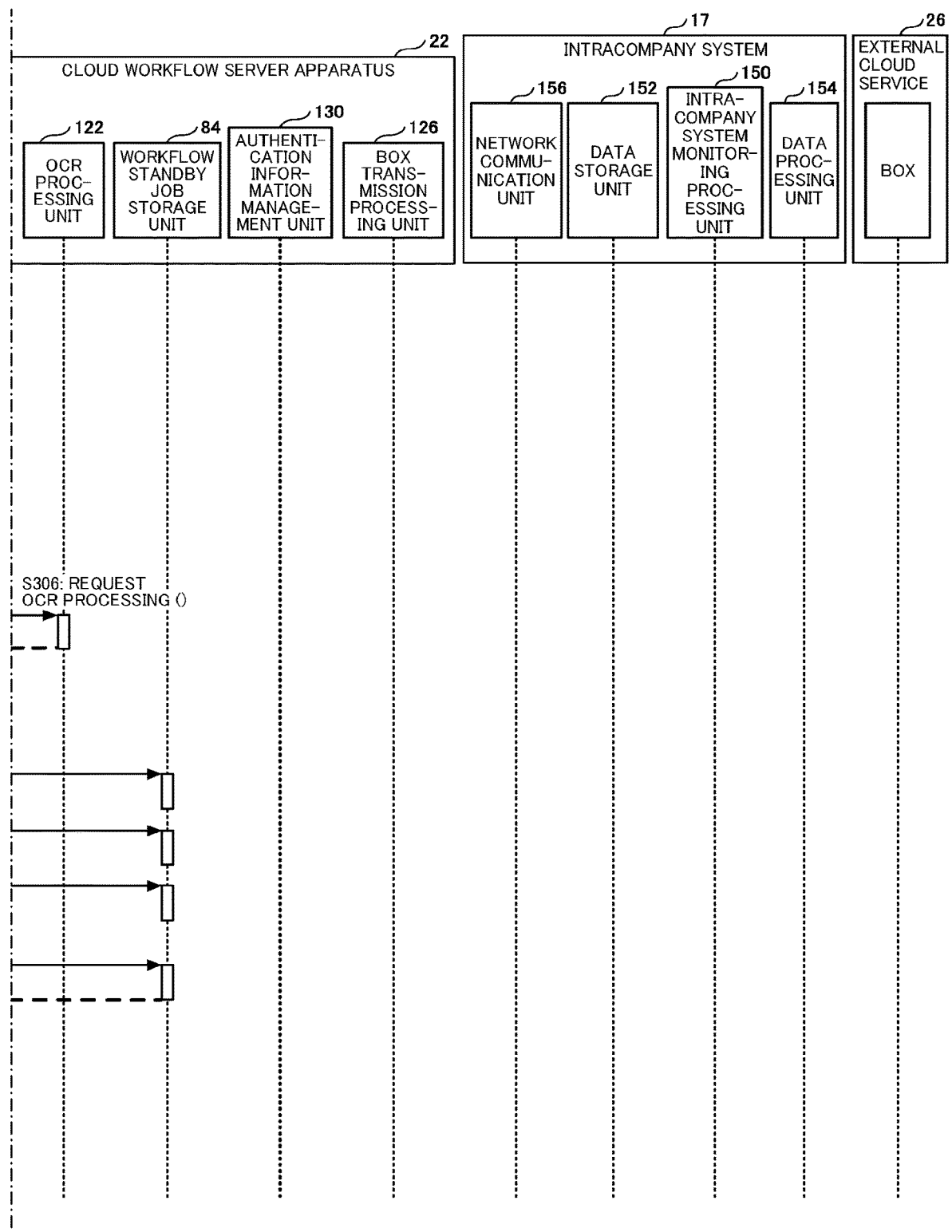
Figure 25B:
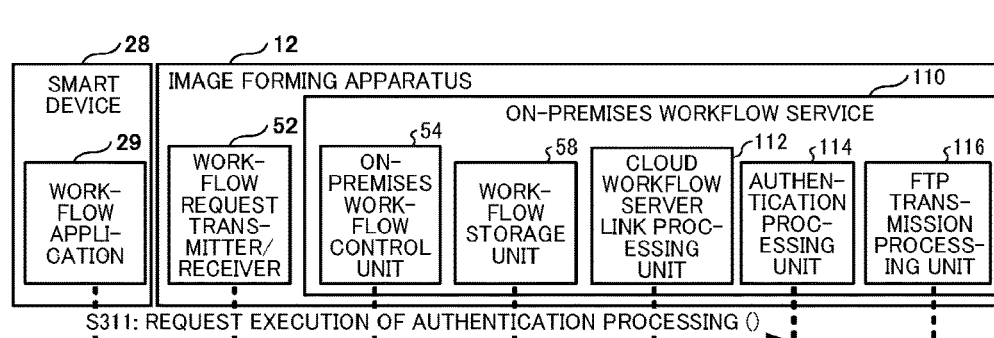
Figure 25B:
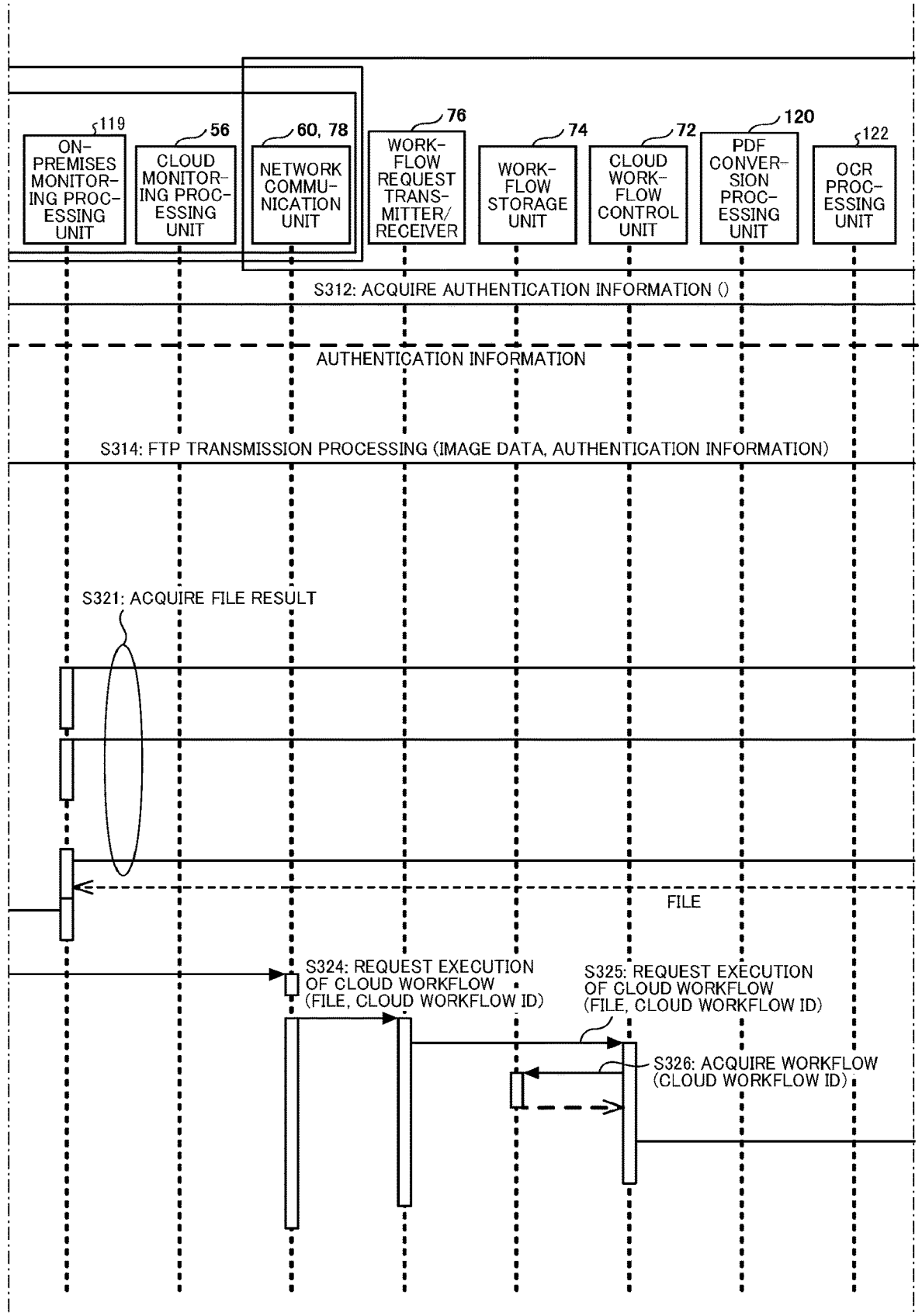
Figure 25B:
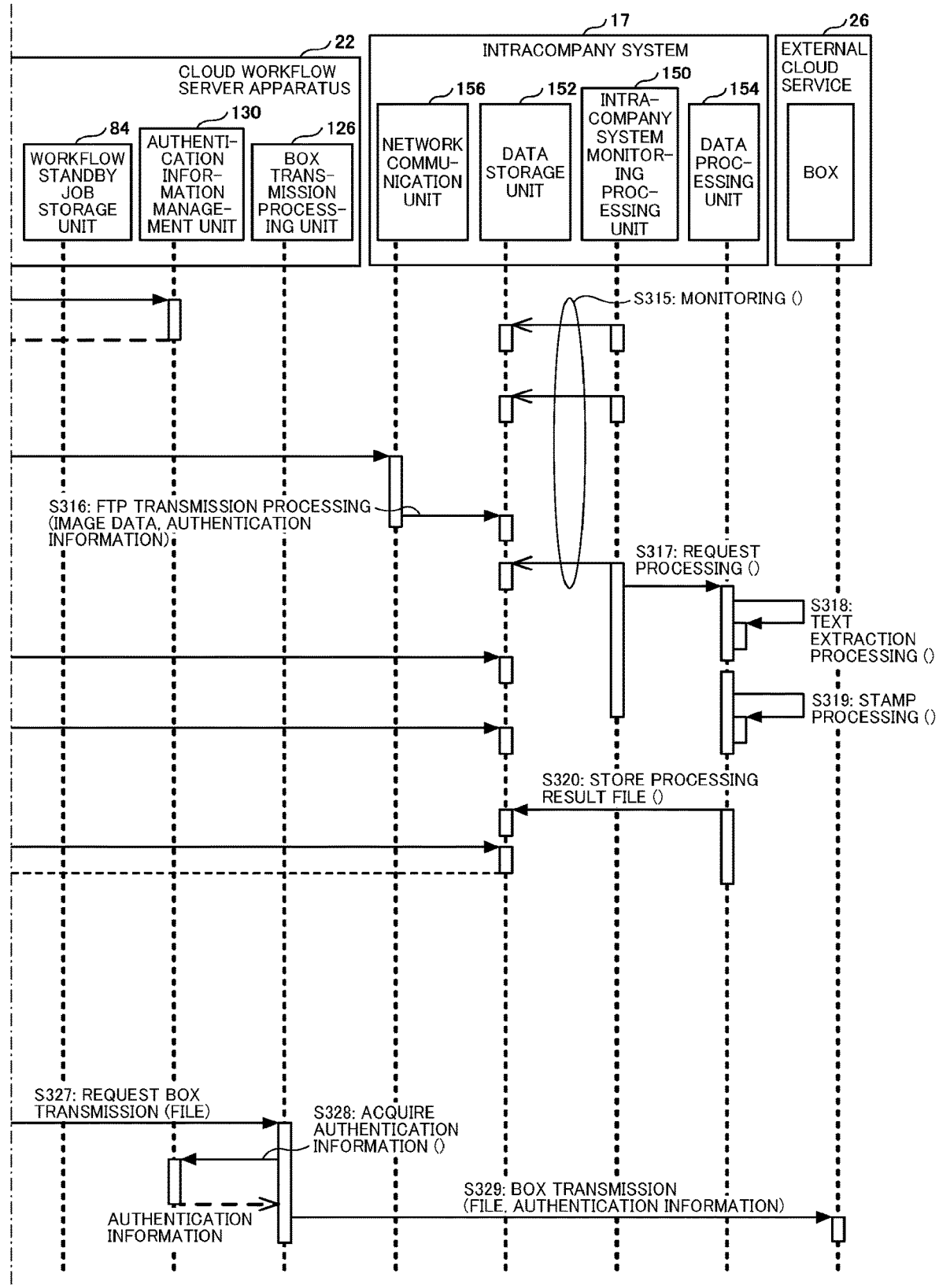

FIGS. 25A and 25B are sequence diagrams illustrating an example of a workflow performed in the information processing system 1 according to the fifth embodiment. Processes of S301 to S310 are performed in substantially the similar manner as described above referring to steps S201 to S210 of FIG. 22. In addition, processes of S311 to S329 are performed in substantially the similar manner as described above referring to steps S115 to S133 of FIG. 19B.

According to the present embodiment, a workflow in which an on-premises workflow and a cloud workflow cooperate can be executed from the workflow application 29 installed in the smart device 28. Further, according to the present embodiment, the cloud workflow server apparatus 22 specifies the on-premises workflow ID while the cloud workflow is in progress to cause the image forming apparatus 12 to execute the on-premises workflow. The cloud workflow server apparatus 22 can receive the processing result of the workflow on the on-premises server and execute the remaining process or processes of the workflow. In other word, according to the present embodiment, execution of the workflow by the on-premises server as a part of the cloud workflow processing.

Sixth Embodiment

In the above-described embodiments, polling is performed for transmitting the processing result on the cloud side to the on-premises side. In the sixth embodiment, push type notification from the cloud side is implemented by adopting the WebSocket protocol, which is a technology of network communication, so that the processing result on the cloud side is transmitted to the on-premises side. This enables the image forming apparatus 12 to receive image data, which is a processing result, from the cloud workflow server apparatus 22. The Web Socket protocol is a technology that implements bidirectional communication between a server and a client using a dedicated protocol after the server and the client establishes connection therebetween. The WebSocket protocol is an example of a technology implementing bidirectional communication.

Figure 26A:
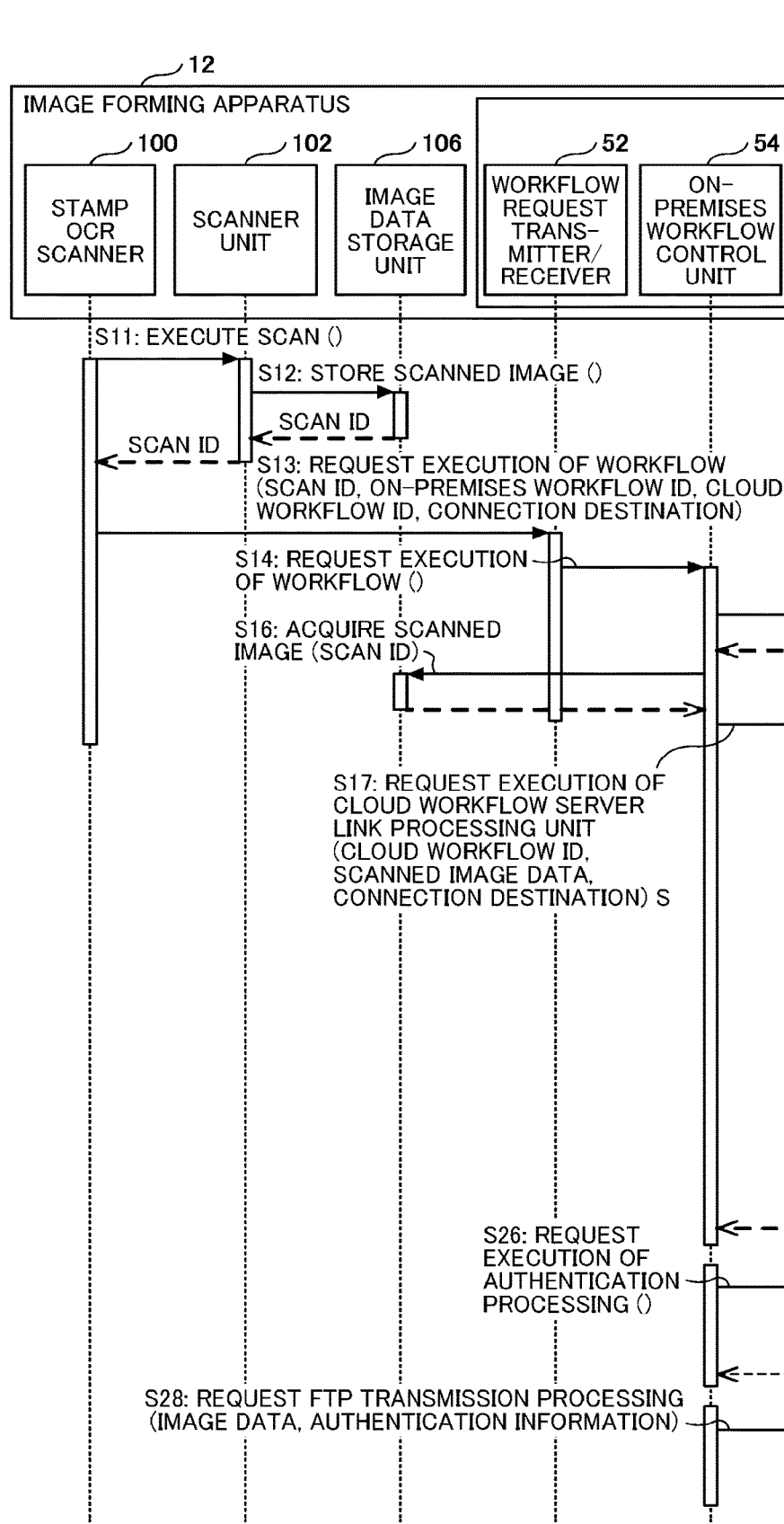

In the sixth embodiment, a description is given of an example in which the Web Socket protocol is adapted in the operation described in the above embodiment referring to the sequence diagram of FIG. 13 in which the process resulting on the cloud side is transmitted to the on-premises side by polling. FIGS. 26A, 26B, and 26C (FIG. 26) are a sequence diagram of an example of a workflow implementing push type notification from the cloud side using the Web Socket protocol.

In the sequence diagram of FIG. 26, the process of performing polling for requesting acquisition of an image result in step S25 of FIG. 13 is replaced with a process of step S25a in which the cloud processing result is notified from the cloud side.

According to the present embodiment, an on-premises workflow and a cloud workflow are linked with each other using a protocol that implements push type notification from the cloud side.

According to an aspect of the present disclosure, a plurality of workflows in information processing apparatuses connected to different networks are linked with each other.

As described heretofore, according to one or more embodiments of the present disclosure, an operation transits from one of a on-premises workflow that is in progress in the on-premises environment and a cloud workflow that is to be executed in the cloud environment to the other one of the workflows. Therefore, according to one or more embodiments of the present disclosure, the on-premises workflow in progress and the cloud workflow to be executed in cloud environment are linked with each other.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. The configuration of the information processing system 1 illustrated in FIG. 1 is just an example. In another example, functions or processes performed by the cloud workflow server apparatus 22 can be distributed over multiple information processing apparatuses. In still another example, the image forming apparatus 12 can include a plurality of devices, such as a device that serves as an operation device and a device that serves as a main device.

Seventh Embodiment

Functional Configuration:

A description is given below of a functional configuration of the information processing system 1, according to the seventh embodiment.

Figure 27:
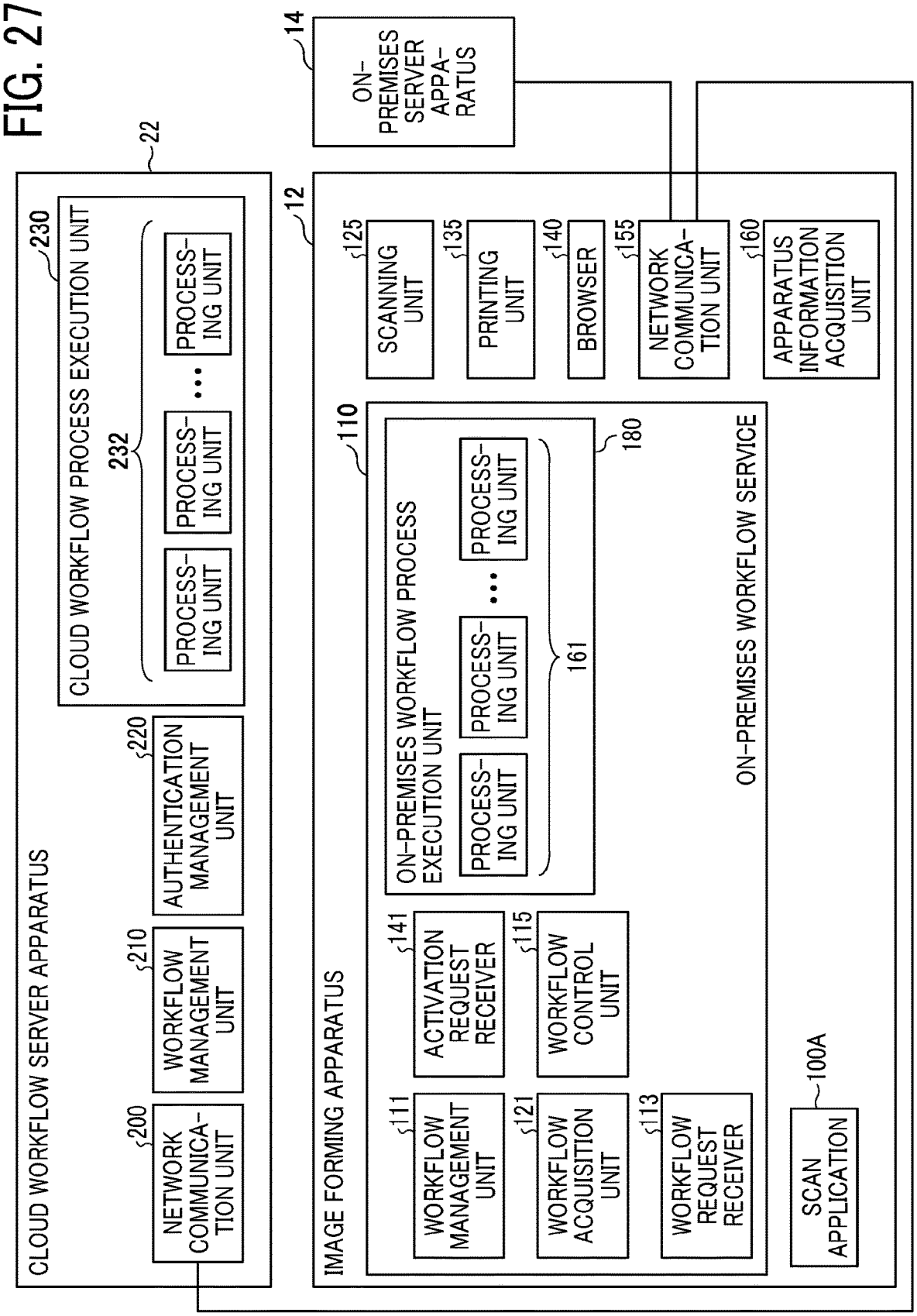
FIG. 27 is a block diagram illustrating an example of a functional configuration of the information processing system, according to the seventh embodiment of the present disclosure.

FIG. 27 is a block diagram illustrating an example of a functional configuration of the information processing system 1 according to the seventh embodiment. In the functional configuration diagram of FIG. 27, the firewall 16 is omitted, in order to simplify the drawing. The image forming apparatus 12 includes a scan application 100A, the on-premises workflow service 110, a scanning unit 125, a printing unit 135, a browser 140, a network communication unit 155, and an apparatus information acquisition unit 160.

The on-premises workflow service 110 includes a workflow management unit 111, a workflow acquisition unit 121, a workflow request receiver 113, an activation request receiver 141, a workflow control unit 115, and an on-premises workflow process execution unit 180. The on-premises workflow process execution unit 180 includes one or more processing unit 161. The processing unit 161 executes processes in the user environment 10, such as SMB transmission processing and FTP transmission processing as described later.

The scan application 100A is an example of an application installed in the image forming apparatus 12. For example, the scan application 100A is a web application. In another example, the scan application 100A is a native application. The scan application 100A includes a UI that receives an operation performed by a user. For example, the scan application 100A can receive setting of scanning resolution, scanning size, color, etc., and an instruction for starting a workflow from the user.

The workflow management unit 111 stores and manages workflow information acquired from the cloud workflow server apparatus 22. The workflow acquisition unit 121 acquires workflow information from the cloud workflow server apparatus 22. The workflow request receiver 113 receives a request for execution of a workflow from the scan application 100A.

The activation request receiver 141 receives a request for activation of an on-premises workflow service from the scan application 100A. The workflow control unit 115 invokes the processing unit 161 according to the workflow information and controls the execution of the workflow.

The scanning unit 125, which is implemented by, for example, the scanner 606, executes scanning. The printing unit 135, which is implement by, for example, the printer 605, executes printing. The browser 140 executes the scan application 100A, in a case when the scan application 100A is a web application. The network communication unit 155 performs network communication with the on-premises server apparatus 14 and the cloud workflow server apparatus 22. The apparatus information acquisition unit 160 acquires device information such as an apparatus number and provides the scan application 100A with the acquired device information.

These units are functions that are implemented by or that are caused to function by operating any of the hardware elements illustrated in FIG. 3 in cooperation with the instructions of the CPU 611 according to the program or setting information expanded from the ROM 613, the NVRAM 614 and/or the HDD 615 to the RAM 612.

The cloud workflow server apparatus 22 includes a network communication unit 200, a workflow management unit 210, an authentication management unit 220, and a cloud workflow process execution unit 230. The cloud workflow process execution unit 230 includes one or more processing units 232.

The processing unit 232 executes processes in the cloud environment 20, such as OCR processing, file conversion processing, and transmission processing to a storage service as described later. The network communication unit 200 performs network communication with the image forming apparatus 12. The workflow management unit 210 stores and manages workflow information to be provided to the image forming apparatus 12. The authentication management unit 220 receives an authentication request from the scan application 100A and performs authentication processing.

These units are functions that are implemented by or that are caused to function by operating any of the hardware elements illustrated in FIG. 2 in cooperation with the instructions of the CPU 506 according to the program and/or data expanded from the ROM 505 and/or the HDD 508 to the RAM 504.

Details of Operation:

Hereinafter, a detailed description is given of an operation performed by the information processing system 1, according to the present embodiment.

Process of Associating Workflow Information:

FIG. 28 is a sequence diagram illustrating an example of an operation of associating workflow information registered in the cloud workflow server apparatus 22 with the image forming apparatus 12. In step S401, the image forming apparatus 12 activates the scan application 100A installed therein according to user operation. The scan application 100A sends an authentication request to the authentication management unit 220 of the cloud workflow server apparatus 22 in steps S402 to S404.

When the authentication by the authentication management unit 220 is successful, the operation proceeds to step S405. In step S405, the scan application 100A acquires apparatus information (device information) identifying the image forming apparatus 12 such as an apparatus number from the apparatus information acquisition unit 160. In steps S406 to S408, the scan application 100A specifies the device information, to request the workflow management unit 210 of the cloud workflow server apparatus 22 to perform apparatus registration. The workflow management unit 210 associates the device information specified from the scan application 100A with workflow information. With the process of FIG. 28, the image forming apparatus 12 is associated with the workflow information registered in the cloud workflow server apparatus 22 that successfully authenticates a user using the image forming apparatus 12 or that successfully authenticates the image forming apparatus 12 according to the user instruction.

Execution of Workflow:

The information processing system 1 according to the seventh embodiment performs different processing as illustrated in FIGS. 29 and 30 depending on whether workflow information is cached in the image forming apparatus 12.

Figure 29B:
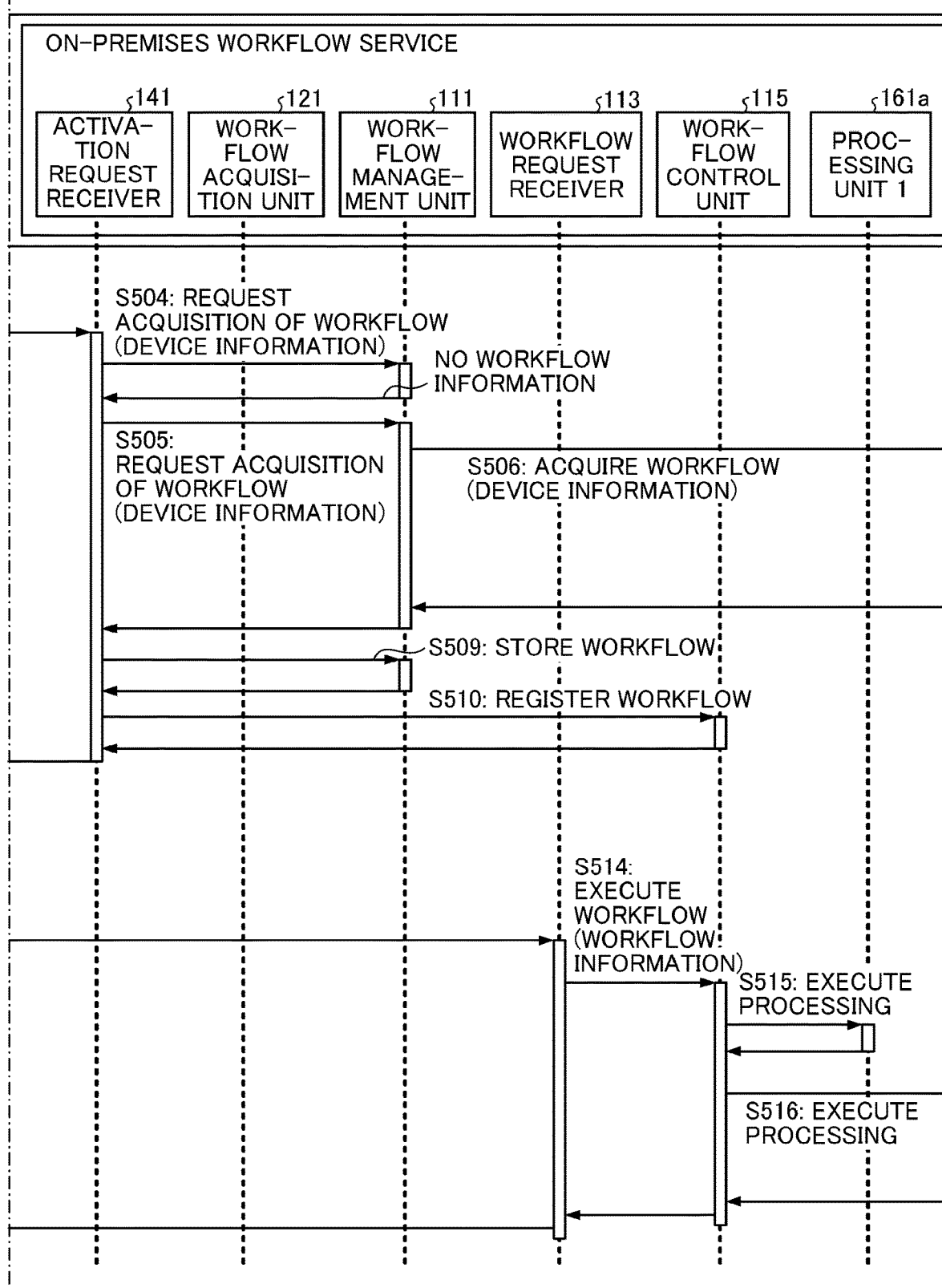
Figure 29C:
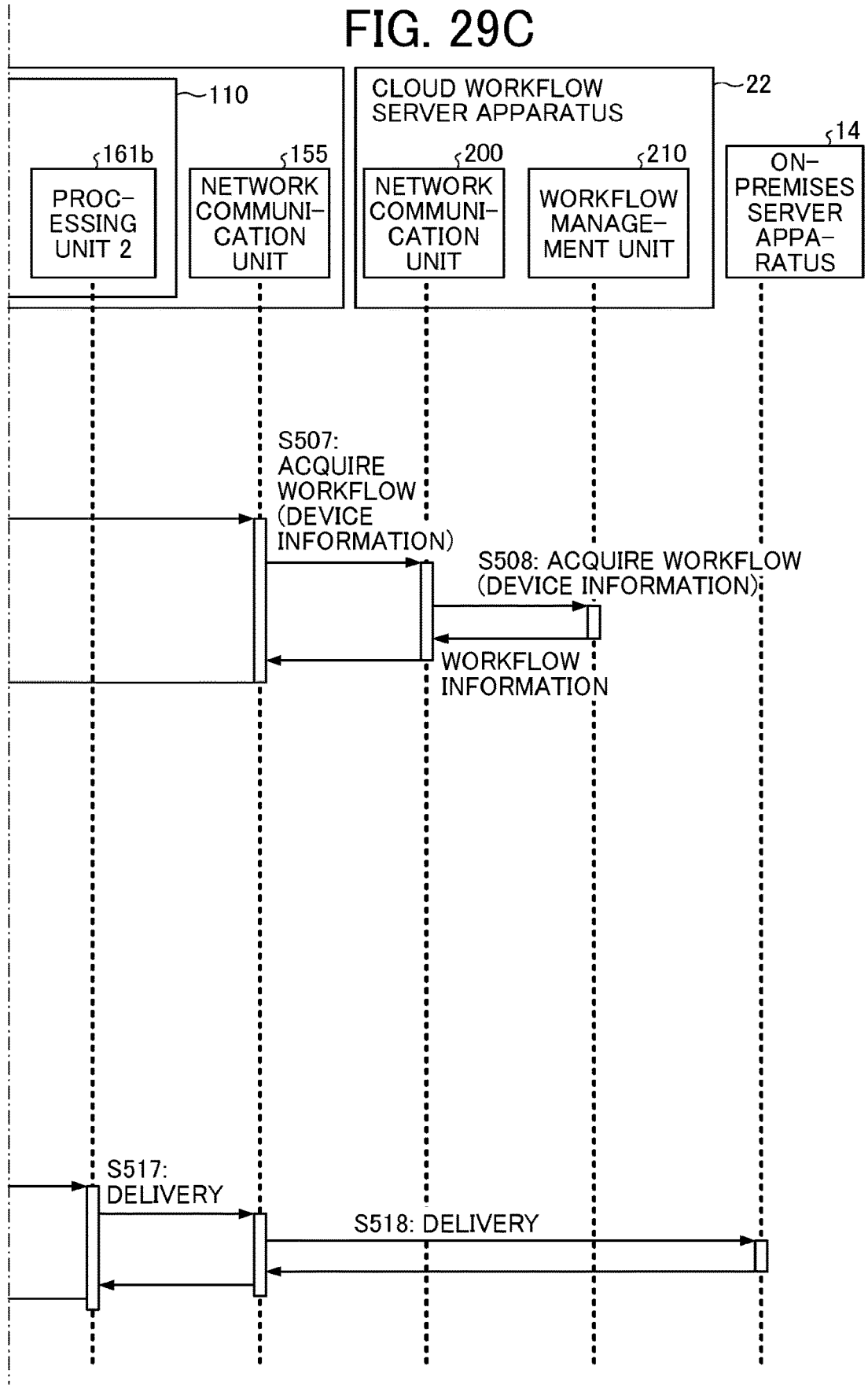

FIGS. 29A, 29B and 29C (FIG. 29) are a sequence diagram illustrating an example of an operation performed when no workflow information is cached in the image forming apparatus 12. FIGS. 30A, 30B, and 30C (FIG. 30) are a sequence diagram illustrating an example of an operation performed when workflow information is cached in the image forming apparatus 12.

In step S501 of FIG. 29, a user activates the scan application 100A of the image forming apparatus 12. In step S502, the scan application 100A acquires device information of the image forming apparatus 12 from the apparatus information acquisition unit 160. The operation proceeds to step S503, and the scan application 100A specifies the device information and sends an activation request to the activation request receiver 141.

In step S504, in response to receiving the activation request from the scan application 100A, the activation request receiver 141 specifies the device information, to request the workflow management unit 111 to acquire workflow information. Since no workflow information is cached, the workflow management unit 111 sends a notification indicating that that there is no workflow information to the activation request receiver 141.

When the activation request receiver 141 receives the notification indicating that there is no workflow information, the operation proceeds to step S505. In step S505, the activation request receiver 141 specifies the device information, to request the workflow acquisition unit 121 to acquire workflow information. In steps S506 to S508, the workflow acquisition unit 121 specifies the device information, to acquire workflow information associated with the device information from the workflow management unit 210 of the cloud workflow server apparatus 22.

The operation proceeds to step S509, the activation request receiver 141 stores (caches) the workflow information acquired by the workflow acquisition unit 121 from the workflow management unit 210 of the cloud workflow server apparatus 22 in the workflow management unit 111 in association with the device information. The operation proceeds to step S510, and the activation request receiver 141 registers the workflow information acquired from the workflow management unit 210 of the cloud workflow server apparatus 22 in the workflow control unit 115. After the process of step S510, the scan application 100A displays a UI that receives an operation by a user on the control panel 602, for example.

In step S511, the user operates the UI displayed by the scan application 100A, for example, to instruct execution of scanning.

The operation proceeds to step S512, and the scan application 100A requests the scanning unit 125 to perform scan. The scanning unit 125 executes scanning. After executing scan, the scanning unit 125 sends a notification that scan has been completed to the scan application 100A.

In step S513, the scan application 100A specifies the workflow information and sends a request for execution of the workflow to the workflow request receiver 113. When the workflow request receiver 113 receives the request for execution of the workflow, the operation proceeds to step S514. In step S514, the workflow request receiver 113 specifies the workflow information, to request the workflow control unit 115 to execute the workflow.

In response to receiving the workflow execution request from the workflow request receiver 113, the workflow control unit 115 invokes one or more processing units 161 according to the workflow information to control execution of the workflow. In the example of FIG. 29, in step S515, the workflow control unit 115 invokes the processing unit 161a to cause the processing unit 161a to execute processing. Next, in steps S516 to S518, the workflow control unit 115 invokes the processing unit 161b to cause the processing unit 161b to perform processing of delivery to the on-premises server apparatus 14.

For example, the workflow of FIG. 5 includes processes transmitting image data obtained by scanning by SMB and transmitting, by FTP, a PDF file including text data obtained by OCR processing and an inserted stamp. According to the present embodiment, the workflow is executed in which the image forming apparatus 12, the on-premises server apparatus 14, and the cloud workflow server apparatus 22 operate in cooperation with each other.

In step S70 of FIG. 30, a user activates the scan application 100A of the image forming apparatus 12. The operation proceeds to step S72, and the scan application 100A specifies the device information and sends an activation request to the activation request receiver 141. In step S74, in response to receiving the activation request from the scan application 100A, the activation request receiver 141 specifies the device information, to request the workflow management unit 111 to acquire workflow information. Since workflow information is cached, the workflow management unit 111 sends the cached workflow information to the activation request receiver 141.

The operation proceeds to step S76, and the activation request receiver 141 registers the cached workflow information in the workflow control unit 115. After the process of step S76, the activation request receiver 141 proceeds to a process of step S78. In step S78, the activation request receiver 141 specifies cache version information and the device information, to request the workflow acquisition unit 121 to acquire workflow information. The cache version information is information indicating a version of the workflow information cached in the workflow management unit 111.

In steps S80 to S84, the workflow acquisition unit 121 specifies the device information, to acquire workflow information associated with the device information from the workflow management unit 210 of the cloud workflow server apparatus 22. When the activation request receiver 141 determines that the workflow information has been updated based on the version information of the workflow information acquired from the workflow management unit 210 of the cloud workflow server apparatus 22 and the cache version information, the activation request receiver 141 performs process of steps S86 to S88.

In step S86, the activation request receiver 141 stores (caches) the workflow information acquired by the workflow acquisition unit 121 from the workflow management unit 210 of the cloud workflow server apparatus 22 in the workflow management unit 111 in association with the device information. The operation proceeds to step S88, and the activation request receiver 141 again registers the workflow information acquired from the workflow management unit 210 of the cloud workflow server apparatus 22 in the workflow control unit 115.

On the other hand, after the process of step S76, the scan application 100A displays a UI that receives an operation by a user on the control panel 602, for example. In step S90, the user operates the UI displayed by the scan application 100A, for example, to instruct execution of scanning.

The operation proceeds to step S92, and the scan application 100A requests the scanning unit 125 to perform scan. The scanning unit 125 executes scanning. After executing scan, the scanning unit 125 sends a notification that scan has been completed to the scan application 100A.

In step S94, the scan application 100A specifies the workflow information and sends a request for execution of the workflow to the workflow request receiver 113. When the workflow request receiver 113 receives the request for execution of the workflow, the operation proceeds to step S96. In step S96, the workflow request receiver 113 specifies the workflow information, to request the workflow control unit 115 to execute the workflow.

In response to receiving the workflow execution request from the workflow request receiver 113, the workflow control unit 115 invokes one or more processing units 161 according to the workflow information to control execution of the workflow, in substantially the similar manner as described above referring to steps S515 to S518 of FIG. 29.

According to the operations illustrated in the sequence diagrams of FIG. 29 and FIG. 30, in a case where the workflow information acquired from the cloud workflow server apparatus 22 is cached, the on-premises workflow service 110 is activated using the cached workflow information. This reduces time required to activate the on-premises workflow service 110. Further, according to the operation illustrated in the sequence diagram of FIG. 30, in a case where there is an updated version of the cached workflow information, the cached workflow information is updated after activating the on-premises workflow service 110 using the cached workflow information.

FIG. 31 is a diagram illustrating an example of a structure of the workflow information. The workflow information illustrated in FIG. 31 indicates an example of workflow in which image data obtained by scanning is converted to a PDF file including text obtained by OCR processing in the cloud environment and the PDF file is transmitted by FTP. The workflow information includes, for example, a workflow used by the scan application 100A. In another example, the workflow information can include a workflow other than the scan application 100A, such as a print application.

According to the present embodiment, registration of a workflow to be executed in the user environment 10 that cannot be accessed from the cloud environment 20 can be performed in the cloud environment 20. This allows a user to register a workflow to be executed in the user environment 10 from another user environment or a service provision environment such as the Internet. Further, according to the present embodiment, in a case where workflow information is cached, the user environment 10 can activate the on-premises workflow service 110 with the cached workflow information. This reduces time required for activation.

Eighth Embodiment

In the information processing system 1 according to the seventh embodiment, when workflow information is cached, confirmation is performed as to whether there is an updated version of the cached workflow information, after activating the on-premises workflow service 110 using the cached workflow information. The information processing system 1 according to the eighth embodiment performs an operation as illustrated in FIG. 32, to confirm whether there is an updated version of the workflow information before activating the on-premises workflow service 110.

Figure 32A:
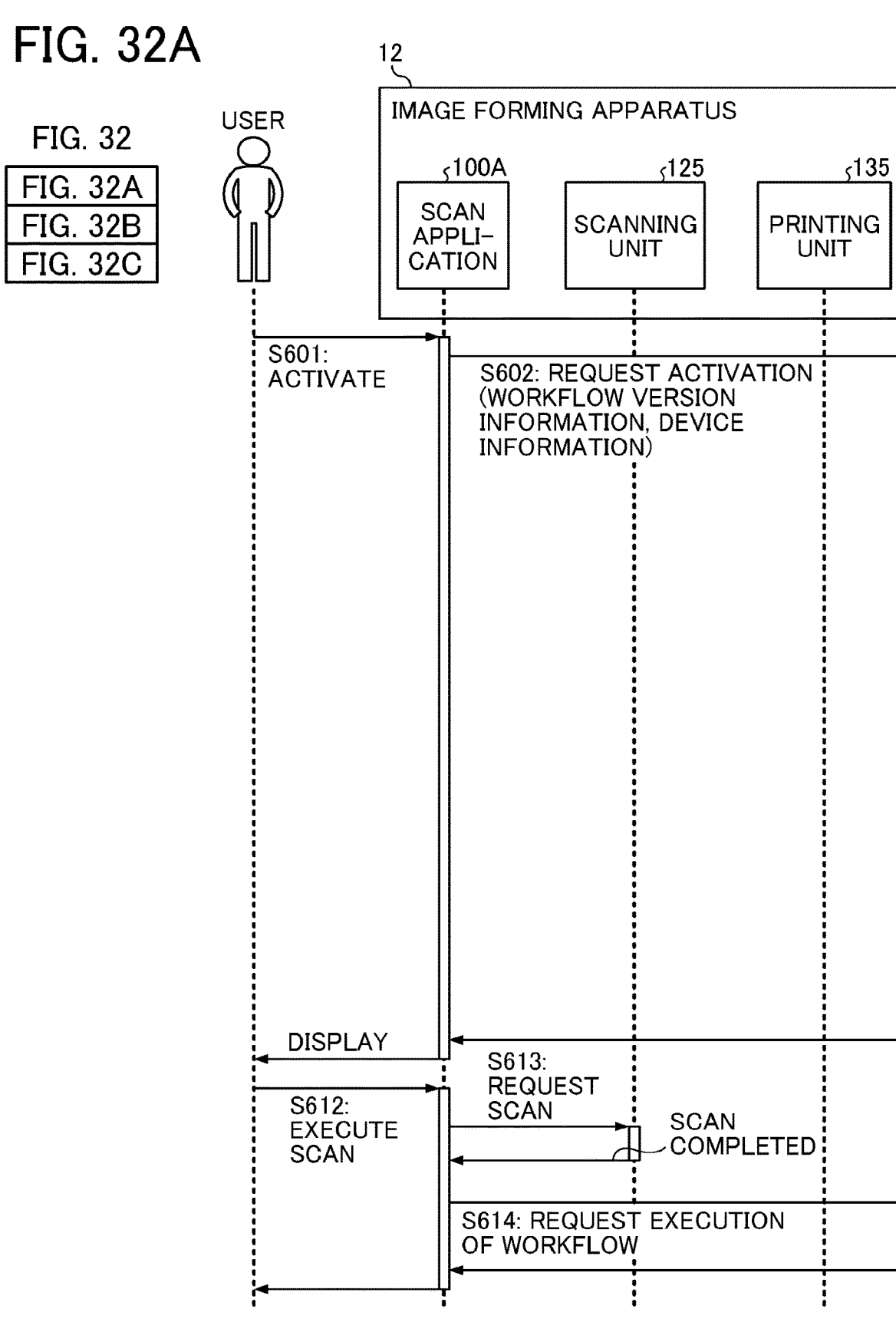

FIGS. 32A, 32B, and 32C (FIG. 32) are a sequence diagram illustrating an example of an operation performed when workflow information is cached in the image forming apparatus 12. In step S601 of FIG. 32, a user activates the scan application 100A of the image forming apparatus 12. The operation proceeds to step S602, and the scan application 100A specifies workflow version information and the device information and sends an activation request to the activation request receiver 141. The workflow version information is information indicating a version of workflow information required by the scan application 100A.

The activation request receiver 141 performs different operations depending on whether workflow information whose version information is the same or more recent than the workflow version information specified by the scan application 100A is cached.

When workflow information whose version information is the same as or more recent than the workflow version information specified by the scan application 100A is not cached, the activation request receiver 141 performs processes of steps S603 to S609.

In step S603, the activation request receiver 141 specifies the workflow version information to request the workflow management unit 111 to acquire the workflow information. Since the workflow information specified by the scan application 100A is not cached, the workflow management unit 111 sends a notification indicating that that the specified workflow information is not stored to the activation request receiver 141. Processes of S604 to S609 to be performed after the notification indicating that the specified workflow information is not stored are performed in substantially the similar manner as described above referring to steps S505 to S510 of FIG. 29, and the redundant description is omitted.

When the workflow information whose version information is the same as or more recent than the workflow version information specified by the scan application 100A is cached, the activation request receiver 141 performs processes of steps S610 to S611.

In step S610, the activation request receiver 141 specifies the workflow version information and requests the workflow management unit 111 to acquire workflow information. Since workflow information whose version information is the same as or more recent than the workflow version information specified by the scan application 100A is cached, the workflow management unit 111 sends the cached workflow information to the activation request receiver 141. The operation proceeds to step S611, and the activation request receiver 141 registers the cached workflow information in the workflow control unit 115.

After the process of step S609 or S611, the scan application 100A displays a UI that receives an operation by a user on the control panel 602, for example. Processes of S612 to S615 are performed in substantially the similar manner as described above referring to S90 to S96 of FIG. 30, and the redundant description is omitted. According to the operation illustrated in FIG. 32, even when workflow information whose version is older than the workflow version information specified by the scan application 100A is cached, new workflow information is acquired from the cloud workflow server apparatus 22, and the on-premises workflow service 110 is activated.

As described above, according to the operation illustrated in the sequence diagram of FIG. 32, the on-premises workflow service 110 can be activated using the workflow information whose version information is the same as or more recent than the workflow version information specified by the scan application 100A.

Ninth Embodiment

In a case where workflow information includes workflows of a plurality of applications, according to the seventh embodiment and the eighth embodiment, even when there is no updated version of the workflow of the scan application 100A activated by the user, the cached workflow information is updated when there is an updated version of a workflow of another application.

In the information processing system 1 according to the ninth embodiment, when the scan application 100A sends an activation request to the activation request receiver 141, the scan application 100A specifies application information. In a case where there is no updated version of the workflow of the scan application 100A specified by the application information, the on-premises workflow service 110 is can be activated using the cached workflow information without being updated, even if there is an updated version of the workflow of another application.

Tenth Embodiment

In the information processing system 1 according to the seventh, eighth and ninth embodiments, determination is performed as to whether workflow information is to be acquired from the cloud workflow server apparatus 22, when the scan application 100A for executing the workflow is activated. Therefore, when no workflow information is cached or when the version information is old, the image forming apparatus 12 acquire workflow information from the cloud workflow server apparatus 22 after activating the scan application 100A.

In the tenth embodiment, determination as to whether workflow information is to be acquired from the cloud workflow server apparatus 22 is performed at the timing when a user starts operating the image forming apparatus 12, which is a timing prior to activation of the scan application 100A. Examples of the timing at which the user starts operating the image forming apparatus 12 include when the image forming apparatus 12 is started, when the image forming apparatus 12 returns from an energy saving mode, and when a user starts operating the control panel 602 to input an instruction.

Figure 33:
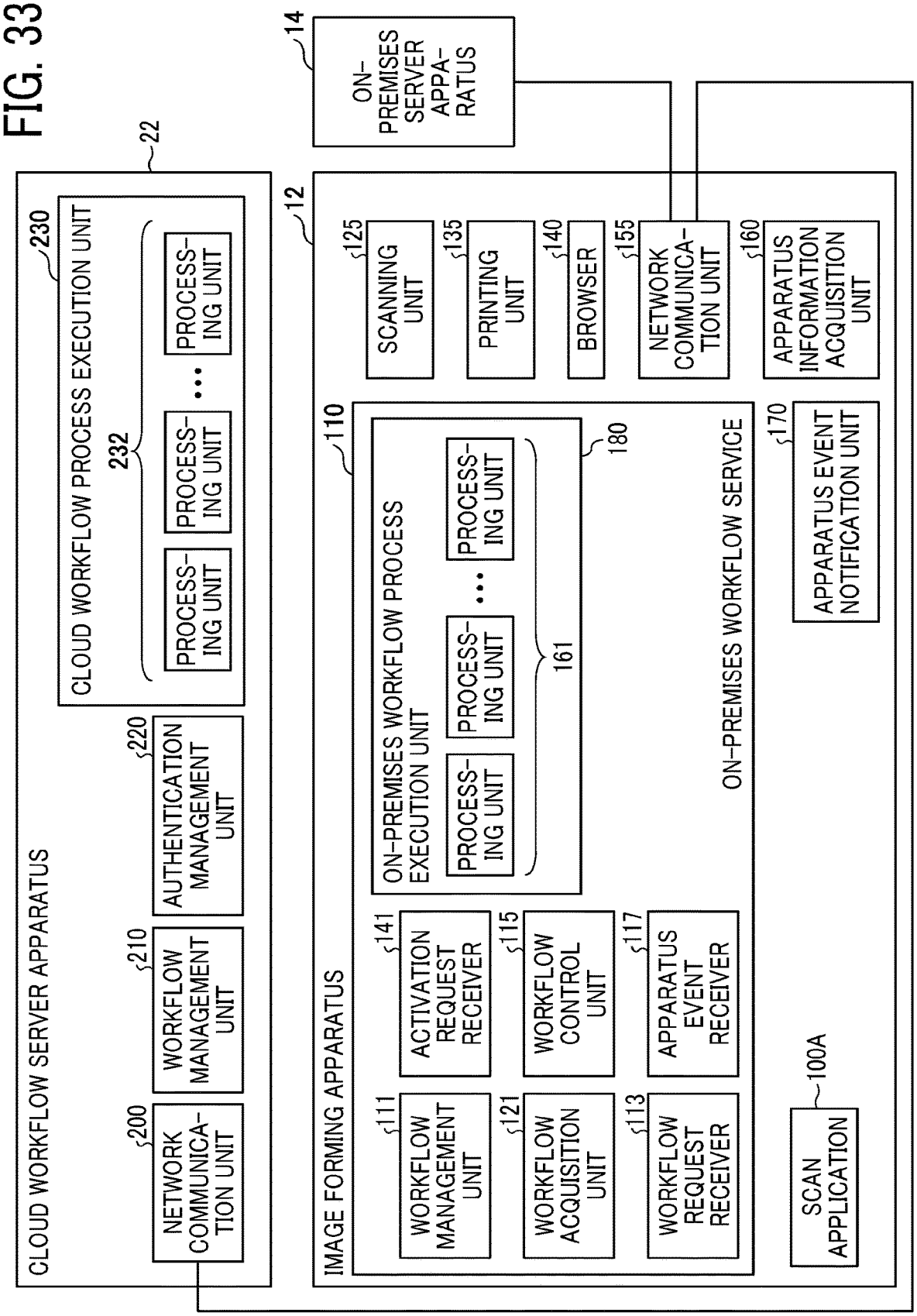
FIG. 33 is a block diagram illustrating another example of a functional configuration of the information processing system, according to the tenth embodiment of the present disclosure.

The information processing system 1 according to the tenth embodiment is implemented by the information processing system 1 having a functional configuration as illustrated in FIG. 33, for example. FIG. 33 is a block diagram illustrating another example of a functional configuration of the information processing system 1 according to the present embodiment. The information processing system 1 illustrated in FIG. 33 includes an apparatus event receiver 117 and an apparatus event notification unit 170 in addition to the functional configuration as illustrated in FIG. 27.

The apparatus event notification unit 170 detects a timing when a user starts operating the image forming apparatus 12 as an apparatus event and notifies the apparatus event receiver 117 of the detected apparatus event. The apparatus event receiver 117 receives the notification of the apparatus event from the apparatus event notification unit 170. For example, the activation request receiver 141 determines whether workflow information is to be acquired from the cloud workflow server apparatus 22 at a timing when the apparatus event receiver 117 receives the notification of the apparatus event.

Eleventh Embodiment

FIG. 34 is a schematic view illustrating another example of a configuration of the information processing system 1 according to the present embodiment. The information processing system 1 illustrated in FIG. 34, includes a cloud workflow server apparatus 22A and a cloud workflow server apparatus 22B instead of the cloud workflow server apparatus 22 of the information processing system 1 illustrated in FIG. 1. When the information processing system 1 has a configuration as illustrated in FIG. 34, the image forming apparatus 12 needs to manage from which one of the cloud workflow server apparatus 22A and the cloud workflow server apparatus 22B the workflow information is to be acquired and from which one of the cloud workflow server apparatus 22A and the cloud workflow server apparatus 22B the cached workflow information is acquired.

Therefore, in the information processing system 1 according to the eleventh embodiment, the workflow management unit 111 holds workflow management information as illustrated in FIG. 35. FIG. 35 is a diagram illustrating an example of a structure of the workflow management information. The workflow management information of FIG. 35 associates information of each of the cloud workflow server apparatuses with workflow information. Further, in the information processing system 1 according to the eleventh embodiment, the scan application 100A specifies workflow information to be acquired from among the workflow information of the cloud workflow server apparatus 22A and the workflow information of the cloud workflow server apparatus 22B.

According to the eleventh embodiment, even when the information processing system 1 includes a plurality of cloud workflow server apparatuses 22, the seventh to tenth embodiments described above are implemented.

As described above, according to one or more embodiments of the present disclosure, when the image forming apparatus 12 executes a workflow that causes the information processing system of the user environment 10 and the information processing system of the cloud environment 20 cooperates, the cloud environment 20 can receive the registration of the workflow.

According to one or more embodiments of the present disclosure, registration of a workflow to be executed in a user environment is received on a service provision environment side.

The processing unit 64 is an example of processing means. The on-premises workflow control unit 54 is an example of control means. The cloud workflow server link processing unit 62 is an example of link processing means. The workflow application 100 is an example of application means. The workflow request transmitter/receiver 52 is an example of execution requesting means. The smart device 28 is an example of a device apparatus. The workflow storage unit 58 is an example of workflow storage means. The workflow generator 80 is an example of generation means.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A first information processing system that resides on a first network and communicably connected with a second information processing system that resides on a second network, the second network being different from the first network, the first information processing system comprising:
   circuitry configured to:
      perform one or more processes among a plurality of processes included in a first workflow which includes acquiring first data;
      perform a link processing process as a part of the first workflow according to workflow information that defines a processing order in which the plurality of processes in the first workflow are to be executed, to cause the second information processing system to execute the second workflow as a part of the plurality of processes of the first workflow, the link processing process including:
         (i) requesting the second information processing system to execute a second workflow including another plurality of processes to be executed in series while providing the acquired first data to the second information processing system, the another plurality of processes included in the second workflow being different from the plurality of processes included in the first workflow,
         (ii) receiving an execution result of the second workflow, which includes acquiring second data from the second information processing system that is a result of the another plurality of processes of the second workflow being performed on the first data; and
         (iii) storing the workflow information acquired from the second information processing system in a memory provided for the first information processing system, wherein in a case where the workflow information is stored in the memory, the circuitry acquires the workflow information from the memory, and in a case where no workflow information is stored in the memory, the circuitry acquires the workflow information from the second information processing system, wherein when a version of the workflow information stored in the memory provided for the first information processing system is older than a version of the workflow information specified by an application installed in the first information processing system, the circuitry reacquires the workflow information from the second information processing system; and
      perform another one or more processes among the plurality of processes included in the first workflow based on the execution result of the second workflow.

2. The first information processing system of claim 1, wherein the plurality of processes include a process to be performed in cooperation with an information processing apparatus that is not connected to the second network.

3. The first information processing system of claim 1, wherein after requesting the second information processing system to execute the second workflow, the circuitry continuously requests the second information processing system for the execution result of the second workflow until the circuitry receives the execution result of the second workflow from the second information processing system.

4. The first information processing system of claim 1, wherein after requesting the second information processing system to execute the second workflow, the circuitry acquires the execution result of the second workflow by push notification from the second information processing system.

5. The first information processing system of claim 1, wherein the circuitry is further configured to:
   receive an execution request including first workflow identification information of the first workflow and second workflow identification information of the second workflow from an application for receiving a user operation; and
   perform the first workflow and request execution of the second workflow identified with the first workflow identification information and the second workflow identification information in response to the execution request.

6. The first information processing system of claim 1, wherein the circuitry is further configured to receive a request for executing the first workflow from the second information processing system that has received an execution request including first workflow identification information of the first workflow and second workflow identification information of the second workflow from a device on which an application for receiving a user operation is installed.

7. The first information processing system of claim 1, wherein the circuitry invokes, for a plurality of times, the link processing process according to workflow information that defines a processing order in which the plurality of processes of the first workflow are to be executed.

8. The first information processing system of claim 1, wherein the circuitry is further configured to:
receive a user operation for creating a processing order in which the plurality of processes in the first workflow and the another plurality of processes the second workflow are to be executed;
generate workflow information that defines a processing order in which the plurality of processes in the first workflow are to be executed; and
store the workflow information in a memory provided for the first information processing system.

9. The first information processing system of claim 8, wherein, in generating the workflow information, the circuitry displays a screen that allows a user to arrange display components representing the plurality of processes to create the processing order in which the plurality of processes in the first workflow and the another plurality of processes in the second workflow are to be executed, and
the display components arranged on the screen include a display component representing the link processing process representing the another plurality of processes of the second workflow that are to be executed as a part of the plurality of processes of the first workflow.

10. The first information processing system of claim 1, wherein the first information processing system executes the first workflow including the plurality of processes in cooperation with an information processing apparatus connected to the first network, and
the circuitry is further configured to:
acquire workflow information relating to the first workflow from the second information processing system; and
control execution of a process executed by at least the information processing apparatus based on the workflow information, to control execution of the first workflow cooperating with the information processing apparatus.

11. The first information processing system of claim 10, wherein the circuitry performs, as a part of the plurality of processes of the first workflow, one of a process executed by the first information processing system, a process executed by the information processing apparatus, and a process executed by the second information processing system, based on the workflow information, and
the circuitry invokes the plurality of processes according to the workflow information to control execution of the first workflow.

12. The first information processing system of claim 10, wherein the circuitry reacquires the workflow information from the second information processing system, at one of timings when the first information processing system is started, when an application installed in the first information processing system is activated, when the first information processing system returns from an energy saving mode, and when the first information processing system starts to receive a user operation on a control panel of the first information processing system.

13. The first information processing system of claim 1, wherein the circuitry sends, to the second information processing system, an inquiry inquiring whether the second information processing system holds an updated version of the workflow information stored in the memory provided for the first information processing system, and
when the second information processing system holds the updated version of the workflow information stored in the memory provided for the first information processing system, the circuitry acquires the updated version of the workflow information from the second information processing system.

14. The first information processing system of claim 13, wherein the circuitry stores the workflow information in association with information of the second information processing system from which the workflow information is acquired, and
when a plurality of second information processing systems are connected to the second network, the circuitry acquires the workflow information of one of the plurality of second information processing systems, the one of the plurality of second information processing systems being specified by an application installed in the first information processing system.

15. The first information processing system of claim 1, further comprising at least one of a printer and scanner, and each of the first workflow and the second workflow include processes performed on electronic data or image data generated by the at least one of a printer and scanner.

16. A system, comprising:
a first information processing system configured to execute a first workflow including a plurality of processes to be executed in series, the first information processing system being connected to a first network; and
a second information processing system configured to execute a second workflow including another plurality of processes to be executed in series, the another plurality of processes included in the second workflow being different form the plurality of processes included in the first workflow, the second information processing system being connected to a second network that is different from the first network,
wherein the first information processing system comprises first circuitry configured to:
execute one or more processes among the plurality of processes included in the first workflow which includes acquiring first data;
execute a link processing process as a part of the first workflow according to workflow information that defines a processing order in which the plurality of processes in the first workflow are to be executed, to cause the second information processing system to execute the second workflow as a part of the plurality of processes of the first workflow, the link processing process including:
(i) transmitting a request to the second information processing system requesting execution of the second workflow while providing the acquired first data to the second information processing system, (ii) receiving an execution result of the second workflow, which includes acquiring second data from the second information processing system that is a result of the another plurality of processes of the second workflow being performed on the first data, and (iii) storing the workflow information acquired from the second information processing system in a memory provided for the first information processing system, wherein in a case where the workflow information is stored in the memory, the circuitry acquires the workflow information from the memory, and in a case where no workflow information is stored in the memory, the first circuitry acquires the workflow information from the second information processing system, wherein when a version of the workflow information stored in the memory provided for the first information processing system is older than a version of the workflow information specified by an application installed in the first information processing system, the circuitry reacquires the workflow information from the second information processing system; and perform another one or more processes among the plurality of processes included in the first workflow based on the execution result received in response to the request from the second information processing system, and the second information processing system comprises second circuitry configured to perform the another plurality of processes included in the second workflow in response to receiving the request from the first information processing system.

17. A workflow processing method performed by circuitry of a first information processing system that resides on a first network and communicably connected with a second information processing system that resides on a second network, the second network being different from the first network, the method comprising:

performing one or more processes among a plurality of processes included in a first workflow which includes acquiring first data;

performing a link processing process as a part of the first workflow according to workflow information that defines a processing order in which the plurality of processes in the first workflow are to be executed, to cause the second information processing system to execute the second workflow as a part of the plurality of processes of the first workflow, the link processing process including:

(i) requesting the second information processing system to execute a second workflow including another plurality of processes to be executed in series while providing the acquired first data to the second information processing system, the another plurality of processes included in the second workflow being different from the plurality of processes included in the first workflow, (ii) receiving an execution result of the second workflow, which includes acquiring second data from the second information processing system that is a result of the another plurality of processes of the second workflow being performed on the first data, (iii) storing the workflow information acquired from the second information processing system in a memory provided for the first information processing system, wherein in a case where the workflow information is stored in the memory, the circuitry acquires the workflow information from the memory, and in a case where no workflow information is stored in the memory, the circuitry acquires the workflow information from the second information processing system, wherein when a version of the workflow information stored in the memory provided for the first information processing system is older than a version of the workflow information specified by an application installed in the first information processing system, the circuitry reacquires the workflow information from the second information processing system; and performing another one or more processes among the plurality of processes included in the first workflow based on the execution result of the second workflow.

* * * * *